US012811652B2

(12) United States Patent
Saber et al.

(10) Patent No.: US 12,811,652 B2
(45) Date of Patent: Nov. 24, 2026

(54) SYSTEMS, METHODS, AND APPARATUS FOR ARTIFICIAL INTELLIGENCE AND MACHINE LEARNING BASED REPORTING OF COMMUNICATION CHANNEL INFORMATION

(71) Applicant: Samsung Electronics Co., Ltd., Suwon-si (KR)

(72) Inventors: Hamid Saber, San Diego, CA (US); Jung Hyun Bae, San Diego, CA (US); HyukJoon Kwon, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 221 days.

(21) Appl. No.: 18/240,350

(22) Filed: Aug. 30, 2023

(65) Prior Publication Data

US 2023/0412230 A1 Dec. 21, 2023

Related U.S. Application Data

(63) Continuation-in-part of application No. 17/959,291, filed on Oct. 3, 2022.

(Continued)

(51) Int. Cl.

*H04B 7/06* (2006.01)
*G06N 20/00* (2019.01)
*H04B 7/0417* (2017.01)

(52) U.S. Cl.

CPC .......... *H04B 7/0632* (2013.01); *G06N 20/00* (2019.01); *H04B 7/0417* (2013.01)

(58) Field of Classification Search

CPC .. H04B 7/0632; H04B 7/0626; H04B 7/0482; H04B 7/0417; G06N 20/00;

(Continued)

(56) References Cited

U.S. PATENT DOCUMENTS 10,505,616 B1 12/2019 Chen et al.
2017/0302480 A1 10/2017 Kim et al.

(Continued)

FOREIGN PATENT DOCUMENTS

CN 108462517 A 8/2018
CN 110249342 A 9/2019

(Continued)

OTHER PUBLICATIONS

Ali, Samad et al., "6G White Paper on Machine Learning in Wireless Communication Networks," arXiv preprint arXiv:2004.13875, 2020, 29 pages.

(Continued)

*Primary Examiner* — Jungwon Chang
(74) *Attorney, Agent, or Firm* — Renaissance IP Law Group LLP

(57) ABSTRACT

An apparatus may include a receiver configured to receive a reference signal using a channel, at least one processor configured to determine channel information based on the reference signal, generate a representation based on the channel information using a first machine learning model, generate, based on the representation, precoding information using a second machine learning model, and generate channel quality information based on the precoding information, and a transmitter configured to transmit the representation and the channel quality information.

18 Claims, 22 Drawing Sheets

Related U.S. Application Data

(60) Provisional application No. 63/454,935, filed on Mar. 27, 2023, provisional application No. 63/419,276, filed on Oct. 25, 2022, provisional application No. 63/408,089, filed on Sep. 19, 2022, provisional application No. 63/390,273, filed on Jul. 18, 2022, provisional application No. 63/331,693, filed on Apr. 15, 2022, provisional application No. 63/325,607, filed on Mar. 30, 2022, provisional application No. 63/325,145, filed on Mar. 29, 2022, provisional application No. 63/298,620, filed on Jan. 11, 2022, provisional application No. 63/289,138, filed on Dec. 13, 2021, provisional application No. 63/257,559, filed on Oct. 19, 2021.

(58) Field of Classification Search
CPC .. G06N 3/0455; G06N 3/0442; G06N 3/0464; G06N 3/084
USPC .......................................................... 370/328
See application file for complete search history.

(56) References Cited

U.S. PATENT DOCUMENTS

| | | | | |
|---|---|---|---|---|
| 2018/0314985 | A1 | 11/2018 | O'Shea | |
| 2018/0322388 | A1 | 11/2018 | O'Shea | |
| 2018/0367192 | A1 | 12/2018 | O'Shea et al. | |
| 2020/0145075 | A1* | 5/2020 | Hao | H04B 7/0626 |
| 2020/0349471 | A1 | 11/2020 | Zhao | |
| 2021/0143883 | A1 | 5/2021 | Yerramalli et al. | |
| 2021/0184744 | A1* | 6/2021 | Pezeshki | H04L 5/0048 |
| 2021/0185700 | A1 | 6/2021 | Pezeshki et al. | |
| 2021/0226674 | A1 | 7/2021 | Ramireddy et al. | |
| 2021/0273707 | A1 | 9/2021 | Yoo et al. | |
| 2021/0344745 | A1 | 11/2021 | Mermoud et al. | |
| 2021/0351885 | A1 | 11/2021 | Chavva et al. | |
| 2021/0376895 | A1 | 12/2021 | Xue et al. | |
| 2021/0409174 | A1* | 12/2021 | Yum | H04L 5/0048 |
| 2022/0006500 | A1* | 1/2022 | Wei | H04W 28/06 |
| 2022/0060917 | A1* | 2/2022 | Vitthaladevuni | H04W 24/08 |
| 2022/0149904 | A1 | 5/2022 | Timo et al. | |
| 2023/0035125 | A1 | 2/2023 | Pick et al. | |
| 2023/0145844 | A1* | 5/2023 | Kwon | G06N 20/00 370/329 |
| 2023/0239105 | A1 | 7/2023 | Song | |
| 2023/0328559 | A1* | 10/2023 | Manolakos | H04L 41/0806 370/252 |
| 2024/0129008 | A1 | 4/2024 | Yoo et al. | |
| 2024/0187186 | A1 | 6/2024 | Echigo et al. | |
| 2024/0275440 | A1* | 8/2024 | Xi | H04B 7/0482 |
| 2024/0275456 | A1 | 8/2024 | Chen et al. | |
| 2024/0275461 | A1* | 8/2024 | Qin | H04L 1/0029 |
| 2024/0276250 | A1 | 8/2024 | Ren et al. | |
| 2024/0313838 | A1 | 9/2024 | Wu et al. | |
| 2024/0356591 | A1 | 10/2024 | Chi et al. | |

FOREIGN PATENT DOCUMENTS

| | | | |
|---|---|---|---|
| CN | 113098804 | A | 7/2021 |
| EP | 3738281 | A1 | 11/2020 |
| EP | 3897056 | A1 | 10/2021 |
| TW | 201944745 | A | 11/2019 |
| WO | 2022040055 | A1 | 2/2022 |
| WO | 2022056503 | A1 | 3/2022 |
| WO | 2022056505 | A1 | 3/2022 |
| WO | 2022086949 | A1 | 4/2022 |

OTHER PUBLICATIONS

Final Office Action for U.S. Appl. No. 17/959,291, mailed Aug. 1, 2025.

Office Action for U.S. Appl. No. 17/959,291, mailed Apr. 10, 2025.

Tanveer, Jawad et al., "Machine Learning for Physical Layer in 5G and Beyond Wireless Networks: A Survey," Electronics 2022, 11, 121, 2022, 2021, 44 pages.

Office Action for U.S. Appl. No. 17/959,291, mailed Apr. 24, 2026.

Office Action for U.S. Appl. No. 17/959,291, mailed Mar. 3, 2026.

Final Office Action for U.S. Appl. No. 17/959,291, mailed Sep. 18, 2026.

* cited by examiner

1200

SYSTEMS, METHODS, AND APPARATUS FOR ARTIFICIAL INTELLIGENCE AND MACHINE LEARNING BASED REPORTING OF COMMUNICATION CHANNEL INFORMATION

CROSS-REFERENCE TO RELATED APPLICATIONS

This application is a Continuation-In-Part of U.S. patent application Ser. No. 17/959,291 filed Oct. 3, 2022 which claims priority to, and the benefit of, U.S. Provisional Patent Application Ser. No. 63/257,559 filed Oct. 19, 2021; Ser. No. 63/289,138 filed Dec. 13, 2021; Ser. No. 63/298,620 filed Jan. 11, 2022; Ser. No. 63/325,145 filed Mar. 29, 2022; Ser. No. 63/325,607 filed Mar. 30, 2022; Ser. No. 63/331,693 filed Apr. 15, 2022; and Ser. No. 63/390,273 filed Jul. 18, 2022 all of which are incorporated by reference. This application claims priority to, and the benefit of, U.S. Provisional Patent Application Ser. No. 63/408,089 filed Sep. 19, 2022; Ser. No. 63/419,276 filed Oct. 25, 2022; and Ser. No. 63/454,935 filed Mar. 27, 2023 all of which are incorporated by reference.

TECHNICAL AREA

This disclosure relates generally to communication systems and specifically to systems, methods, and apparatus for artificial intelligence and machine learning for a physical layer of a communication system.

BACKGROUND

In a wireless communication system, a receiver may provide channel state information or precoding information to a transmitter based on channel conditions between the transmitter and the receiver. The transmitter may use the channel state information or precoding information to perform transmissions to the receiver.

The above information disclosed in this Background section is only for enhancement of understanding of the background of the invention and therefore it may contain information that does not constitute prior art.

SUMMARY

In some wireless communication systems, a user equipment (UE) may determine channel information to report to a base station by making channel measurements based on a reference signal transmitted through the channel by the base station. The UE may use the channel measurements to calculate a precoding matrix that the UE may report to the base station. The base station may apply the reported precoding matrix to subsequent downlink transmissions through the channel. Although the base station may not be required to use the precoding matrix reported by the UE, in many situations, the precoding matrix reported by the UE may provide the best performance for subsequent downlink transmissions.

The UE may also use the precoding matrix to calculate a channel quality indicator (CQI) that may be used by the base station to select a modulation order, code rate, and/or the like, for subsequent transmissions by the base station, for example, while using the reported precoding matrix. Thus, to accurately determine the CQI, the UE may require knowledge of the precoding matrix it may report to the base station. Such knowledge may be present in UEs that use a technique for reporting channel information (e.g., a codebook) in which the UE may calculate a precoding matrix using an algorithm. However, in a UE that may use artificial intelligence and/or machine learning to report channel information as described below, the UE may not have knowledge of a precoding matrix it may report to a base station. For example, the UE may only have access to an output of a channel state information (CSI) generation. The output of a CSI generation model may be a compressed representation of a precoding matrix. The precoding matrix itself may be constructed at the output of a CSI reconstruction model which may be deployed at the base station and may not be necessarily shared with the UE.

As mentioned above, one approach to reporting channel information is to use a codebook, available to both the UE and the base station, to enable the UE to report the precoding matrix to the base station in a manner that ensures that the base station may use (or at least have access to) the precoding matrix as reported by the UE. An issue with this approach is that the use of a codebook may not provide adequate accuracy and/or may involve the transmission of a significant amount of overhead data on an uplink channel.

To overcome these issues, systems and methods are described herein for enabling a UE to report channel information such as a precoding matrix and/or CQI using one or more artificial intelligence and/or machine learning models that may compress the channel information. In some embodiments that may use artificial intelligence and/or machine learning models for compression, a UE may not have access to a decoder model used by a base station to reconstruct a precoding matrix. Thus, the UE may not have access to the precoding matrix used by the base station. In some additional embodiments described herein, a UE may determine a precoding matrix by reconstructing, using a decoder model, a precoding matrix used by the base station. In various embodiments, the UE may obtain the decoder model be receiving it from the base station, by training a reference model, and/or in other manners.

This approach improves on the previous methods because it may provide improved performance and/or flexibility, reduced complexity, and/or the like.

An apparatus may include a receiver configured to receive a reference signal using a channel, at least one processor configured to determine channel information based on the reference signal, generate a representation based on the channel information using a first machine learning model, generate, based on the representation, precoding information using a second machine learning model, and generate channel quality information based on the precoding information, and a transmitter configured to transmit the representation and the channel quality information. The at least one processor may be configured to receive the second machine learning model. The at least one processor may be configured to train the second machine learning model. The at least one processor may be configured to train the second machine learning model based on a reference model. The channel information may include a channel matrix. The channel quality information may include a channel quality indicator (CQI). The at least one processor may be configured to combine the representation and the channel quality information.

An apparatus comprising may include a receiver configured to receive a signal using a channel, a transmitter configured to transmit a representation of channel information relating to the channel, and at least one processor configured to determine the channel information based on the signal, and generate the representation of the channel information based on the channel information using a machine learning model, wherein the channel information may include first channel information for a first subband and second channel information for a second subband. The at least one processor may be configured to generate the representation of the channel information using compression. The channel information may include channel quality information. The channel quality information may be based on a discrete value. The channel quality information may be based on a table value. The channel quality information may be based on a continuous value. The channel quality information may be based on a code rate.

An apparatus may include a receiver configured to receive a signal using a channel, a transmitter configured to transmit a representation of channel information relating to the channel, and at least one processor configured to determine the channel information based on the signal, and generate, using a compression scheme, the representation of the channel information based on the channel information using at least one machine learning model. The at least one machine learning model may include an encoder configured to perform spatial compression. The encoder may be configured to perform spatial compression for a subband. The encoder may be a first encoder, the subband may be a first subband, and the at least one machine learning model may include a second encoder configured to perform spatial compression for a second subband. The at least one machine learning model may include a third encoder configured to perform frequency compression for the first subband and the second subband. The at least one machine learning model may include an encoder configured to perform spatial compression and frequency compression. The encoder configured to perform spatial compression and frequency compression for a first subband and spatial compression and frequency compression for a second subband. The at least one machine learning model may be configured to generate the representation of the channel information using spatial compression. The at least one machine learning model may be configured to generate the representation of the channel information using frequency compression. The at least one machine learning model may be configured to generate the representation of the channel information using spatial compression and frequency compression.

An apparatus may include a receiver configured to receive a reference signal using a channel, at least one processor configured to determine channel information based on the reference signal, generate channel quality information based on the channel information, and generate, using a machine learning model, a joint representation of the channel information and the channel quality information, and a transmitter configured to transmit the joint representation. The channel information may include a channel matrix. The channel information may include a precoding matrix. The at least one processor may be configured to generate precoding information based on the channel information, and generate the channel quality information based on the precoding information.

An apparatus may include a receiver configured to receive a signal using a channel, a transmitter configured to transmit a representation of channel information relating to the channel, and at least one processor configured to determine a condition of the channel based on the signal, and generate the representation of the channel information based on the condition of the channel using a machine learning model. The channel information may include a channel estimation. The channel information may include precoding information. The at least one processor may be configured to perform a selection of the machine learning model. The at least one processor may be configured to perform the selection of the machine learning model based on the condition of the channel. The at least one processor may be configured to activate the machine learning model based on model identification information received using the receiver. The apparatus may be configured to receive the model identification information using one or more of a media access control (MAC) signal or a radio resource control (RRC) signal. The at least one processor may be configured to indicate the selection of the machine learning model using the transmitter. The at least one processor may be configured to receive the machine learning model. The at least one processor may be configured to receive a quantization function corresponding to the machine learning model. The at least one processor may be configured to train the machine learning model. The at least one processor may be configured to train the machine learning model using a quantization function. The quantization function may include a differentiable quantization function. The quantization function may include an approximated quantization function. The at least one processor may be configured to send configuration information for the machine learning model. The configuration information may include one or more or a weight or a hyperparameter. The machine learning model may be a generation model, and the at least one processor may be configured to train the generation model using a reconstruction model that may be configured to reconstruct the channel information based on the representation. The generation model may include an encoder, and the reconstruction model may include a decoder. The at least one processor may be configured to receive configuration information for the reconstruction model, and train the generation model based on the configuration information. The configuration information may include one or more or a weight or a hyperparameter. The at least one processor may be configured to perform joint training of the generation model and the reconstruction model. The at least one processor may be configured to send the reconstruction model based on the joint training. The at least one processor may be configured to collect training data for the machine learning model based on the channel. The at least one processor may be configured to collect the training data based on a resource window. The resource window has a time dimension and a frequency dimension. The channel information may include a channel matrix. The channel information may include a singular value matrix combined with a singular value. The channel information may include a unitary matrix. The at least one processor may be configured to preprocess the channel information to generate transformed channel information, and generate the representation of the channel information based on the transformed channel information. The at least one processor may be configured to preprocess the channel information based on a transformation, and train the machine learning model based on training data, wherein the training data may be processed based on the transformation. The at least one processor may be configured to process the training data based on the transformation. The at least one processor may be configured to train the machine learning model using a processing allowance. The processing allowance may include a processing time. The processing allowance may be initiated based on the signal. The processing allowance may be initiated based on a control signal. The control signal may include one or more of a media access control (MAC) signal or a radio resource control (RRC) signal. The at least one processor may be configured to send the representation of the channel information as link control information. The at least one processor may be configured to send the link control information as uplink control information (UCI). The at least one processor may be configured to quantize the representation of the channel information to generate a quantized representation. The at least one processor may be configured to and apply a coding scheme to the quantized representation to generate a coded representation. The coding scheme may include a polar coding scheme, and the at least one processor may be configured to send the coded representation using a physical control channel. The coding scheme may include a low-density parity-check (LDPC) coding scheme, and the at least one processor may be configured to send the coded representation using a physical shared channel.

An apparatus may include a transmitter configured to send a signal using a channel, a receiver configured to receive a representation of channel information relating to the channel, and at least one processor configured to construct the channel information based on the representation using a machine learning model. The machine learning model may be a reconstruction model, and the at least one processor may be configured to train the reconstruction model using a generation model that may be configured to generate the representation of the channel information. The at least one processor may be configured to send the machine learning model. The at least one processor may be configured to send a dequantizing function corresponding to the machine learning model. The representation of the channel information may include a representation of transformed channel information, and the at least one processor may be configured to postprocess an output of the machine learning model to construct the channel information based on the transformed channel information. The representation of transformed channel information may be based on a transformation, the machine learning model may be a reconstruction model, the at least one processor may be configured to train the reconstruction model using a generation model that may be configured to generate the representation of the transformed channel information, and the at least one processor may be configured to train the reconstruction model using training data that may be processed based on the transformation. The at least one processor may be configured to perform a selection of the machine learning model, and indicate the selection of the machine learning model using the transmitter.

A method may include determining, at a wireless apparatus, physical layer information for the wireless apparatus, generating a representation of the physical layer information using a machine learning model, and transmitting, from the wireless apparatus, the representation of the physical layer information. The machine learning model may be a generation model, the method further comprising training the generation model using a reconstruction model that may be configured to reconstruct the physical layer information based on the representation. The method may further include collecting, by the wireless apparatus, training data for the machine learning model based on a resource window. The physical layer information may include a channel matrix. The method may further include preprocessing the physical layer information to generate transformed physical layer information, and generating the representation of the physical layer information based on the transformed physical layer information. The generating may be performed based on a processing allowance. The method may further include activating the machine learning model based on model identification information received at the wireless apparatus. The representation of the physical layer information may include uplink control information.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
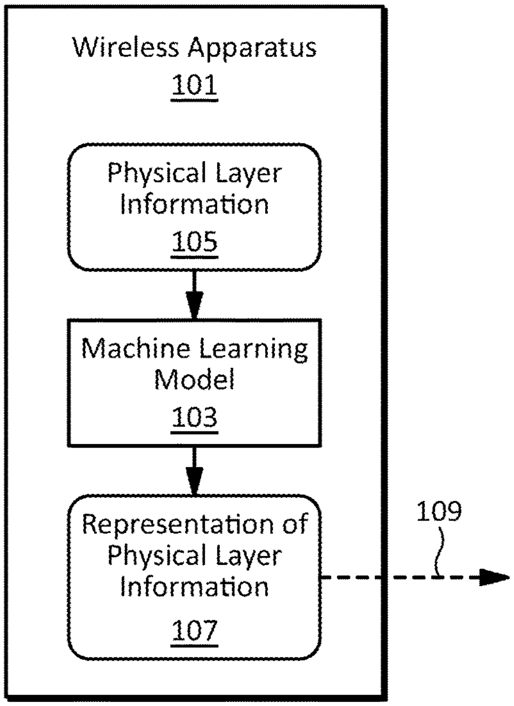
FIG. 1 illustrates an embodiment of a wireless communication apparatus according to the disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components, and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

OVERVIEW

In some wireless communication systems, a transmitting device may rely on a receiving device to provide feedback information on channel conditions to enable the transmitting device to transmit more effectively to the receiving device through the channel. For example, in a 5G New Radio (NR) system, a base station (e.g., a gNodeB or gNB) may send a reference signal to a user equipment (UE) through a downlink (DL) channel. The UE may measure the reference signal to determine channel conditions on the DL channel. The UE may then send feedback information (e.g., channel state information (CSI)) indicating the channel conditions on the DL channel to the base station through an uplink (UL) channel. The base station may use the feedback information to improve the manner in which it transmits to the UE through the DL channel, for example, through the use of beamforming.

Sending feedback information on channel conditions, however, may consume a relatively large amount of resources as overhead. To reduce the amount of data used to transmit feedback information, some wireless communication systems may use one or more types of codebooks to enable a receiving device to send implicit and/or explicit channel condition feedback to a transmitting device. For example, in 5G NR systems, a Type-I codebook may be used to provide implicit CSI feedback to a gNB in the form of an index that may point to a predefined precoding matrix indicator (PMI) selected by the UE based on the DL channel conditions. The gNB may then use the PMI for beamforming in the DL channel. As another example, a Type-II codebook may be used to provide explicit CSI feedback in which a UE may derive a PMI that may be fed back to the gNB which may use the PMI for beamforming in the DL channel. The use of a Type-I codebook, however, may not provide CSI feedback with adequate accuracy. Moreover, the use of a Type-II codebook may still involve the transmission of a significant amount of overhead data on a UL channel.

A feedback scheme in accordance with the disclosure may use artificial intelligence (AI), machine learning (ML), deep learning, and/or the like (any or all of which may be referred to individually and/or collectively as machine learning or ML) to generate a representation of physical layer information for a wireless communication system. For example, in some embodiments, a feedback scheme may use an ML model to generate a representation of feedback information for a channel condition (e.g., a representation of a channel matrix, a precoding matrix, and/or the like). The representation may be a compressed, encoded, or otherwise modified form of the feedback information which, depending on the implementation details, may reduce the resources involved in transmitting the feedback information between apparatus.

A feedback scheme in accordance with the disclosure may also use machine learning to reconstruct the physical layer information from the representation. For example, in some embodiments, a feedback scheme may use an ML model to reconstruct feedback information, or an approximation of the feedback information, from a representation of the feedback information for a channel condition. For convenience, an ML model may be referred to simply as a model.

A model that generates a representation of an input (e.g., physical layer information such as feedback information for a channel condition) may be referred to as a generation model. A model that reconstructs an input, or an approximation of the input, from a representation of the input may be referred to as a reconstruction model. An output of a reconstruction model may be referred to as a reconstructed input. Thus, a reconstructed input may be the input applied to the generation model, or an approximation, estimate, prediction, etc., of the input applied to the generation model. A generation model and a corresponding reconstruction model may be referred to collectively as a pair of ML models or a pair of models. In some embodiments, a generation model may be implemented as an encoder model, and/or a reconstruction model may be implemented as a decoder model. Thus, an encoder model and a decoder model may also be referred to as a pair of ML models or a pair of models.

Any model may be referred to as a first model, a second model, Model A, Model B, and/or the like for purposes of distinguishing the model from one or more other models, and the label used for the model is not intended to imply the type of model unless otherwise apparent from context. For instance, in the context of a pair of models, if Model A refers to a generation model, Model B may refer to a reconstruction model.

A node may refer to a base station, a UE, or any other apparatus that may use one or more ML models as disclosed herein. Additional examples of nodes may include a UE side server, a based station side server (e.g., a gNB side server), an eNodeB, a master node, a secondary node, and/or the like, whether logical nodes, physical nodes, or a combination thereof. Any node may be referred to as a first node, a second node, Node A, Node B, and/or the like for purposes of distinguishing the node from one or more other nodes, and the label used for the node is not intended to imply the type of node unless otherwise apparent from context. For example, in some embodiments, a first node may refer to a UE and a second node may refer to a base station. In some other embodiments, however, a first node may refer to a first UE and a second node may refer to a second UE configured for sidelink communications with the first UE.

In some example embodiments, a first node may use a first model (e.g., a generation model) to encode a channel matrix, a precoding matrix, and/or the like, to generate a feature vector that may be transmitted to a second node. A second node may use a second model (e.g., a reconstruction model) to decode the feature vector to reconstruct the original information (e.g., the channel matrix, precoding matrix, and/or the like) or an approximation of the original information.

Some embodiments in accordance with the disclosure may implement a two-model training scheme in which models may be trained in pairs. For example, a reconstruction model may be used to train a generation model, and/or a generation model may be used to train a reconstruction model. In some example implementations, a pair of models may be configured to implement an auto-encoder in which an encoder model (e.g., for a first node) may be trained with a decoder model (e.g., for a second node).

In some embodiments, a first model (e.g., a generation model) that may be used for inference by a first node may be trained using a second model (e.g., a reconstruction model) that may actually be used for inference by a second node. The training may be performed by the first node, the second node, and/or any other apparatus, for example, by a server that may train the models (e.g., offline) and transfer one or more of the trained models to one or more of the nodes to use for inference.

Alternatively, or additionally, the first model may be trained using a second model that may provide some amount of matching between the first model and the second model, even if the second model is not the actual model that may be used for inference by the second node. Alternatively, or additionally, the first model may be trained using a reference model for the second model. Alternatively, or additionally, the first model may be trained using a second model that may be configured with values of weights, hyperparameters, and/or the like that may be initialized to predetermined values, randomized values, and/or the like.

In some embodiments, a pair of models may be trained simultaneously, sequentially (e.g., alternating between training a first model while freezing a second model, then training the second model while freezing the first model), and/or the like using the same or different training data sets.

In some embodiments, a node may use a quantizer to convert a representation of physical layer information to a form that may be more readily transmitted through a communication channel. For example, a quantizer may convert a real number (e.g., an integer) representation of physical layer information to a binary bit stream that may then be applied to a polar encoder or other apparatus for transmission through a physical uplink or downlink channel. Similarly, a node may use a dequantizer to convert a bit stream to a representation of physical layer information that may be used to reconstruct the physical layer information. In some embodiments, a quantizer or dequantizer may be considered part of an ML model. For example, a generation model may include an encoder and a corresponding quantizer, and/or a reconstruction model may include a corresponding dequantizer.

Some embodiments in accordance with the disclosure may implement one or more frameworks for training models and/or transferring models between nodes. For example, in a first type of framework, a first node (Node A) may jointly train a pair of models (Model A and Model B). Node A may use the trained Model A for inference and transfer the trained Model B to a second node (Node B) which may use the trained Model B for inference. In a variation of the first type of framework, Node A may transfer the trained Model A to Node B, and Node B may use the trained Model A to train its own Model B to use for inference.

In a second type of framework, a reference model may be established as Model A for a Node A, and a Node B may then train a Model B using the reference model as Model A (e.g., assuming Node A will use the reference model as Model A for inference). Node A may then use the reference model as Model A without further training, or Node A may proceed to train the reference model to use as Model A. In some embodiments, multiple reference models may be established for Model A, and Node B may train one or more versions of Model B corresponding to one or more of the reference models for Model A. In embodiments with multiple reference models for Model A, Node B may train one or more versions of Model B based on the multiple reference models for Model A, and Node B may indicate to Node A which version of Model B it has selected for use, which version or versions of Model B provide(s) best performance, and/or the like. Based on the indication from Node B, Node A may proceed with the reference model corresponding to the Model B indicated by Node B, or Node A may select any other model to use as Model A.

In a third type of framework, a Node A may begin with a Model A that may be in any initial state, for example, pre-trained (e.g., trained offline), untrained but configured with initial values, and/or the like. A Node B may begin with a Model B that may also be in any initial state. In some embodiments, before training their own models, Node A and/or Node B may have models that are matched to each other (e.g., trained together). One or both nodes may train their respective models for a period of time, then one or both nodes may share trained model values and/or trained models with the other node. An example embodiment is described in more detail below with respect to FIG. 10 where a first node (e.g., a UE) and a second node (e.g., base station) may have a pair of models ($e_0$, $d_0$), where $e_0$ may be the encoder model in an initial state at the UE and $d_0$ may be the decoder model in an initial state at the base station. In a variation of the third type of framework, one or both nodes may train their respective models for one or more additional periods of time, and one or both nodes may share trained model values and/or trained models with the other node, for example, at the end of each period of time, at the end of alternating periods of time, and/or the like.

In any of the frameworks disclosed herein, when a model is transferred to or from a node, a corresponding quantizer or dequantizer may be transferred along with the model.

In some embodiments, training data may be collected based on a resource window (e.g., a window of time and/or frequency resources). For example, a node may be configured to collect training data (e.g., channel estimates) for a specific range of frequencies (e.g., subcarriers, subbands, etc.) and a specific range of times (e.g., symbols, slots, etc.). The size of a window may be determined, for example, based on an amount of training data a node may be able to store in memory. The collected training data may be used for online training by one or more nodes or saved for offline training.

In some embodiments, pre-processing and/or post-processing may enable a pair of models to operate more effectively. For example, domain knowledge (e.g., frequency domain knowledge) of one or more inputs may be used to perform a pre-processing operation on at least a portion of one or more inputs to generate one or more transformed inputs. The one or more transformed inputs may be applied to a generation model to generate a representation of the one or more transformed inputs. The representation of the one or more transformed inputs may be applied to a reconstruction model that may generate a reconstructed transformed input (e.g., the one or more transformed inputs, or an approximation thereof). Domain knowledge may also be used to perform a post-processing operation (e.g., an inverse of the pre-processing operation) on the reconstructed transformed input to recover the original one or more inputs or an approximation thereof. Depending on the implementation details, transforming inputs and/or outputs (e.g., based on domain knowledge) may exploit one or more correlations between elements of the one or more inputs, thereby reducing the processing burden, memory usage, power consumption, and/or the like, of the generation model and/or the reconstruction model.

In some embodiments, a node may be provided with processing time for a model. For example, if a node is configured to perform online training of a model (e.g., using a training data set that is provided to the node or collected by the node), the node may be expected to update the model within a predetermined number of symbols or other measure of time.

Some embodiments in accordance with the disclosure may implement a scheme in which multiple pairs of models may be trained, deployed, and/or activated for use by one or more nodes (e.g., by a pair of nodes). For example, different pairs of trained models may be activated to handle different channel environments, different matrix dimensions (e.g., for channel matrices, precoding matrices, etc.), and/or the like.

In some embodiments, a pair of models may be activated by signaling (e.g., RRC signaling, MAC-CE signaling, etc.). In some embodiments, a first node (e.g., a gNB) may also indicate to a second node (e.g., a UE) to switch or deactivate a current active model, for example, via RRC, MAC CE or dynamic signaling. A pair of models may be activated to train one or more of the models, use one or more of the models for inference, and/or the like.

Some embodiments in accordance with the disclosure may implement one or more formats for a representation of feedback information that may be generated by a generation model at a first node and transmitted to a second node for reconstruction. For example, a format for a representation of feedback information may be established as a type of uplink control information (UCI). A format may involve one or more types of coding (e.g., polar coding, low density parity check (LDPC) coding, and/or the like) which may depend, for example, on a type of physical channel used to transmit the UCI.

In some embodiments, CSI compression performance may be improved using AI and/or ML, for example, by exploiting one or more correlations in the time, frequency and/or space domains, and/or by defining a training data set across time, frequency, and/or space.

Some embodiments in accordance with the disclosure may enable a first node (e.g., a UE) to determine precoding information that may be used by a second node (e.g., a base station). The precoding information may be used, for example, to determine channel quality information for a channel with which the precoding information may be used. Depending on the implementation details, enabling a first node to determine precoding information used by a second node may reduce or eliminate mismatch between the precoding information and channel quality information that may be determined based on the precoding information. For example, a base station may share a decoder model with a UE which may use the model to determine a precoding matrix used by the base station. As another example, a UE may train a decoder (e.g., a reference decoder as described below) to reconstruct a precoding matrix used by the base station.

In some embodiments in accordance with the disclosure, a pair of encoder and decoder models may be trained to jointly compress channel information (e.g., a channel matrix, a precoding matrix, and/or the like) and channel quality information that may be determined based on the channel information (e.g., CQI) to reduce or eliminate mismatch between the channel information and the channel quality information. For example, an encoder and decoder may be trained with a training data set that may include precoding information that may match corresponding channel quality information. Depending on the implementation details, this may reduce or eliminate mismatch between the precoding information (e.g., a precoding matrix) and the channel quality information (e.g., CQI) that may be determined based on the precoding information.

Some embodiments in accordance with the disclosure may use one or more machine learning models to compress channel information across one or more subbands. For example, a first node may use an encoder model to generate a representation of channel information for multiple subbands by combining (e.g., concatenating) the channel information (e.g., channel quality information) for the multiple subbands into a vector and compressing the vector. A second node may use a decoder to reconstruct the channel information for the multiple subbands from the representation. Depending on the implementation details, compressing channel information across one or more subbands may improve performance, reduce complexity, and/or the like.

Some embodiments in accordance with the disclosure may use one or more decoder models to implement one or more compression schemes for generating a representation of, and/or reporting, channel information which, in some implementations, may include precoding information. Depending on the implementation details, such embodiments may mimic a codebook scheme while providing improved performance and/or flexibility, reduced complexity, and/or the like. In some example embodiments, a pair of machine learning models (e.g., an encoder and a decoder) may be configured and/or trained to generate precoding information from channel information. For example, a first node (e.g., a UE) may apply channel information (e.g., one or more reference signal measurements) to an encoder which may generate, using a compression scheme, a representation (e.g., a codeword) based on the channel information. A second node (e.g., a base station) may apply the representation to a decoder that may construct precoding information (e.g., a precoding matrix) based on the representation. In other example embodiments, a pair of machine learning models may receive any type of information such as channel state information (e.g., channel quality information), precoding information (e.g., a precoding matrix), rank information, and/or the like, as input, apply one or more compression schemes, and provide any type of information that may be used to determine precoding information as output.

Some embodiments that may use one or more decoder models to implement one or more compression schemes, may provide spatial compression, frequency compression, a combination of spatial compression and frequency compression, and/or the like. Depending on the implementation details, a compression scheme may provide separate compression for separate subbands, combined compression for separate subbands, and/or a combination thereof.

For example, a first node (e.g., a UE) may use one or more encoders to spatially compress channel information for one or more subbands to generate one or more representations (e.g., separate representations) of the channel information for the one or more subbands. A second node (e.g., a base station) may use one or more decoders to recover the channel information for the one or more subbands (e.g., using the one or more separate representations).

As another example, a first node may use one or more spatial encoders and one or more frequency encoders to provide separate spatial compression and combined frequency compression for channel information for one or more subbands to generate one or more representations (e.g., a single representation) of the channel information for the one or more subbands. A second node may use one or more spatial decoders and one or more frequency decoders to recover, from the one or more representations, the channel information for the one or more subbands using separate spatial decompression and combined frequency decompression.

As a further example, a first node may use a joint spatial and frequency encoder to provide combined spatial and frequency compression of channel information for one or more subbands to generate a combined representation of the channel information for the one or more subbands. A second node may use a joint spatial and frequency decoder to recover, from the combined representation, the channel information for the one or more subbands.

Thus, in some embodiments, a decoder model may refer to one or more decoder models, an encoder model may refer to one or more encoder models, and a pair of models may refer to one or more decoder models and one or more encoder models.

Depending on the implementation details, embodiments that use one or more decoder models to generate precoding information, and/or other information that may be used to determine precoding information, may provide improved performance and/or flexibility, reduced complexity, and/or the like.

This disclosure encompasses numerous inventive principles relating to artificial intelligence and machine learning for a physical layer of a communication system. These principles may have independent utility and may be embodied individually, and not every embodiment may utilize every principle. Moreover, the principles may also be embodied in various combinations, some of which may amplify the benefits of the individual principles in a synergistic manner.

For purposes of illustration, some embodiments may be described in the context of some specific implementation details and/or applications such as compressing, decompressing, and/or sending channel feedback information between one or more UEs, base stations (e.g., gNBs), and/or the like, in 5G NR systems. However, the inventive principles are not limited to these details and/or applications and may be applied in any other context in which physical layer information may be processed and/or sent between wireless apparatus regardless of whether any of the apparatus may be base stations, UEs, peer devices, and/or the like, and regardless of whether a channel may be a UL channel, a DL channel, a peer channel, and/or the like. Moreover, the inventive principles may be applied to any type of wireless communication systems that may process and/or exchange physical layer information such as other types of cellular networks (e.g., 4G LTE, 6G, and/or any future generations of cellular networks), Bluetooth, Wi-Fi, and/or the like.

Machine Learning Models for Physical Layer

FIG. 1 illustrates an embodiment of a wireless communication apparatus according to the disclosure. The apparatus 101 may include a machine learning model 103 that may receive physical layer information 105 as an input and generate a representation 107 of the physical layer information as an output. In some implementations, the apparatus 101 may transmit the representation 107 of the physical layer information to one or more other apparatus as shown by arrow 109.

The representation 107 of the physical layer information may be a compressed, encoded, encrypted, mapped, or otherwise modified form of the physical layer information 105. Depending on the implementation details, the modification of the physical layer information 105 by the machine learning model 103 to generate the representation 107 of the physical layer information may reduce the resources involved in transmitting the physical layer information 105 between apparatus.

The machine learning model 103 may be implemented with one or more of any types of AI and/or ML models including neural network (e.g., deep neural network), linear regression, logistic regression, decision tree, linear discriminant analysis, naive Bayes, support vector machine, learning vector quantization, and/or the like. The machine learning model 103 may be implemented, for example, with a generation model.

The physical layer information 105 may include any information relating to the operation of a physical layer of a wireless communication apparatus. For example, the physical layer information 105 may include information (e.g., status information, precoding information, etc.) relating to one or more physical layer channels, signals, beams, and/or the like. Examples of physical layer channels may include one or more of a physical broadcast channel (PBCH), physical random access channel (PRACH), physical downlink control channel (PDCCH), physical downlink shared channel (PDSCH), physical uplink shared channel (PUSCH), physical uplink control channel (PUCCH), physical sidelink shared channel (PSSCH), physical sidelink control channel (PSCCH), physical sidelink feedback channel (PSFCH), and/or the like. Examples of physical layer signals may include one or more of a primary synchronization signal (PSS), secondary synchronization signal (SSS), channel state information reference signal (CSI-RS), tracking reference signal (TRS), sounding reference signal (SRS), and/or the like.

Figure 2:
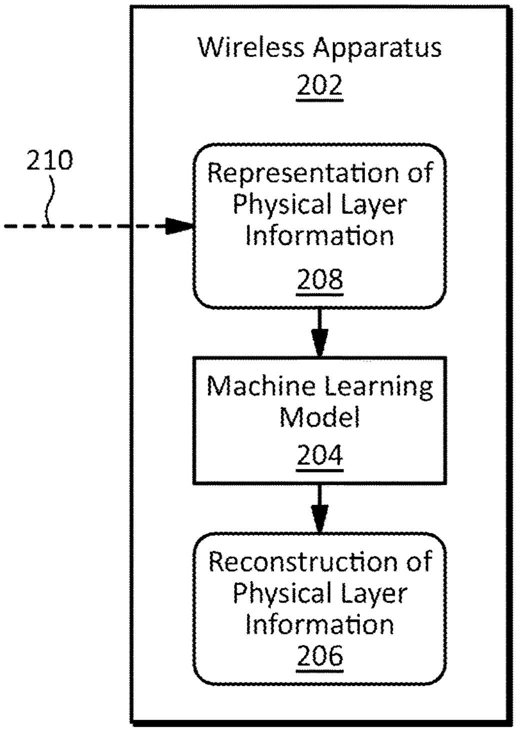
FIG. 2 illustrates another embodiment of a wireless communication apparatus according to the disclosure.

FIG. 2 illustrates another embodiment of a wireless communication apparatus according to the disclosure. The apparatus 202 may include a machine learning model 204 that may receive a representation 208 of physical layer information as an input and generate, as an output, a reconstruction 206 of physical layer information on which the representation 208 may be based. In some implementations, the apparatus 202 may receive the representation 208 of the physical layer information from one or more other apparatus as shown by arrow 210.

The reconstruction 206 (which may be referred to as a reconstructed input) may be the physical layer information on which the representation 208 may be based, or an approximation, estimate, prediction, etc., of the physical layer information on which the representation 208 may be based. The reconstruction 206 may be a decompressed, decoded, decrypted, reverse-mapped, or otherwise modified form of the physical layer information on which the representation 208 may be based.

The machine learning model 204 may be implemented with one or more of any types of AI and/or ML models including neural network (e.g., deep neural network), linear regression, logistic regression, decision tree, linear discriminant analysis, naive Bayes, support vector machine, learning vector quantization, and/or the like. The machine learning model 204 may be implemented, for example, with a reconstruction model.

The reconstructed physical layer information 206 may include any information relating to the operation of a physical layer of a wireless communication apparatus, for example, one or more channels, signals, and/or the like as described above with respect to the embodiment illustrated in FIG. 1.

Although not limited to any specific uses, the wireless communication apparatus 101 and 202 illustrated in FIG. 1 and FIG. 2, respectively, may be used together to facilitate the transmission of physical layer information from between the apparatus. For example, in some embodiments, apparatus 101 may be implemented as a UE in which the model 103 is implemented as a generation model, and apparatus 202 may be implemented as a base station in which the model 204 may be implemented as a reconstruction model. In such an embodiment, the generation model 103 may generate the representation 107 by compressing physical layer information 105 (e.g., relating to a DL channel from the base station to the UE). The UE may transmit the representation 107 to the base station (e.g., using a UL channel). The base station may input the representation (indicated as 208) to the reconstruction model 204 which may generate reconstructed physical layer information 206. The base station may use the reconstructed physical layer information 206, for example, to facilitate DL transmissions from the base station to the UE. Depending on the implementation details, transmitting the physical layer information 105 in the form of a compressed representation 107 may reduce the amount of UL resources associated with transmitting the physical layer information 105.

Two-Model Training

Figure 3:
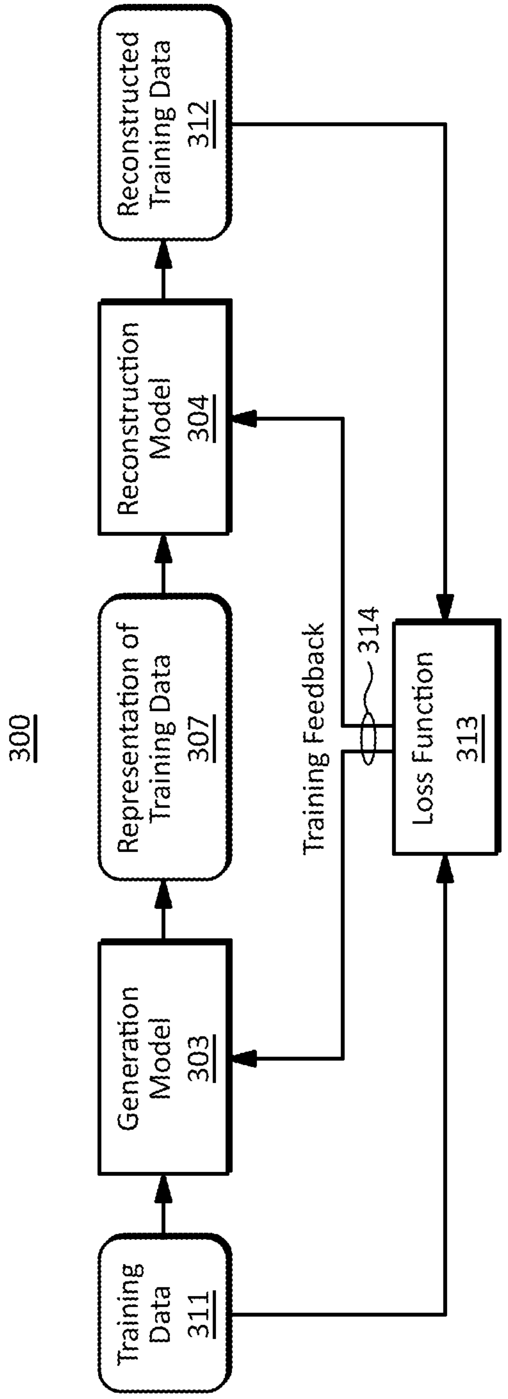
FIG. 3 illustrates an embodiment of a two-model training scheme according to the disclosure.

FIG. 3 illustrates an embodiment of a two-model training scheme according to the disclosure. The embodiment 300 illustrated in FIG. 3 may be used, for example, with one or more of the models illustrated in FIG. 1 and FIG. 2, or any other embodiments disclosed herein.

Referring to FIG. 3, training data 311 may be applied to a generation model 303 which may generate a representation 307 of the training data. A reconstruction model 304 may generate a reconstruction 312 of the training data based on the representation 307 of the training data. In some embodiments, the generation model 303 may include a quantizer to convert the representation 307 to a quantized form (e.g., a bit stream) that may be transmitted through a communication channel. Similarly, in some embodiments, the reconstruction model 304 may include a dequantizer that may convert a quantized representation 307 (e.g., a bit stream) to a form that may be used to generate the reconstructed training data 312.

The generation model 303 and reconstruction model 304 may be trained as a pair, for example, by using a loss function 313 to provide training feedback 314 to the generation model 303 and/or the reconstruction model 304. The training feedback 314 may be implemented, for example, using gradient descent, backpropagation, and/or the like. In embodiments in which one or both of the generation model 303 and reconstruction model 304 may be implemented with one or more neural networks, the training feedback 314 may update one or more values of weights, hyperparameters, and/or the like, in the generation model 303 and/or the reconstruction model 304.

In some embodiments, the loss function 313 (which may be implemented, for example, at least partially with a reconstruction loss) may operate to train the generation model 303 and reconstruction model 304 to generate the reconstructed training data 312 to be close to the original training data 311. This may be accomplished, for example, by reducing or minimizing a loss output of the loss function 313.

For example, if the training data 311 is represented as x, and the reconstructed training data 312 is represented as $\hat{x}$, the generation model 303 may be represented by a function $f(x)$, and the reconstruction model 304 may be represented by a function $g(f(x))$, and thus, $\hat{x}=g(f(x))$. The loss function 313 may be represented as $L(x, \hat{x})$. Thus, in some embodiments, training the pair of models 303 and 304 may involve reducing or minimizing L through the use of training feedback 314.

Although not limited to any specific type of representation 307 of the training data, in some embodiments, the pair of models 303 and 304 may seek to reduce the dimensionality of the representation 307 of the training data relative to the original training data 311. For example, the generation model 303 may be trained to generate a feature vector that may identify or separate one or more features (e.g., latent features) of the training data that may reduce the overhead associated with storing and/or transmitting the representation 307. The reconstruction model 304 may similarly be trained to reconstruct the original training data 311, or an approximation thereof, based on the representation 307.

Once trained, the generation model 303 and/or reconstruction model 304 may be used for inference, for example, in one or both of the wireless communication apparatus 101 and 202 illustrated in FIG. 1 and FIG. 2, respectively, or any other embodiments disclosed herein. Moreover, the two-model training scheme described with respect to FIG. 3 may be used with one or more frameworks for training models and/or transferring models between wireless apparatus as disclosed herein. The training described with respect to FIG. 3 may be performed anywhere, for example, at the wireless apparatus 101, at the wireless apparatus 202, at another location (e.g., at a server remote from both apparatus 101 and 202), or at a combination of any such locations. Moreover, once trained, one or both of the generation model 303 and/or reconstruction model 304 may be transferred to another location for use for inference. In some embodiments, once trained, one of the models may be discarded and the remaining model may be used, for example, as a pair with a separately trained model.

Machine Learning Models for Channel Information Feedback

Figure 4:
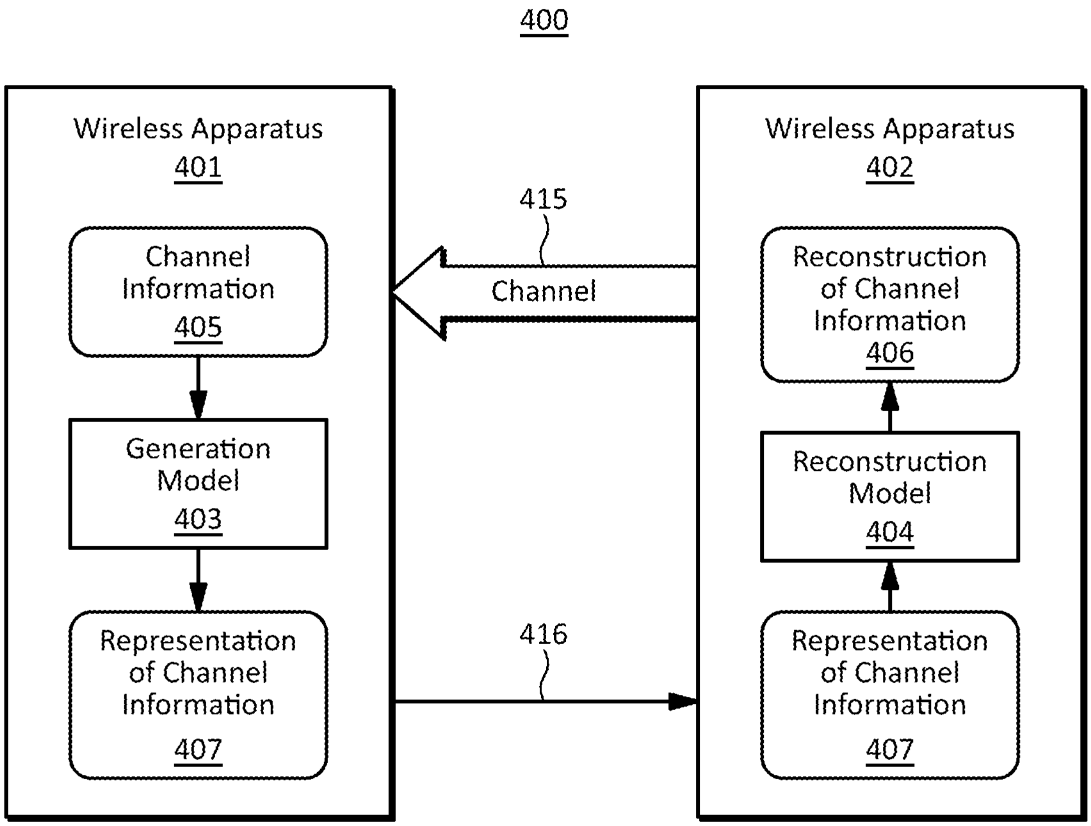
FIG. 4 illustrates an embodiment of a system having a pair of models to provide channel information feedback according to the disclosure.

FIG. 4 illustrates an embodiment of a system having a pair of models to provide channel information feedback according to the disclosure. The system 400 illustrated in FIG. 4 may be used to implement, or may be implemented with, any of the apparatus, models, training schemes, and/or the like disclosed herein, including those illustrated in FIG. 1, FIG. 2, and FIG. 3.

Referring to FIG. 4, the system 400 may include a first wireless apparatus 401 and a second wireless apparatus 402. The first wireless apparatus 401 may be configured to receive transmissions from second wireless apparatus 402 through a channel 415. To improve the effectiveness (e.g., efficiency, reliability, bandwidth, etc.) of the transmissions through the channel 415, the first wireless apparatus 401 may provide feedback to the second wireless apparatus 402 in the form of channel information 405 that may be obtained, for example, by measuring one or more signals (e.g., reference signals) transmitted by the second wireless apparatus 402 through the channel 415.

The first wireless apparatus 401 may use a first machine learning model 403, which in this example may be implemented as a generation model, to generate a representation 407 of the channel information 405. The first wireless apparatus 401 may transmit the representation 407 to the second wireless apparatus 402, for example, using another channel, signal, and/or the like 416. The representation 407 may be a compressed, encoded, encrypted, mapped, or otherwise modified form of the channel information 405. Depending on the implementation details, the modification of the channel information 405 by the machine learning model 403 to generate the representation 407 may reduce the resources involved in transmitting the channel information 405 to the second wireless apparatus 402.

The second wireless apparatus 402 may apply the representation 407 of the channel information to a second machine learning model 404 which in this example may be implemented as a reconstruction model. The reconstruction model 404 may generate a reconstruction 406 of the channel information 405. The reconstruction 406 (which may be referred to as a reconstructed input) may be the channel information 405 on which the representation 407 may be based, or an approximation, estimate, prediction, etc., of the channel information 405. The reconstruction 406 may be a decompressed, decoded, decrypted, reverse-mapped, or otherwise modified form of the channel information 405. The second wireless apparatus 402 may use the channel information 405 to improve the manner in which it transmits to the first wireless apparatus 401 through the channel 415.

The system 400 illustrated in FIG. 4 is not limited to any specific apparatus (e.g., UEs, base stations, peer devices, etc.), applications (e.g., 4G, 5G, 6G, Wi-Fi, Bluetooth, etc.) and/or implementation details. However, for purposes of illustrating some of the inventive principles, some example embodiments may be described in the context of a 5G NR system in which a UE may receive different DL signals from a gNB.

Uplink and Downlink Transmissions

In an NR system, a UE may receive DL transmissions that include a variety of information from a gNB. For example, a UE may receive user data from the gNB in a specific configuration of time and frequency resources referred to as a Physical Downlink Shared Channel (PDSCH). A Multiple Access (MAC) layer at the gNB may provide user data that is intended to be delivered to the corresponding MAC layer at the UE side. The Physical (PHY) layer of the UE may receive the physical signal received on the PDSCH and apply it as an input to a PDSCH processing chain, the output of which may be fed as an input to the MAC layer at the UE. Similarly, the UE may receive control data from the gNB using a Physical Downlink Control Channel (PDCCH). The control data may be referred to as Downlink Control Information (DCI) and may be converted to a PDCCH signal through a PDCCH processing chain on the gNB side.

A UE may send UL signals to the gNB to convey user data and control information using a Physical Uplink Shared Channel (PUSCH) and a Physical Uplink Control Channel (PUCCH), respectively. The PUSCH may be used by the UE MAC layer to deliver data to the gNB. The PUCCH may be used to convey control information, which may be referred to as Uplink Control Information (UCI), which may be converted to PUCCH signals through a PUCCH processing chain at the UE side.

Channel State Information

In an NR system, a UE may include a Channel State Information (CSI) generator that may calculate a channel quality indicator (CQI), a precoding matrix indicator (PMI), a CSI reference signal resource indicator (CRI), and/or a rank indication (RI) any or all of which may be reported to one or more gNBs serving the UE. A CQI may be associated with a modulation and coding scheme (MCS) for adaptive modulation and coding and/or frequency selective resource allocation, a PMI may be used for a channel-dependent closed-loop multiple-input multiple-output system, and an RI may correspond to the number of useful transmission layers.

In an NR system, CSI generation may be performed based on a CSI reference signal (CSI-RS) transmitted by the gNB. A UE may use the CSI-RS to measure downlink channel conditions and generate CSI, for example, by performing a channel estimation and/or a noise variance estimation based on measurements of the CSI-RS signal.

In an NR system, CSI may be reported to a serving gNB using a Type-I codebook which may provide implicit CSI feedback to a gNB in the form of an index that may point to a predefined PMI. Alternatively, or additionally, CSI may be reported to a serving gNB using a Type-II codebook which may provide explicit CSI feedback in which a UE may determine one or more dominant eigenvectors or singular vectors based on DL channel conditions. The UE may then use the dominant eigenvectors or singular vectors to derive a PMI that may be fed back to the gNB which may use the PMI for beamforming in the DL channel.

The use of codebooks may provide adequate performance, for example, in embodiments with a limited number of antenna ports and/or users. However, in systems with larger numbers of antenna ports and/or users (e.g., multiple-input multiple-output (MIMO) systems), and particularly with the use of frequency division duplexing (FDD), the relatively low resolution of a Type-I codebook may not provide CSI feedback with adequate accuracy. Moreover, the use of a Type-II codebook may still involve the transmission of a significant amount of overhead data on a UL channel.

Depending on the implementation details, some embodiments of channel information feedback schemes based on machine learning according to the disclosure may enable a UE to send full CSI information to a gNB while reducing the overhead associated with the UL transmission to the gNB. Moreover, the inventive principles are not limited to a UE sending CSI to a gNB but may be applied to any situation in which a first apparatus may send channel information feedback to a second apparatus (e.g., reporting channel conditions for uplink channels from a UE to a gNB, reporting channel conditions for sidelink channels between UEs, and/or the like).

EXAMPLE EMBODIMENTS

Figure 5:
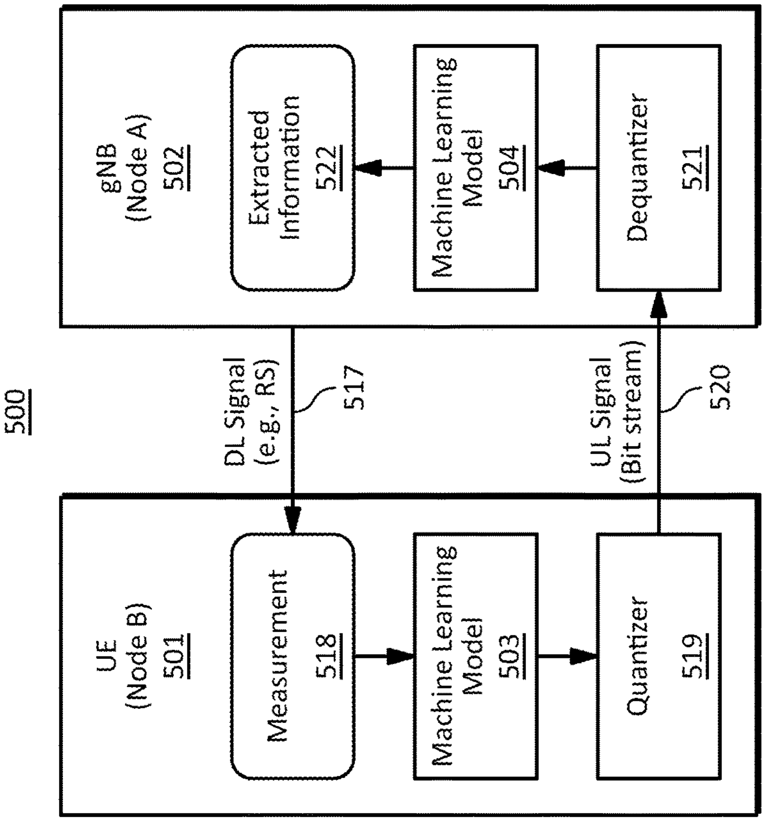
FIG. 5 illustrates an example embodiment of a system for reporting downlink physical layer information according to the disclosure.

FIG. 5 illustrates an example embodiment of a system for reporting downlink physical layer information according to the disclosure. The system 500 may include a UE 501 (which may be designated as Node B) and a gNB 502 (which may be designated as Node A). The gNB 502 may send a transmission of a DL signal 517 (e.g., a reference signal (RS) transmission) to the UE 501 which may extract a measurement 518 from the transmission. The UE 501 may include a model 503 that may be configured, for example, as an encoder to encode the measurement 518 into a feature vector relating to the DL physical layer. The encoded measurement may then be quantized by a quantizer 519 and transmitted back to the gNB 502 as a UL signal 520 (e.g., a bitstream). In some embodiments, the description of a model at a node may also include a quantizer and/or dequantizer description, for example, a function that may map channel information (e.g., a real CSI codeword) at the output of an encoder model to quantized values or a bit stream, and vice versa at a decoder model at the other node. The gNB 502 may apply the received UL signal 520 to a dequantizer 521 to generate an equivalent feature vector which may be fed to a model 504 to extract information 522 (e.g., necessary or optional information) relating to the DL physical layer.

Figure 6:
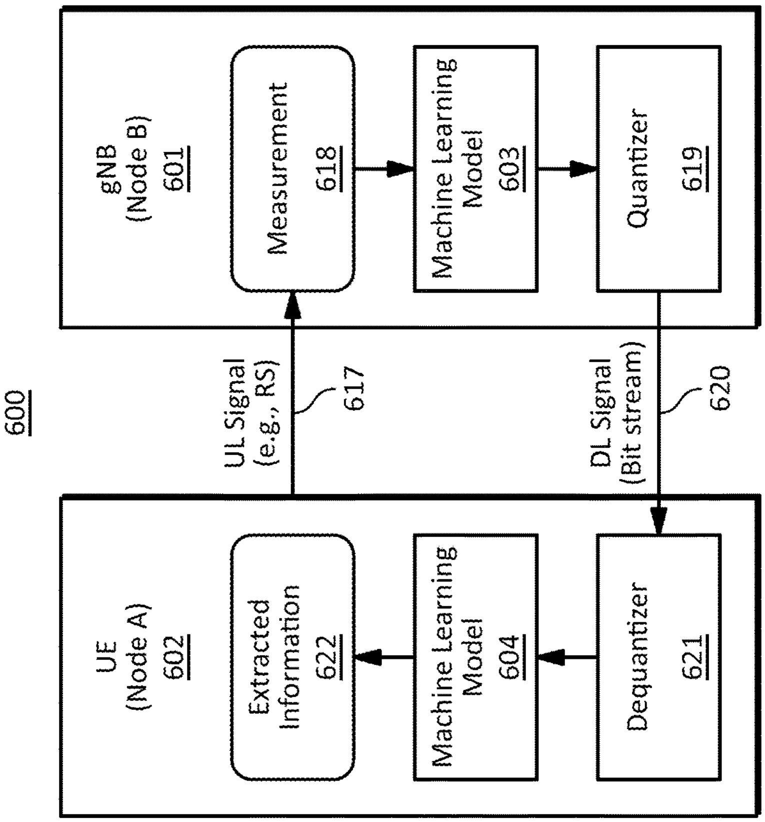
FIG. 6 illustrates an example embodiment of a system for reporting uplink physical layer information according to the disclosure.

FIG. 6 illustrates an example embodiment of a system for reporting uplink physical layer information according to the disclosure. In some aspects, the system 600 illustrated in FIG. 6 may be similar to the system 500 illustrated in FIG. 5, but the system 600 may be configured to report uplink physical layer information instead of downlink physical layer information.

Specifically, the system 600 may include a gNB 601 (which may be designated as Node B) and a UE 602 (which may be designated as Node A). The UE 602 may send a transmission of a UL signal 617 (e.g., a reference signal (RS) transmission) to the gNB 601 which may extract a measurement 618 from the transmission. The gNB 601 may include a model 603 that may be configured, for example, as an encoder to encode the measurement 618 into a feature vector relating to the UL physical layer. The encoded measurement may then be quantized by a quantizer 619 and transmitted back to the UE 602 as a DL signal 620 (e.g., a bitstream). The UE 602 may apply the received DL signal 620 to a dequantizer 621 to generate an equivalent feature vector which may be fed to a model 604 to extract information 622 (e.g., necessary or optional information) relating to the UL physical layer.

Figure 7:
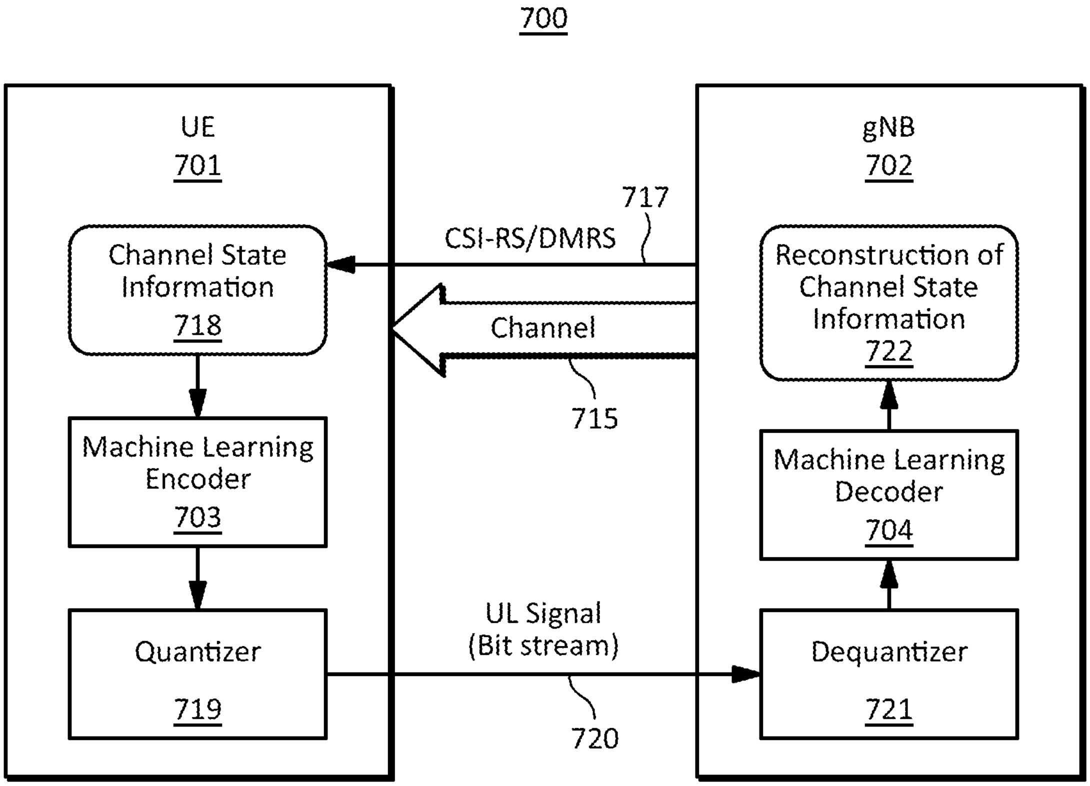
FIG. 7 illustrates an example embodiment of a system for reporting downlink physical layer channel state information according to the disclosure.

FIG. 7 illustrates an example embodiment of a system for reporting downlink physical layer channel state information according to the disclosure. Depending on the implementation details, the system 700 illustrated in FIG. 7 may enable a gNB or other base station to retrieve full CSI information from a UE (in contrast, for example, to a codebook based pointer, precoding matrix indicator, and/or the like) while using ML models to compress the CSI (e.g., into a relatively low number of bits), thereby reducing the uplink resource overhead involved in sending the CSI.

The system 700 may include a UE 701 and a gNB 702. The gNB 702 may transmit a DL reference signal 717 such as a CSI-RS or demodulation reference signal (DMRS) that may enable the UE 701 to determine CSI 718 for a DL channel 715. The UE 701 may include an ML model 703 that may be configured as an encoder to encode the CSI 718 into a feature vector. The UE 701 may also include a quantizer 719 that may quantize the feature vector into a stream of bits that may be transmitted to the gNB 702 using a UL signal 720. The gNB 702 may include a dequantizer 721 that may reconstruct the feature vector from the stream of bits. The feature vector may then be fed into an ML model 704 that may be configured as a decoder to reconstruct an estimate 722 of the CSI 718.

In some embodiments, a performance metric $f(H, \hat{H})$ may be used to evaluate the accuracy of the design, configuration, and/or training of the encoder model 703, decoder model 704, quantizer 719, and/or dequantizer 721. For example, the performance metric $f(H, \hat{H})$ may be implemented as a measure of the error between channel estimates as follows:

$$f(H, \hat{H}) = \frac{\|H - \hat{H}\|^2}{\|H\|^2} \tag{1}$$

where H and $\hat{H}$ may represent the channel estimates (e.g., CSI) at the UE 701 and gNB 702, respectively. Such performance metrics may be useful, for example, to evaluate the accuracy of channel state information extracted by the gNB 702.

Additionally, or alternatively, the system 700 may be configured to enable the UE 701 to use the DL reference signal 717 to determine a precoding matrix based on the current channel conditions. The precoding matrix may then be encoded into a feature by encoder model 703, quantized by quantizer 719, and transmitted to the gNB 702 using the UL signal 720. At the gNB 702, the dequantizer 721 may recover the feature vector which may be applied to the decoder model 704 to reconstruct an estimate of the precoding matrix. For example, for a channel realization H, a suitable precoding matrix may be implemented as a set of singular vectors S using Singular Value Decomposition (SVD) of H which may be given as $H=S\Sigma D$ where $\Sigma$ may be a diagonal matrix and D may be a unitary matrix. In such an embodiment, the encoder model 703, decoder model 704, quantizer 719, and/or dequantizer 721 may be configured to enable the gNB 702 to extract a set of singular vectors (e.g., a matrix) S, and a performance metric may be implemented accordingly. Although the embodiment illustrated in FIG. 7 reports downlink physical layer information, other embodiments may be configured to report uplink physical layer information, sidelink physical information, and/or the like using similar principles according to the disclosure.

Model Development, Training, and Operation

Artificial intelligence (AI), machine learning (ML), deep learning, and/or the like (any or all of which, as mentioned above, may be referred to individually and/or collectively as machine learning or ML) may provide techniques for inferring one or more functions (e.g., complex functions) of data according to the disclosure. In a machine learning process, samples of data may be provided to an ML model which, in turn, may apply one of various machine learning techniques to learn how to determine the one or more functions using the provided data samples. For example, a machine learning process may allow an ML model to learn a function $f(x)$ of a data sample input x. As mentioned above, an ML model may also be referred to as a model.

In some embodiments, a machine learning process (which may also be referred to as a development process) may proceed in one or more stages (which may also be referred to as phases) such as training, validation, testing, and/or inference (which may also be referred to as an application stage). Some embodiments may omit one or more of these stages and/or include one or more additional stages. In some embodiments, all or a portion of one or more stages may be combined into one stage, and a stage may be split into multiple stages. Moreover, the order of the stages or portions thereof may be changed.

In a training stage, a model may be trained to perform one or more target tasks. A training stage may involve the use of a training data set that may include i) data samples, and ii) an outcome of the function $f(x)$ for the samples (e.g., each sample) in the training data set. In a training stage, one or more training techniques may enable a model to learn an approximate relation (e.g., an approximate function) that may behave as, or closely follow, the function $f(x)$.

In a validation stage, the model may be tested (e.g., after performing an initial training) to assess the suitability of the trained model for one or more target tasks. A model may undergo further training if the validation result is not satisfactory. The training stage may be considered to be successfully completed if a validation stage provides successful results.

In a testing stage, a trained model may be tested to assess the suitability of the trained ML model for the one or more target tasks. In some embodiments, a trained model may not proceed to a testing stage unless training is completed and validation provides successful results.

In an inference stage, the trained model is used (e.g., in real-world application) to perform the one or more target tasks.

In a testing and/or inference stage, a model may use a learned approximate function that has been obtained via a training phase to determine the function value $f(x)$ of other data samples which can be different than the samples in the training phase.

In some embodiments, the success and/or performance of a machine learning process may involve the use of a sufficiently large training data set that may contain sufficient information about the function $f(x)$ and thus enables the model to obtain an acceptably close approximation of the function $f(x)$ through the training stage.

Figure 8:
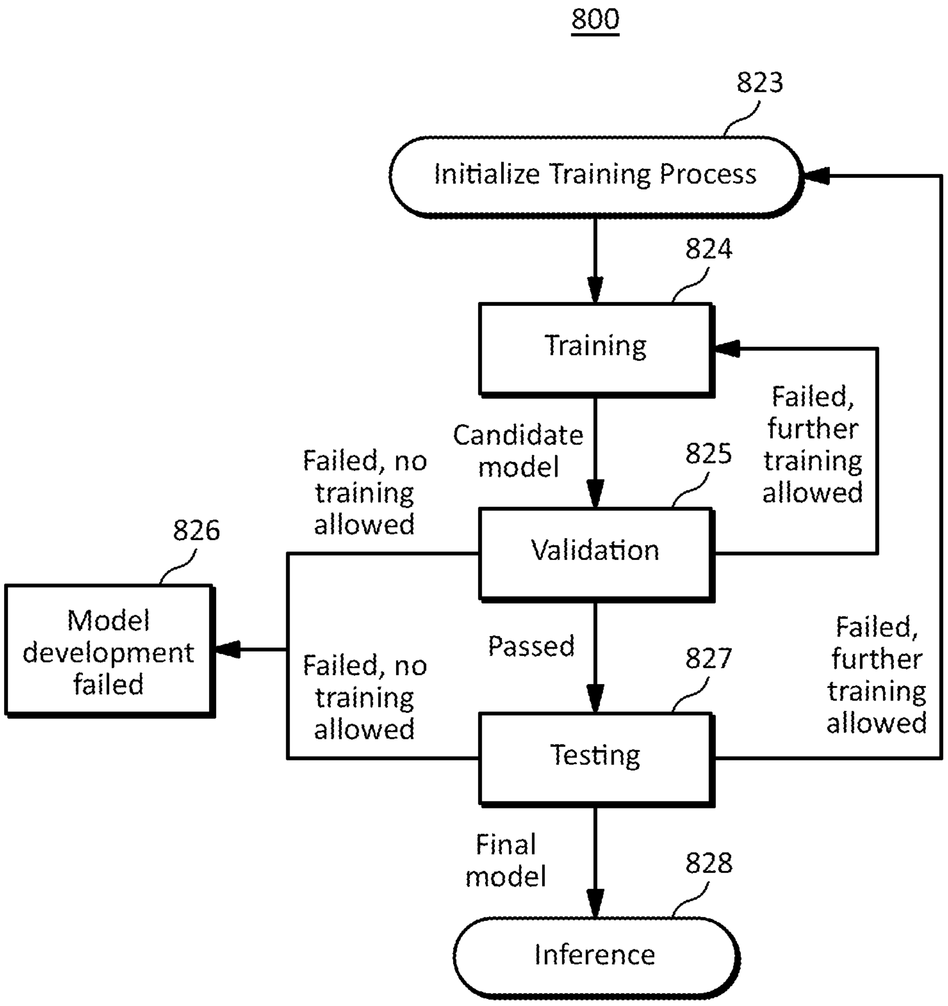
FIG. 8 illustrates an embodiment of a learning process for a machine learning model according to the disclosure.

FIG. 8 illustrates an embodiment of a learning process for a machine learning model according to the disclosure. The process 800 may begin at operation 823 at which a training process may be initialized. For example, the structure of the model may be determined, values (e.g., neural network weights, hyperparameters, etc.) of the model may be initialized, a training data set with an adequate number of samples may be constructed, and/or the like.

At operation 824, the initialized model may be trained using the training data set to determine a configuration of a candidate trained model, for example, by updating values of neural network weights, hyperparameters, etc., using gradient descent, backpropagation, and/or the like.

In some embodiments, there may be an interrelationship between the construction of a training data set and the training stage. For example, the training stage may involve a relatively large duration of time for completion, and the duration can be dependent on the number of samples in the training data set. The duration may depend, in turn, on a type of training. For example, for full training and/or initial training, the model may be initialized and training may be performed using a large data set that may consist of many samples (e.g., samples that may not have been used previously for training the model). As another example, for partial training and/or update training, the model may be been previously trained (or partially trained), and an event (e.g., obtaining new data samples, performance degradation of the model, a model update event, etc.) may prompt a modification or adaptation of the model. In the case of partial training and/or update training, the model may be trained using a modified data set that may be different from the large training data set used for full training and/or initial training. For example, the modified training data set may be a subset of the full data set used for initial training, a set of new data samples that have been newly acquired, or a combination thereof.

At operation 825, the trained candidate model may be validated. In some embodiments, the validation stage 825 may be performed iteratively with the training stage 824. For example, if the candidate model fails the validation stage 825, it may return to the training stage 824 which may generate a new candidate model. In some embodiments, different criterion may be established for determining validation success or failure (e.g., classification accuracy, minimum mean square error (MMSE), and/or the like).

In some embodiments, a failed candidate model may not be allowed to return to the training stage 824 (for example, after failing a number of times that exceeds a threshold or if a performance criteria does not pass a threshold over a particular duration or a particular number of validation steps), and the method may terminate at to operation 826. However, if the performance of the candidate model using validation data is determined to be acceptable (e.g., based on the criteria for determining success or failure), the validation may be considered successful, and the trained candidate model may be passed to a testing stage at operation 827.

At operation 827, the performance of a trained model candidate that has passed the validation stage may be assessed. Criteria for declaring successful testing and/or failure of a model during the testing stage of development may be similar to the criteria used in the validation stage. However, one or more parameters used with the criteria during the testing stage (e.g., a number of steps, a performance threshold, etc.) may or may not be different from those used in the validation stage.

If testing is successful, the model may be designated as a final model, and the process may proceed to operation 828. In some embodiments, if the model fails the testing stage, the process may return to the training stage at operation 824 for further training. In some embodiments, however, further training may not be allowed (for example, based on criteria similar to those used during the validation stage 825), and the process may terminate at operation 826.

Model Training and Deployment Frameworks

Some embodiments in accordance with the disclosure may implement one or more frameworks for training and/or deploying models. In some embodiments of frameworks disclosed herein, one or more models trained and/or developed by a node may be tested against one or more reference models for the node, for example, to assess the compliance of the model with one or more potential test cases that may be specified for a respective application.

In any of the embodiments of frameworks disclosed herein, a quantizer function may be differentiable with a derivative value of essentially zero (e.g., with a probability of 1) throughout some or all of a quantizer range (e.g., essentially throughout the entire range). Depending on the implementation details, this may result in backpropagation that may provide little or no updating encoder weights. Thus, in some embodiments, a quantizer function may be approximated with a differentiable function (e.g., a reference differentiable quantizer function) that may be referred to as $f_{quantizer,approx}(x)$ in a training phase, while the actual quantizer function may be used in an inference phase. Similarly, a dequantizer function may be approximated with a differentiable function (e.g., a reference differentiable dequantizer function) that may be referred to as $f_{dequantizer,approx}(x)$ in a training phase, while the actual dequantizer function may be used in an inference phase. In some embodiments, a quantizer or dequantizer function used in conjunction with a model may be considered part of a complete description of the corresponding model and may be transferred along with, and as part of, the model. Thus, with any of the frameworks disclosed herein, if a first node shares a trained model with a second node (e.g., if Node A trains a pair of models Model A and Model B, then sends the trained Model B to Node B), the first model may also share one or both of the approximated quantizer function $f_{quantizer,approx}(x)$ and/or approximated dequantizer function $f_{dequantizer,approx}(x)$ with the second node, for example, via RRC signalling.

Although the frameworks disclosed herein are not limited to any specific applications and/or implementation details, in some embodiments, and depending on the implementation details, the frameworks may be used to train and/or test models that may reduce CSI feedback overhead.

Joint Training Frameworks

In some embodiments, a pair of models (e.g., Model A and Model B) may be jointly trained by one of two nodes (Node A or Node B), and the trained model for the non-training node may be conveyed to the non-training node (e.g., if joint training is performed by Node A, the trained Model B may be conveyed to Node B) to use for inference. For example, in the context of CSI compression, a base station may perform joint training of a pair of encoder and decoder models, and then convey the encoder model to the UE. An encoder model may also be referred to as an encoder, and a decoder model may also be referred to as a decoder.

In some embodiments of a joint training framework, further training (e.g., fine tuning) of one or both of the trained models may be performed by the nodes at which the models may be used for inference (e.g., to improve or optimize one or both of the models). In some embodiments, further training may be based on online data that may be obtained by one or more of the nodes, for example, during on-going communication.

In some embodiments of a joint training framework, the training node may train one or both models using a corresponding quantizer and/or dequantizer function (e.g., an approximated and/or differentiable quantizer and/or dequantizer function). A node that receives a trained model may also receive and use the corresponding quantizer and/or dequantizer function for further training, validation, testing, inference, and/or the like.

In some implementations, joint training of models by a node may result in models that may be jointly matched to a target task, and thus, may provide improved or optimized performance. Depending on the implementation details, such performance improvement may outweigh any communication overhead associated with conveying a model to a different node, and/or any mismatch between models and/or nodes that be caused, for example, by joint training at one node that may be produced by a different manufacturer than the other node.

In a variation of a joint training framework, one node, for example, a base station, may jointly train a pair of encoder and decoder models. The encoder and decoder pair may be trained, for example, using reference differentiable quantizer and dequantizer functions as described above. The base station may then share the trained decoder model with the UE, e.g., via RRC signaling. However, the base station may or may not share the trained encoder model with the UE. If the base station shares the trained encoder model with the UE, the UE may use the trained encoder model as a reference encoder model. If the base station does not share the trained encoder model with the UE, the UE may establish a reference encoder model based, for example, on randomly initialized weights, on weights that may be chosen for the UE implementation, or on any other basis.

The UE may then train the reference encoder model using the trained decoder model it received from the base station. The reference encoder model may be trained online (which may refer to training that may be performed during operation). In some implementations, online training may be performed on the fly (which may refer to training performed using training data (e.g., channel estimates H) that may be collected during operation). Thus, the UE may train the reference encoder model using channel estimates H that may be collected over time. The collected channel estimates may be used as a new training data set, for example, at certain points during training. Moreover, the collected channel estimates H may also be stored for future online and/or offline training by the UE or any other apparatus.

The UE may then use the trained encoder model for inference. The UE may also share the trained encoder model with the base station. This training procedure may continue as more training samples, e.g., channel estimates H, are collected and used by the UE for training.

Figure 9:
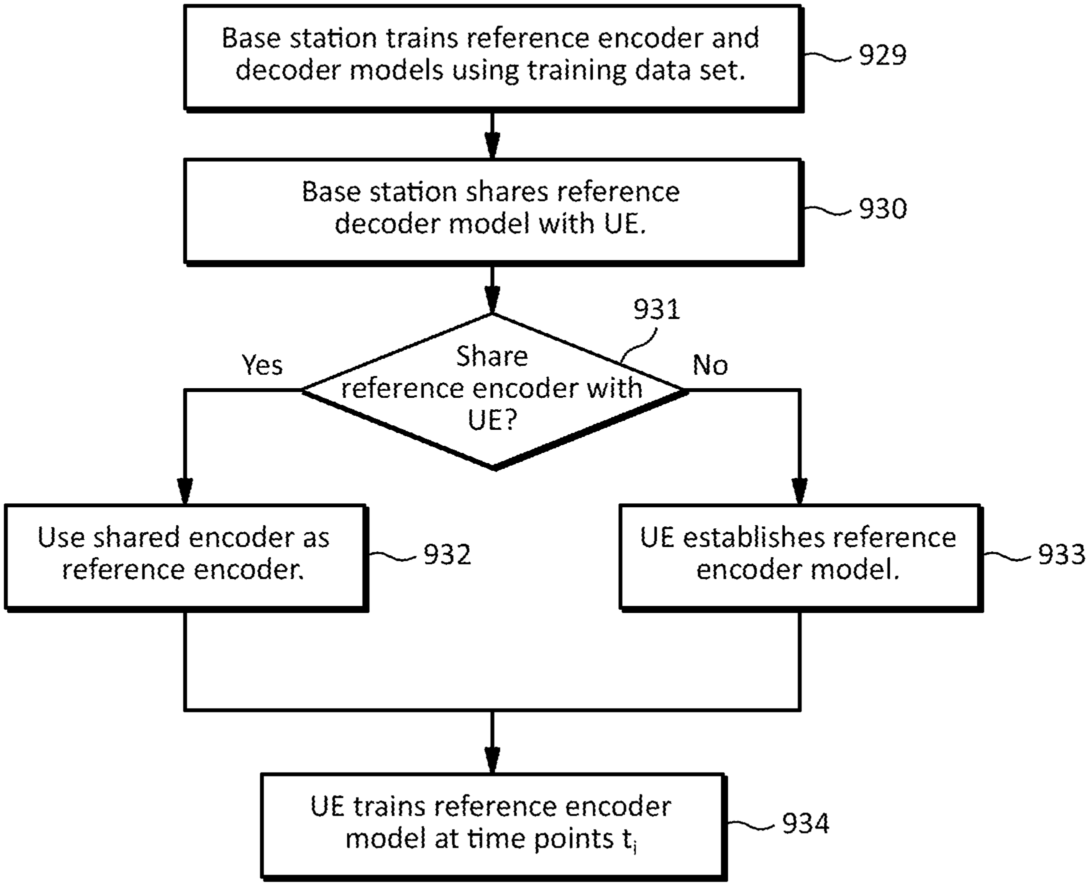
FIG. 9 illustrates an example embodiment of a method for joint training of a pair of encoder and decoder models according to the disclosure.

FIG. 9 illustrates an example embodiment of a method for joint training of a pair of encoder and decoder models according to the disclosure. At operation 929, a base station may jointly train a pair of reference encoder and decoder models using a training data set which may be referred to as $Enc_{ref}$ and $Dec_{ref}$. At operation 930, the base station may share the reference decoder model $Dec_{ref}$ with a UE. At operation 931, the base station decides whether to share the reference encoder model with the UE. If the base station shares the reference encoder with the UE, then at operation 932, the UE may use the shared reference encoder as the reference encoder for training. If the base station does not share the reference encoder with the UE, then at operation 933, the UE may establish a reference encoder model, for example, using random weights, using weights based on the UE implementation, and/or the like. At operation 934, the UE may train the reference encoder model at time points $t_i$. [UE trains reference encoder model at time points $t_i$.] The time points $t_i$ may be determined, for example, as times at which the UE has performed and collected sufficient channel estimates since a previous time point. This may be implemented, for example, as shown in Algorithm 1 where, for each time point $t_i$, the UE may have collected a new online training set Si on the fly, where Si may include channel estimates from $t_{i-1}$ to $t_i$, and N may be a maximum number of online trainings at the UE side. In some implementations, after completing Algorithm 1, the UE may share the trained encoder model with the base station.

| Algorithm 1 |
| --- |
| 1 For i=1, ... N |
| 2 UE trains encoder model with training set $S_i$ using reference encoder model as initial weights |
| 3 UE sets the reference encoder model to the trained encoder model |
| 4 UE constructs new training data set containing channel estimates from time $t_{i-1}$ to $t_i$ |

Any of the training and deployment frameworks disclosed herein may be used with any types and/or combinations of apparatus and with any type of model and/or physical layer information. For example, even though, in the embodiment illustrated in FIG. 8, the base station performs the initial joint training and the encoder and decoder may be trained and used with channel estimates, in other embodiments the joint training may be performed by a UE or any other apparatus and the models may be trained and used with precoding matrices or any other type of physical layer information.

In some embodiments, a node such as a UE or base station may collect new training data within a window (e.g., an explicit time and/or frequency window). The collected data may be used, for example, to construct a training data set that the node may use to train a model. A window may be configured with a start and/or end time that may be determined, for example, by a base station. In some embodiments, a timeline used to determine a data collection window may be measured, for example, from one or more CSI-RS resources.

Alternatively, or additionally, online training may be performed as follows. A first node base station) may have a first model, and second node may have second model that may form a pair with the first model. In some embodiments, the first and second nodes may operate in a connected mode (e.g., an RRC connected mode). One or both of the nodes may have obtained their model through sharing by the other node. In this example, one of the nodes may be a base station and the other node may be a UE.

The base station may configure a UE with a predetermined online training data set, and both nodes may use the predetermined online training data set to update their respective models. When a node updates its own model, the other model at the other node may be assumed to be frozen. In some embodiments, one or more online training data sets may be specified (e.g., as part of a specification and/or provided to the UE and/or base station by a third node). Once the first node updates its first model (e.g., an encoder or decoder), it may share the updated first model with the second node, and the second node may begin training its second model assuming the first model is frozen. The models may continue to alternate between periodically training and freezing their models, for example, until an end time is reached.

Although the embodiments disclosed above may be described in a context in which a UE may update and use an encoder, in some embodiments with online training, both a UE and a base station (or any two other nodes with a pair of models such as two UEs configured for sideband communications) may collect new training data and use it to update either their own model (e.g., an encoder or a decoder), or both models (e.g., both an encoder and decoder which may be configured, for example, as an auto-encoder).

In some embodiments, a first node may share newly collected training data (e.g., channel matrices) with a second node by transmitting the training data as data or control information. For example, a UE may generate a binary representation of one or more channel matrices and transmit the representation using a PUSCH or PUCCH following the normal procedures for uplink transmission, i.e. encoding, modulation, etc.

Alternatively, or additionally, a UE may use its encoder as currently trained to encode a channel matrix it has obtained. The UE may transmit the encoded channel matrix, which may be referred to as a CSI codeword, to a base station. The base station may then use its currently trained decoder to recover the channel matrix. The base station may then include the recovered channel matrix in a new training data set that may be used for further (e.g., online) training at the base station.

In some embodiments, in addition to exchanging training data between nodes, one or more nodes may also share their latest trained models (e.g., encoders and/or decoders) with another node. Sharing of training data and/or models may be performed at intervals (e.g., a model may be transmitted when it is updated) that may manage the amount of communication overhead involved in such sharing.

In a framework with online training of models, a node may use a memory buffer to store collected physical layer information (e.g., CSI matrices from time from $t_{i-1}$ to time $t_i$). Depending on the implementation details, a node may collect some or all of a new training data set before may begin using the new training data to update a model. However, if a node uses a dedicated memory buffer to store a training data set, and the interval between time $t_{i-1}$ and time $t_i$ exceeds a certain value, the amount of memory involved with storing the training data may exceed the available buffer size as the number of CSI-RSs in the time window may become too large. Also, even if the interval between time $t_{i-1}$ and time $t_i$ is generally short enough to prevent a buffer overflow, a node may encounter some reference signals with relatively short periodicities (e.g., a relatively large number of reference signals (e.g., CSI-RSs) may be configured in the window), and thus, the CSI matrices collected based on the reference signals may exceed the available dedicated memory buffer.

In some embodiments, a node may declare a data buffering capability that may be related, for example, to the size of a training data set constructed from collected training data. Depending on the implementation details, this may reduce or prevent problems with exceeding the capacity of a memory buffer for new training data. For example, a node may declare or be assigned a predetermined memory buffer capability based on (1) a time gap (e.g., a maximum time gap) for obtaining training data and/or updating a model based on the obtained training data; (2) a maximum number of reference signals (e.g., CSI-RSs) within a time window the node is expected to use for constructing a training set; or (3) the shorted periodicity of reference signals (e.g., CSI-RSs) used for constructing the training data set. A situation in which a node may be configured with one or more reference signals and/or a time window that may violate the predetermined memory buffer capability may be considered an error case.

Alternatively, or additionally, a default behavior may be defined when a violation of the predetermined memory buffer capability of a node occurs. For example, if a configuration of reference signals and/or a time window violates a node's memory buffer capacity, the node may use only store and/or use a subset of the collected training data to update a model. For example, if the UE reports a maximum of N_max CSI-RSs within a window, and a gNB configures a larger number N_(CSI-RS) of CSI-RSs within the window, the UE may only use N_max CSI-RSs from the N_(CSI-RS) CSI-RSs to update the model. How the UE selects which CSI-RSs to use may be determined based on the UE implementation and/or according to one or more configured and/or fixed rules (e.g. the UE may use the latest N_max resources among the N_(CSI-RS) resources).

In some embodiments, a buffer size for collected training data may be based on a node implementation, for example, without involving a specification. For example, if a UE's training data buffer overflows, the UE may stop storing newly collected data (e.g., matrices) and proceed to update the model with the data in the buffer. In some embodiments, the UE may flush the buffer once the model is updated, then begin collecting new training data again.

In some embodiments, UE may use a shared buffer to store new training data. Examples of shared buffers may include one or more buffers already used for storing other channels, e.g., a PDSCH buffer, a master CCE LLR buffer, and/or the like. In such an embodiment, the shared buffer space may be used based on availability as it may already be fully or partially occupied based on other dedicated uses. In some embodiments, buffering of collected training data may be based on the node implementation.

Training Frameworks with Reference Models

In some frameworks according to the disclosure, a reference model may be established as Model A for Node A, and Node B may then train a Model B using the reference model as Model A (e.g., assuming Node A will use the reference model as Model A for inference). Node A may then use the reference model as Model A without further training, or Node A may proceed to train the reference model to use as Model A. In some embodiments, one or multiple Model As may be provided and/or specified for a Node A, and a Node B may train one or more Model Bs using a Model A at Node B that may be assumed to be one or multiple of the reference models for Node A. For example, Node B may train a first version of Model B using a Model A that is assumed to be one reference model specified for Model A. Node B may also train a second version of Model B assuming Model A to be another reference model and so on.

References models may be established, for example, through specifications, signalling (e.g., RRC signalling from a base station to a UE after a UE is RRC-connected), and/or the like.

In some embodiments, Node B may inform Node A of which reference models it has selected to use to train the different versions of Model A. In cases in which there is only one reference model available for Model A, no communication may be involved because the reference model can be known implicitly. Node B may inform Node A of one reference model among the multiple reference models available for training versions of Model B; this model may correspond, for example, to the reference model that provided the best performance. Alternatively, or additionally, Node B may inform Node A of a subset of the reference models among the multiple reference models; this subset may include a collection of the best-performing reference models.

Regardless of any signalling from Node B to Node A. Node A may or may not indicate to Node B which reference model it has selected. Indicating the reference model can be useful, for example, to establish a common understanding between Node A and Node B, whereas not indicating the reference model may reduce signalling overhead. In an implementation with multiple reference models, if the subset of best performing models includes only one reference model, (e.g., only one reference model was indicated from Node B to Node A as the best performing reference model), then Node A may not provide an indication to Node B because the selection by Node A may be implicitly known by Node B.

Once a reference model is established for Node A, Node A may either use the reference model as Model A or proceed to train the reference model. Depending on the implementation details, using the reference model as Model A (e.g., with little or no further training or tuning) may provide a relatively high level of matching (e.g., the best matching) between the two models because Node B may train Model B assuming the use of the reference model for Model A. If there are multiple reference models used by Node B to train different versions of Model B, then Node A may use a reference model corresponding to any of the trained versions of Model B; this may involve establishing a establish a common understanding between Node A and Node B of which of the trained versions of Model B will be used (e.g., Node B may communicate to Node A which trained version of Model B is used, or Node A may inform Node B of which model to use).

Rather than using the reference model as Model A without further training, Node A may proceed to train Model A. This may be beneficial, for example, if the reference model is not suitable for the current network status (e.g., the wireless environment if the models are to be used for CSI compression and decompression). Thus, allowing Node A to further train (e.g., tune or optimize) Model A may enable the models to match the current network status. However, changing Model A from the reference model that was assumed by Node B when training Model B may lead to a potential mismatch between the two models which, in turn, may lead to a degradation of performance.

In some embodiments, Model A may be trained to overcome this potential mismatch. For example, to train Model A, Node B may send Model B to Node A so the training of Model A may be based on the actual model used by Node B as Model B.

If there are multiple trained versions of Model B, Node B may communicate a subset of the trained versions of Model B, and Node A may train multiple corresponding Model As for the communicated versions of Model B. In such an embodiment, Model A and Model B may communicate to establish a common understanding of which pair of Model A and Model B may be selected for use. Depending on the implementation details, sharing multiple versions of Model A may allow Node A and/or Node B to improve (e.g., optimize) performance by selecting the best pair of Model A and Model B, among the communicated models, which may be best-performing. Alternatively, to reduce communication overhead, Node B may communicate one of the multiple versions of Model B, and Node A may train a Model A corresponding to the communicated version of Model B.

Alternatively, or additionally, if Node A proceeds to train Model A. Node A may train a trial version of Model B to mimic the actual Model B used by Node B. The level of similarity between the trial Model B and the actual Model B may depend on the design and/or architecture of Model B, the training data set used to train the trial version of Model B, and/or the training procedure (e.g., initializations of weights, hyperparameters, etc.) use to train the trial version of Model B. If there are multiple trained versions of Model B that have been trained by Node B, Node A may train multiple corresponding trial versions of Model B. Alternatively, Node A may train multiple Model As using a trial version of Model B corresponding to each of the available reference models for Model A; this may be particularly useful because it may enable Node A to train Model A prior to being informed by Node B of which reference model or models Node B has selected. In such an embodiment, Model A and Model B may communicate to establish a common understanding of which pair of Model A and Model B may be selected for use.

To further reduce the mismatch between a trial Model B and an actual Model B, Node B may share some auxiliary information with Node A. Depending on the implementation details, sharing auxiliary information may help Node A train a trial Model B in a manner that would produce a trial Model B similar to the actual Model B. Examples of auxiliary information may include initialization values (e.g., random seeds used by Node B for training an actual Model B, initial network weights, etc.), one or more optimization algorithms, one or more algorithms used for feature selection, one or more algorithms used for data preprocessing, information on the type of neural network (e.g., a recurrent neural network (RNN), a convolutional neural network (CNN), etc.), information about the structure of the model (e.g., a number of layers, a number of nodes per layer, etc.), information about the training data set, and/or the like. Using this information can be mandated (e.g., via a specification) or left to the implementation of a node.

In some embodiments, a reference model for Node A and/or Node B may be specified (e.g., in a specification), for example, for testing purposes. Such an embodiment may not involve any indication of which model is used by Node A and/or Node B. For example, a UE may be expected to meet one or more performance specifications when the gNB uses one or more reference models. Depending on the implementation details, this may provide a guideline for deployment as to which models to be used by nodes to attain suitable performance for a machine learning task. In some embodiments, one or more performance requirements may be established for a machine learning CSI compression task, for example, as part of a specification.

In some embodiments of a framework with a reference model, a node may train any model, including a reference model, using a corresponding quantizer and/or dequantizer function (e.g., an approximated and/or differentiable quantizer and/or dequantizer function), and any model may also use a corresponding quantizer and/or dequantizer function for further training, validation, testing, inference, and/or the like.

Training Frameworks with Latest Shared Values

In some frameworks according to the disclosure, Node A may begin with a Model A that may be in any initial state (e.g., pre-trained (e.g., trained offline), untrained but configured with initial values, and/or the like). Node B may begin with a Model B that may also be in any initial state. One or both nodes may train their respective models for a period of time (which may be referred to as a training cycle or iteration), then one or both nodes may or may not share trained model values and/or trained models with the other node. In some embodiments, a new training data set may be provided directly or indirectly to one or both nodes, e.g., at the beginning or end of a cycle. Node A and Node B may train their respective models with their latest knowledge of the weights of the model at the other node, e.g., without any model exchange.

A first node may train its model (e.g., a UE may train an encoder) assuming the model at the second node (e.g., a decoder at a base station) is frozen with the latest weights (e.g., that were fed back by the second node). The first node may train its model and updates its weights, for example, a maximum number of times (e.g., $K_e$ times for an encoder) and then share the updated model weights with the second node. The same procedure may be implemented at the second node. Specifically, once the second node has received the updated model weights from the first node, the second node may train its model and update its weights a maximum number of times (e.g., $K_d$ times for a decoder), assuming the model weights of the model at the first node are frozen at the latest states shared model by the first node. The second node may then share its updated model weights with the first node. Thus, the first and/or second nodes may have trained their respective models a maximum number of times and then shared updated model values with the other node (which may be referred to as a sharing cycle or iteration).

In a variation of this framework, after one or more of the nodes shares model state information (e.g., weights) with the other node, e.g., at the end of a sharing cycle, one or both of the nodes may begin another sharing cycle. For example, both nodes may train their models assuming the values of the model on the other node is frozen to the latest values shared by the other node. At certain points in time, or after a certain number of training cycles are performed by the first and/or second nodes (e.g., at the end of another sharing cycle), one or both nodes may stop training and share their latest trained model with each other node. In some embodiments, at the beginning, a shared model (e.g., a fully shared model that may be initialized, for example, through offline training, hand shaking, etc.) may be used for the initial values of the latest shared weights.

Figure 10:
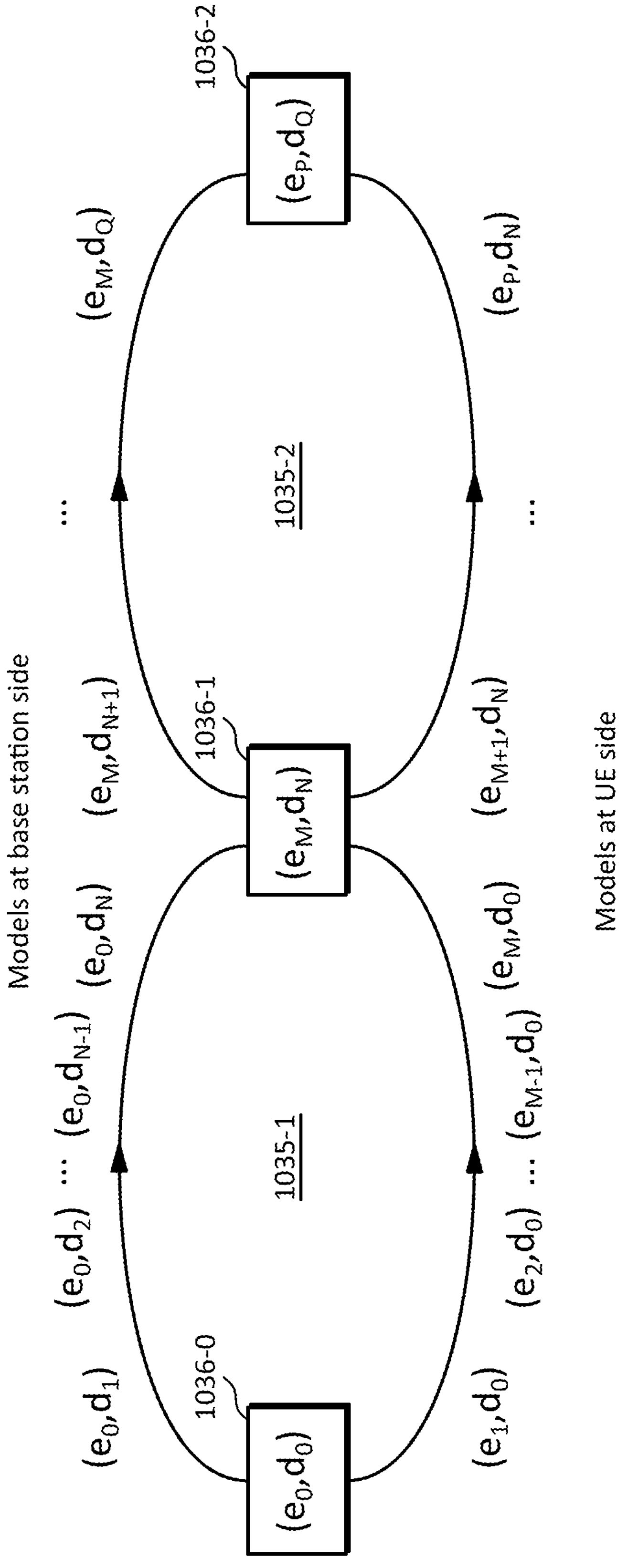
FIG. 10 illustrates an example embodiment of a method for training models with latest shared values according to the disclosure.

FIG. 10 illustrates an example embodiment of a method for training models with latest shared values according to the disclosure. For purposes of illustration, the method illustrated in FIG. 10 may be described in the context of a UE having an encoding model for CSI and a base station having a decoding model for CSI, but the principles may be applied to any types of nodes and/or physical layer information.

Referring to FIG. 10, at the beginning of a first sharing cycle 1035-1, an encoder model may be in an initial state $e_0$, and a decoder model may be in an initial state $d_0$ as shown at sharing point 1036-0. The encode and decoder models in the initial states ($e_0$, $d_0$) may both be provided to a UE and base station. Thus, the UE and base station both begin with encoder and decoder models in the same initial state. The UE may then perform M training cycles (e.g., trains its encoder M times while its decoder model remains in the initial state $d_0$). While the UE is performing M training cycles, the base station may perform N training cycles (e.g., trains its encoder N times while its encoder model remains in the initial state $e_0$).

For example, after a first training cycle by the UE, the UE's encoder and decoder models may have states ($e_1$, $d_0$), after a second training cycle by the UE, the UE's encoder and decoder models may have states ($e_2$, $d_0$) and so on until, after the Mth training cycle, the UE's encoder and decoder models may have states ($e_M$, $d_0$).

Similarly, after a first training cycle by the base station, the base station's encoder and decoder models may have states ($e_0$, $d_1$), after a second training cycle by the base station, the base station's encoder and decoder models may have states ($e_0$, $d_2$) and so on until, after the Nth training cycle, the base station's encoder and decoder models may have states ($e_0$, $d_N$).

At sharing point 1036-1 at the end of sharing cycle 1035-1, the UE may send its trained encoder model to the base station, and the base station may send its trained decoder model to the UE. Thus, both the UE and base station may have encoder and decoder models with states ($e_M$, $d_N$).

In some embodiments, UE and/or base station may stop training at this point and begin using their trained encoder and decoder models for inference. In some other embodiments, however, one or both of the UE and/or base station may begin another sharing cycle 1035-2. For example, the UE may then perform P training cycles by training its encoder P times while its decoder model remains in the state $d_N$, and the base station may perform Q training cycles by training its decoder Q times while its encoder model remains in the state $e_M$.

At sharing point 1036-2 at the end of sharing cycle 1035-2, the UE may send its trained encoder model to the base station, and the base station may send its trained decoder model to the UE. Thus, both the UE and base station may have encoder and decoder models with states ($e_P$, $d_Q$). The UE and/or base station may perform any number of sharing cycles, and any number of training cycles per sharing cycle.

A special case of the embodiment illustrated in FIG. 10 is when M or N=0, if M>>N, or if N>>M. For example, with N=0, and M>0, the base station may not update the decoder model (e.g., may not perform any training cycles) during the sharing cycles. The UE, however, may train its encoder M times before sharing it with the base station. Similarly, with M=0, and N>0, the UE may not update its encoder model while the base station may update its decoder model N times before sharing it with the UE. Depending on the implementation details, one or more of these special cases may be beneficial, for example, if one of the nodes has difficulty or is unable to obtain a training data set for online training at the node. In such a situation, the node with access (or more ready access) to training data may continue with online training which may enable the node that continues with training to provide a trained model to the other node that has no or limited access to training data.

A special case may also be performed in an interlaced and/or alternating manner. For example, the two nodes may start with one of the variables M or N equal to zero while the other variable is greater than zero. Once the model with the applicable model is updated a number of times determined by the nonzero variable and shared with the other node, the non-zero variable may take a zero value while the other variable becomes non-zero. This process may continue with M and N alternatingly take zero values. Such an interlaced training procedure may cause a first node (e.g., a UE or gNB) to train its model (e.g., an encoder or decoder) a number of times while the model at a second node is frozen. Then, after the first node shares its trained model with the second node, the second node may train its model a number of times while the model of the first node is frozen and so on.

In some embodiments, the value of the nonzero variable may affect the performance of the trained pair of models. For example, if the time between sharing points is relatively large, the trained models ($e_M$, $d_N$) may have relatively poor performance, for example, if each node has been training assuming a model weight on the other side that may be significantly different from the model that will be shared at the next sharing point. For example, in the embodiment illustrated in FIG. 10, the base station may train its decoder assuming an encoder with weights $e_0$ and may later pair the trained decoder with a new encoder model $e_M$ which may have diverged significantly from $e_0$. Thus, in some embodiments, sharing models with relatively high frequency may improve the performance of the trained models.

In any of the frameworks disclosed herein, a node may train any model, including a reference model, using a corresponding quantizer and/or dequantizer function (e.g., an approximated and/or differentiable quantizer and/or dequantizer function), and any model may also use a corresponding quantizer and/or dequantizer function for further training, validation, testing, inference, and/or the like.

With any of the frameworks disclosed herein, one or more of the nodes may transfer collected training data and/or data sets (e.g., channel estimates, precoding matrices, etc.) to another apparatus that may train one or more of the models. For example, a UE and/or base station may upload collected online training data and/or one or more models to a server (e.g., a cloud based sever) that may train one or more of the models using the uploaded training data and download one or more trained models to the UE and/or base station.

Any of the frameworks disclosed herein may be modified such that a first type of node may train a model for another type of node and share the trained model with multiples instances of the second type of node. For example, a base station may train an encoder for its decoder and shares the trained encoder with multiple UEs. One or more of the UEs may apply the shared encoder to compress CSI at the UE and/or use the shared encoder for further online training. Moreover, any of the frameworks disclosed herein may be implemented in systems in which one of the nodes is not a base station, for example, with two UEs or other peer devices configured for sidelink communications. In such an implementation, a UE may train a decoder for its encoder and share the trained decoder with one or more other UEs that may use the trained decoder for direct inference and/or as a source of initial values (e.g., of weights) for further online training.

Model Sharing Mechanisms

In some embodiments, nodes may transfer models, weights, and/or the like, using any type of communication mechanism such as one or more uplink and/or downlink channels, signals, and/or the like. For example, upon triggering sharing of an encoder model, a UE may use one or more MAC control element (MAC CE) PUSCHs to send the encoder model and/or weights to a gNB. Similarly, a gNB may send a decoder model and/or weights in one or multiple UEs using one or more MAC CE PDSCHs.

Depending on the implementation details, sharing a full set of weights may be inefficient as the model may be relatively large and may consume relatively large amounts of downlink and/or uplink resources for sharing.

Some embodiments may establish one or more sets of quantized models that may be referred to as model books. Upon training a model by a node, if sharing is requested, the node may map the model to one of the quantized models in a model book. One or more of the model books may be commonly shared between nodes. Rather than sending a mode, the node may send an index of the mapped model in a model book. Depending on the implementation details, this may reduce communication resources associated with model sharing.

In some embodiments, once a set of parameters for a model are known, the end result of training may be deterministically known. For example, given (1) a training set, (2) an initial random seed that determines the initial weights, (3) an optimizer parameter (e.g., a fully defined optimizer parameter), and/or a training procedure, the trained model at the end of a certain number of training epochs (e.g., training cycles) may be uniquely determined. These parameters may be referred to, for example, as minimal describing parameters. If the size of the minimal describing is smaller than the size of the weights for a model, then a node may share the minimal describing parameters rather than the weights. Depending on the implementation details, this may reduce communication overhead associated with sharing models.

In some embodiments, one or more values of a model (e.g., weights of a CSI encoding and/or deciding model at a node) may be arranged in a vector W (e.g., a vector of weight elements). A dedicated compression auto-encoder model (e.g., an encoder and decoder model pair) may be trained to compress W with an encoder at one node and a decoder at the other node. If sharing of the CSI model is triggered and/or requested, a node may construct the vector W of the CSI model, and encode it with the model-compression encoder and send the encoded vector to the other node. The other node may use the model-compression decoder to recover the weight vector W. Depending on the implementation details, this may reduce communication overhead associated with sharing models.

Online Training Processing Time

In embodiments in which a node may perform online training of a model, the node may be provided with a resource allowance (e.g., an allowance of processing time, processing resources, and/or the like) to perform the training. Such an allowance may be provided for training with an online training data set that may be collected by the node (e.g., channel estimations based on measurements performed by the node), or online training data sets that may be RRC configured (or re-configured) or MAC-CE activated. A resource processing time allowance may ensure that a node may have sufficient time to update a model using the online training data set before the node is expected to have completed the update, for example, to share an updated model with another node. In some embodiments, however, a node may be provided with a processing time allowance regardless of whether the node is expected to share a trained model after the processing.

For example, in embodiments in which a UE may collect an online training data set by calculating channel estimations, the UE may be provided an amount of time (e.g., to update an encoder model) determined by $N_{AIML,upadte}$ symbols from the end of the last symbol of the latest CSI-RS used for the online training set. If the UE is configured to report the updated model to another node (e.g., a gNB), the UE may not be expected to report the model to the gNB earlier than $N_{AIML,report}$ symbols from the last symbol of the latest CSI-RS in the training set.

As another example, in embodiments in which a UE may perform online training of an encoder using an online training data set that is RRC configured (or re-configured) or MAC-CE activated to the UE, the UE may not be expected to update and/or report its encoder earlier than N symbols from the latest symbol at which the corresponding RRC (re)-configuration is complete or the MAC-CE activation command has been received.

Pre-Processing Based on Domain Knowledge

For purposes of compression, a machine learning encoder may receive an input signal and generate a set of output features that may be sufficient for a decoder to use to reconstruct the input signal. With maximal compression, the output features may be expected to be independent of each other, otherwise they may be further compressed.

Although a pair of machine learning models may be capable of generating a feature vector from an input and reconstructing the input from the feature vector, in some embodiments according to the disclosure, one or more pre-processing and/or post-processing operations may be performed on the input to a generation model and/or the output from a reconstruction model. Depending on the implementation details, this may provide one or more potential benefits such as reducing the processing burden and/or memory usage of one or both of the models, improving the accuracy and/or efficiency of one or both of the models, and/or the like.

In some embodiments, pre-processing and/or post-processing may be based on domain knowledge of the input signals. In some embodiments, pre-processing and/or post-processing may provide an encoder with auxiliary information from the domain knowledge which, depending on the implementation details, may reduce the processing burden on the encoder. For example, if a vector that is to be compressed by an encoder may be characterized as a low-pass signal with a relatively small variation, a discrete Fourier transform (DFT) and/or inverse DFT (IDFT) may be performed to analyze the frequency domain representation of the vector. If a DC component of the DFT vector is larger (e.g., significantly larger) than the other components, it may indicate that the signal has a low variation and, therefore, may be pre-processed before compression by the encoder (and post-processed after decompression by the decoder) to reduce the burden on the encoder/decoder pair.

In some embodiments, performing a transform and/or inverse transform such as a DFT and/or an IDFT may provide a machine learning model with a clearer understanding of the level of correlation between the elements of an input vector. For example, in some embodiments (e.g., with any of the frameworks disclosed herein), a CSI matrix may be input to a pre-processor that may apply a transform (e.g., DFT/IDFT, discrete cosine transform (DCT)/inverse DCT (IDCT), and/or the like) to all or a portion of the input, e.g. on different CSI-RS ports. The transformed signal may then be input to the encoder and compressed. On the decoder side, the output of the decoder may be applied to an inverse operator of the preprocessor transformation (which may be implemented, for example, with a post-processor) to generate a reconstructed input signal.

Figure 11:
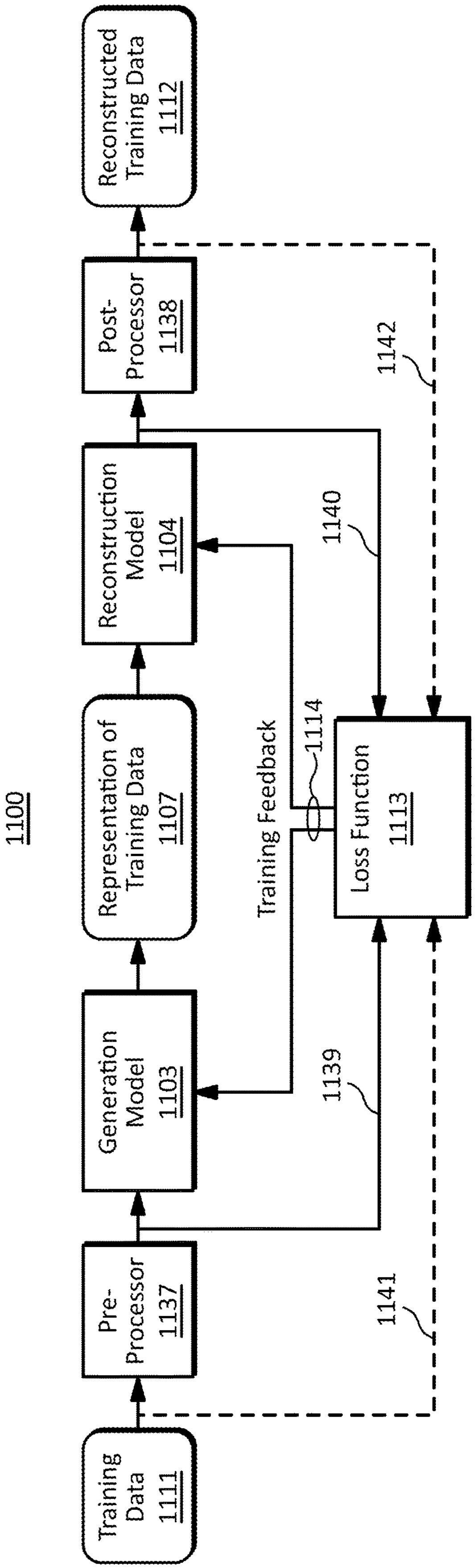
FIG. 11 illustrates an example embodiment of a two-model training scheme with pre-processing and post-processing according to the disclosure.

FIG. 11 illustrates an example embodiment of a two-model training scheme with pre-processing and post-processing according to the disclosure. In some aspects, the embodiment 1100 illustrated in FIG. 11 may be similar to the embodiment illustrated in FIG. 3, and similar components may be identified with reference designators ending in the same digits. However, the embodiment illustrated in FIG. 11 may include a pre-processor 1137 and a post-processor 1138. The pre-processor 1137 may apply any type of transformation to the training data 1111 before it is applied to the generation model 1103. Similarly, the post-processor 1138 may apply any type of inverse transformation (e.g., an inverse of a transformation applied by the pre-processor 1137) to the output of the reconstruction model 1104 to generate the final reconstructed training data 1112.

In some embodiments, the loss function 1113 for training the models 1103 and 1104 may be defined between the input of the generation model 1103 and the output of the reconstruction model 1104 as shown by the solid lines 1139 and 1140. In some embodiments, however, the loss function 1113 may be defined between the input of the pre-processor 1137 and the output of the post-processor 1138 as shown by the dashed lines 1141 and 1142. Once the models 1103 and 1104 are trained as shown in FIG. 11, they may be used for inference.

Although the principles relating to pre-processing and/or post-processing are not limited to any specific implementation details, for purposes of illustrating the inventive principles, an example embodiment of a scheme for pre- and post-processing CSI matrices based on domain knowledge may be implemented as follows. With a channel matrix of size $N_{rx} \times N_{tx}$, for each pair (i, j) of RX and TX antenna, the channel elements corresponding to the pair for all of the resource elements (REs) within a time and frequency window may be concatenated to obtain a combined matrix $H_{i,j}$ of size M×N where M and N may be the number of subcarriers and orthogonal frequency division multiplexing (OFDM) symbols of the CSI-RSs in the window. In some embodiments, the matrix may be assumed to be complex. In an example embodiment of a pre-processing scheme, $H_{i,j}$ may be transformed, for example, using DFT matrices. If $U_{freq}$ and $U_{time}$ are the M×M and N×N DFT matrices, respectively, the matrix $H_{i,j}$ may be transformed to $X_{i,j}$ as follows $$X_{i,j} = U_{freq}^{*} H_{i,j} U_{time} \tag{2}$$

which may be referred to as the delay-Doppler representation (DDR) of $H_{i,j}$. Matrix $H_{i,j}$ may be reconstructed from the DDR as follows:

$$H_{i,j} = U_{freq} X_{i,j} U_{time}^{*}. \tag{3}$$

In some embodiments, the use of a DDR transform may result in a sparse X matrix which, in turn, may ease the learning and inference complexity.

In some embodiments, the use of pre-processing and/or post-processing transforms may enable the original training set to transform the corresponding DDR matrices. In such an embodiment, the CSI compression may then compress the transformed training set. Thus, pre-processing (e.g., a DDR transform) may be performed on the UE side while post-processing (e.g., an inverse of DDR to recover H) may be performed at the gNB side.

In some embodiments, a loss function may be defined based on the transformed matrices (e.g., between the transformed matrix input to the encoder and the transformed matrix output of the decoder as illustrated in FIG. 11).

In some embodiments, the matrix H may be constructed based on the union of the individual CSI matrices in time and/or frequency domains for each spatial channel, for example, for each transmission antenna (port) and each receive antenna (port) pair. One or multiple models may be trained and tested for each spatial channel. In some embodiments, H may be constructed based on the channel matrices of the REs, e.g., where each matrix may have a size of $N_r \times N_t$ in which $N_r$ and $N_t$ may be the number of receive antennas at a UE and transmit antennas at a gNB, respectively.

CSI Matrix Formulations

In some embodiments, the CSI information of an RE or a group of REs that a UE may compress may be referred to as a CSI matrix. From an analysis of a multiple-input, multiple-output (MIMO) channel, a capacity distribution may be a Gaussian distribution with possibly different power allocation across a transmit antenna. If a channel matrix is decomposed as $H_{r \times t} = U \Sigma V^H$, the capacity achieving distribution may be obtained by first setting $\tilde{x} = Vx$ where x is the i.i.d. Gaussian random vector with zero mean and unit variance and then multiplying each element of $$\tilde{x} = \begin{bmatrix} \tilde{x}_1 \\ \vdots \\ \tilde{x}_t \end{bmatrix} \tag{4}$$

by the power allocation given by a water filling algorithm. The power allocation to the i-th channel may be $P_i$, i=1, . . . , t where the $P_i$ may be obtained from the singular value decomposition of the channel matrix H. Therefore, the information used at gNB (e.g., the full information required at the gNB) may be both the right singular value matrix V and the singular values themselves. Thus, in some embodiments, a CSI matrix may be formulated (e.g., defined) as any one or more of the following: (a) a CSI matrix may be formulated as the channel matrix H; (b) a CSI matrix may be formulated as the concatenation of V and the singular values; and/or (c) a CSI matrix may be formulated as the matrix U.

In some embodiments, a UE may be configured to report any of the CSI matrices described above via RRC (re)-configuration, MAC-CE command or dynamically via DCI. In an embodiment in which a CSI matrix is formulated according to (b) (e.g., the concatenation of V and the singular values) a UE may also be configured to only report the singular values.

For purposes of model training, when a UE is configured to report a specific CSI matrix the training set and/or loss function may be formulated based on the applicable CSI matrix. For example, when a UE is configured to report V, the training set may include the V matrices obtained from the estimated channel matrices, and the loss may be formulated based on a V matrix input to the encoder and the reconstructed V matrix at the output of the decoder.

Node Capabilities

Implementation of any of the frameworks disclosed herein may involve the use of resources such as memory, processing, and/or communication resources, for example, to store new training data, share models between nodes, and train and/or apply a specific type of neural network architecture, e.g., CNN or RNN for a model. Different nodes such as UEs may have different capabilities for implementing the neural networks. For example, a UE may or may be capable of supporting a CNN but not an RNN. In some embodiments, a UE may report its capability for supporting a specific type of neural network architecture, e.g. a network type such as CNN, RNN, etc., and/or any other aspects reflecting its restrictions and capability for applying an encoder model.

In some embodiments, a node (e.g., a UE) may report its capabilities and/or restrictions using a list that may include any number of the following: (a) one or more network types, e.g., CNN, RNN, specific types of RNN, gated recurrent units (GRUs), long short-term memory (LSTM), transformer, and/or the like; (b) one or more aspects related to the size of a model, e.g., a number of layers, a number of input and/or output channels of a CNN, a number of hidden states of an RNN, and/or the like; and/or (c) any other type of structural restriction.

Depending on its reported capabilities, a node (e.g., a UE) may not be expected to train or test an encoder model that violates any of the node's reported constraints and/or requires capabilities beyond the node's declared capabilities. In some embodiments, this may be ensured regardless of the applicable framework and/or location of training/inference of the model. For example, if a framework is implemented such that a gNB may pre-train an encoder and decoder and shares the encoder and/or decoder with the UE, the UE may not expect the encoder model to violate its capabilities. As another example, if one or multiple pairs of encoders and decoders are trained offline and specified in an applicable specification (e.g., an NR specification), a UE may not expect the applicable model to violate its capabilities. In some embodiments, a UE may report a capability to activate one or more models through signaling and may declare which specific encoder/decoder pairs, or individual encoders or decoders it may support. A gNB may then indicate to the UE which encoder/decoder pair may be applicable to the UE. The indication may be provided, for example, by system information, RRC configuration, dynamic signaling in the DCI, etc.

Tuning Via Online Training

In some frameworks a node such as a UE may be expected to train its encoder model or both an encoder model and a decoder model online, for example, by collecting new training data (e.g., samples) on the fly or based on offline provisioning and updating of one or more model. If a node only updates an encoder model, since a loss function may also depend on decoder weights, encoder model tuning and/or optimization may also depend on the decoder weights and/or model. In such an implementation a node may also declare capabilities to handle the restriction of the decoder model, even though the encoder may be used on the gNB side. One or more such restrictions may be applied as follows: (1) one or more online training features and/or fine tuning may be declared by a node as a capability; (2) a node that reports a capability to support online training may further report restrictions on the supported structures for the encoder model which may be, for example, any restrictions as mentioned above as (a) through (c); (3) a node that reports a capability to support online training may further report restrictions on the supported structures for the decoder model which may be, for example, any restrictions as mentioned above as (a) through (c); and/or (4) if multiple models including encoder and decoding pairs are specified in a specification, a node may declare a capability indicating which pairs of encoder and decoder, or which individual encoders and/or decoder the node may support.

Multiple Pairs of Models

In some embodiments, multiple pairs of models (e.g., encoder/decoder pairs) may be trained and/or deployed for operation (e.g., simultaneous operation) on two nodes (e.g., a UE and a gNB). Pairs may differ from each other in a) both encoder and decoder, b) only encoder, or c) only decoder. In some embodiments, multiple pairs of models can be configured (e.g., optimized) to handle different cases that may be specified to handle different channel environments which may in turn result in different distributions of the training and/or testing data sets.

Multiple pairs of models may be used, for example, to accommodate different dimensionality in training data. For instance, the dimensions of a CSI matrix may be determined according to the number of CSI-RS ports. In some embodiments, if a UE is to report a first CSI matrix $H_1$ and a second matrix $H_2$ with different dimensions, a single encoder and decoder pair may be used to handle matrices with different sizes. In such an embodiment the encoder and decoder may be trained as follows. The matrices input to the encoder may be reshaped to have a fixed size by appending zeros in a configuration that may be commonly understood between a UE and a gNB. Thus, a training set may originally include matrices of different sizes which may be modified by appending zeros as described above to convert the matrices to one fixed matrix size. A communication mechanism may be implemented to enable a gNB and a UE to share the same understanding on the size of the CSI matrix that is requested, for example in a report by a UE. Depending on the implementation details, a matrix re-dimensioning technique may work for any matrix size.

Alternatively, or additionally, multiple pairs of models (e.g., encoder/decoder pairs) may be trained, wherein different pairs of models may be configured to handle different CSI matrix sizes.

In some embodiments, and depending on the implementation details, multiple pairs of models may be implemented without increasing complexity. For example, with multiple pairs of models, if CSI reports include CSI matrices corresponding to a specific number of CSI-RS ports, then the inference time for calculating the CSI report may be smaller with multiple pairs than with a single pair. Moreover, if each RRC configuration or MAC-CE activation includes CSI reporting for a certain case corresponding to a certain pair, then UE may load the applicable model into a modem while keeping one or more of the other models in a UE controller. Depending on the implementation details, this may reduce modem internal memory usage. In embodiments with multiple pairs, different pairs may be categorized according to any of the following configurations. (a) Each pair of models may be configured to handle a specific CSI matrix size. For example, a pair of models may receive CSI matrices estimated based on CSI-RS with a certain number of ports and also associated with a certain number of receive antennas by a UE. The UE may report its number of receive antennas to the gNB in one report, or separately for different numbers of CSI-RS ports. (b) Each pair of models may be configured to handle a different distribution for training and/or test data sets. (c) Each pair of models may be configured to handle a different channel environment for training and/or test data sets.

Training Set Association and Model Pair Configuration

In embodiments in which pairs of models may be configured to handle different cases, a node (e.g., a UE or base station) may be configured with different training data sets, for example, different training data sets for a specific case or pair of models (e.g., encoder/decoder pair). Thus, a UE and/or base station may be in possession of different training data sets, e.g., each data set for a different pair. Once triggering takes place for a node (e.g., a UE or a gNB), the node may also be signalled as to which pair of models should be trained. For example, with online training, a gNB may indicate to a UE to start training of specific pair models. If online training is performed on the fly by collecting new data set, an association may be provided, for example, between a CSI-RS and an encoder/decoder pair, e.g., via the number of CSI-RS ports.

Once multiple pairs of models have been trained and are ready for deployment in an inference phase, a node (e.g., a UE) may need to know which pair to use to encode a channel matrix. For example, each pair may be associated with a certain dimension for a CSI matrix to encode. The dimension may be referred to as the input dimension to the encoder model. In some embodiments, a UE may determine the pair of models to use for encoding a CSI matrix as follows. A CSI-RS may be implicitly or explicitly associated with a pair of models. The UE encodes a CSI matrix using the pair of models associated with the CSI-RS. With an implicit association, the CSI-RS may be mapped to a certain pair based on the number of CSI-RS ports and/or the number of receive antennas at the UE. Thus, the CSI-RS may be mapped to a pair if the dimension of the CSI matrix obtained from the CSI RS is equal to the input dimension of the pair. If multiple pairs have the same eligible input dimensions, a reference pair may be chosen, for example, based on a rule that may be established between a UE and a gNB. With an explicit association, the CSI-RS for which the CSI matrix is reported may be configured via RRC or dynamically indicated in DCI, for example, with a pair index.

In any of the implementations described above, if UE is signaled to report a CSI matrix via a pair of models that have a different input dimension, the UE may append zeros to match the size of the matrix to the input dimension. However, a UE may not expect to be signaled to report a CSI matrix using a pair of models with an input dimension that is smaller than that of the CSI matrix.

Compression with Reduced Model Size

In some embodiments, a pair of models may be configured as an auto-encoder to compress a CSI matrix, and/or exploit a redundancy and/or correlation between CSI matrix elements. If the CSI matrix is reported per RE, then the correlation may only be a spatial correlation between different paths between different pairs of transmit antennas (e.g., CSI-RS ports) and receive antenna. Depending on the implementation details, the amount of such correlation may be limited and thus an auto-encoder may not be able to compress the CSI matrix sufficiently.

In some embodiments, the compression capability of an auto-encoder may be related to the amount of redundancy and/or correlation between the elements of the CSI matrix, which may be referred to as spatial correlation. Since a wireless channel may also be correlated in time and/or frequency domains, time and/or frequency correlations may also exist. Therefore, an estimated channel for a number of OFDM symbols and/or a number of resource elements (REs), resource blocks (RBs) or subbands may be input as a single training sample. For example, channel matrices corresponding to multiple REs may be specified as an input to an auto-encoder. In one such method according to the disclosure, a UE may be configured via RRC with such a configuration that may specify time and/or frequency resource bundling for forming a training data set.

Depending on the implementation details, the compression performance of an auto-encoder may be improved by compressing CSI for multiple REs across different frequency and/or time resources. Thus, combined CSI matrices of multiple REs may be input in a time and frequency window. The combined CSI matrix may then be obtained by concatenating the individual CSI matrices of the REs in the window. Depending on the implementation details, a combined CSI matrix may be more likely to have significant correlation between its elements due to time and frequency flatness of the channel. Therefore if a model takes the combined CSI matrix as the input, it may be able to compress it to a higher degree than multiple models working on individual per-RE matrices. In some embodiments, a UE may be configured with a time and/or frequency window and one or more configurations that may indicate which REs a UE may employ to determine the combined CSI matrix. Such a configuration may be used in both training and/or testing phases to obtain the combined matrix.

Input Size Reduction Via Subsets of CSI Matrix

In some embodiments, an auto-encoder may encode CSI matrices of different REs in certain time and frequency windows. If the channel is such that correlation between the elements of the channel matrices do not exist or are not strong in certain domains (e.g., time or frequency), then the set of elements in the union of the CSI matrices may be divided into subsets with relatively strong intra-subset element correlation and relatively weaker inter-subset element correlation. For example, if an auto-encoder is to compress four CSI matrices of four REs on the same OFDM symbol, the matrices may be denoted as follows:

$$H_1 = \begin{bmatrix} a_1 & a_2 \\ a_3 & a_4 \end{bmatrix}, H_2 = \begin{bmatrix} b_1 & b_2 \\ b_3 & b_4 \end{bmatrix}, H_3 = \begin{bmatrix} c_1 & c_2 \\ c_3 & c_4 \end{bmatrix}, H_4 = \begin{bmatrix} d_1 & d_2 \\ d_3 & d_4 \end{bmatrix}. \quad (5)$$

If the correlation in the frequency domain is strong, and there is little or no correlation in the spatial domain (i.e. among the elements of one matrix), then an auto-encoder may be configured to compress a vector of length 4, and the auto-encoder may be applied four times on the following subsets: Subset 1 ($a_1$, $b_1$, $c_1$, $d_1$); Subset 2 ($a_2$, $b_2$, $c_2$, $d_2$); Subset 3 ($a_3$, $b_3$, $c_3$, $d_3$); and Subset 4 ($a_4$, $b_4$, $c_4$, $d_4$).

The CSI matrix may then be reconstructed at the decoder by reconstructing the four vectors, for example, using the same decoder. As mentioned above, the subsets may be chosen such that they may exploit one or more correlations in one or more domains. To further illustrate, in the example above, if there is a correlation between elements in a spatial domain, then the subset choices set forth above may prevent the network from exploiting the correlation to further compress the CSI matrix. In contrast, the following subset selections may allow for exploiting correlations in both the frequency and spatial domains: Subset 1 ($a_1$, $a_2$, $b_1$, $b_2$); Subset 2 ($c_1$, $c_2$, $d_1$, $d_2$); Subset 3 ($a_3$, $a_4$, $b_3$, $b_4$); and Subset 4 ($c_3$, $c_4$, $d_3$, $d_4$).

In some embodiments, the following framework may be used for reduced model size with $N_{features}$ input dimensions based on this approach. (1) A UE may be configured to report CSI matrices of M REs which may be on the same or different OFDM symbols and may be within a time and/or frequency window. Each CSI matrix may have N elements. (2) A UE may divide the M×N elements into $$\frac{M \times N}{N_{features}}$$

subsets. A common rule may be established between UE and gNB for the subset selection. (3) An auto-encoder (e.g., a single auto-encoder) may be used to compress and recover the $N_{feature}$ elements in each subset. In the example subsets described above, M=N=4, and $N_{features}$=4.

Input Size Reduction Via Resource Element Selection

The size of an encoder network may be reduced by reducing the size of a combined input matrix. In some embodiments, the size of a combined matrix may be reduced by (a) removing certain elements of individual per-RE matrices, for example, if there are two REs in a window with CSI matrices $H_1$ and $H_2$ of the same dimension. The combined matrix can be constructed to have the same dimension as $H_1$ or $H_2$, but by selectively picking the (i,j) elements from either $H_1$ or $H_2$. Alternatively, or additionally, the size of a combined matrix may be reduced by (b) constructing a matrix that may exclude the CSI matrices for certain REs in the window.

These examples are illustrated in Table 1 in which a window with two REs and two CSI matrices is illustrated. With approach (a) the combined matrix may be constructed as shown in Table 1, while with approach (b) the combined matrix may be constructed by choosing one of the two matrices.

TABLE 1

$$H_1 = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \end{bmatrix}$$

$$H_2 = \begin{bmatrix} b_{1,1} & b_{1,2} & b_{1,3} & b_{1,4} \\ b_{2,1} & b_{2,2} & b_{2,3} & b_{2,4} \\ b_{3,1} & b_{3,2} & b_{3,3} & b_{3,4} \\ b_{4,1} & b_{4,2} & b_{4,3} & b_{4,4} \end{bmatrix}$$

$$H_{combined} = \begin{bmatrix} a_{1,1} & b_{1,2} & a_{1,3} & b_{1,4} \\ a_{2,1} & b_{2,2} & a_{2,3} & b_{2,4} \\ a_{3,1} & b_{3,2} & a_{3,3} & b_{3,4} \\ a_{4,1} & b_{4,2} & a_{4,3} & b_{4,4} \end{bmatrix}$$

Number of CSI-RS Ports and Training Set

A channel matrix estimated from a CSI-RS with $N_{port}$ ports and reception via $N_r$ receive antennas at a UE, may have a dimension of $N_r \times M_{port}$. An auto-encoder may be used to remove redundancy from the matrices. In some embodiments, identifying the redundancy pattern and/or removing it may be more difficult if the training set includes matrices of different dimensions, e.g., corresponding to CSI-RS with different numbers of ports. Therefore in some embodiments, a training set for any of the methods disclosed herein may only or mostly include matrices of the same dimensions, and/or associated with the same number of CSI-RS ports. Thus, a UE may not be expected to be configured with a training set, or CSI report and measurement config that results in a training set with dimensions that are different from dimensions of the training data set matrices.

UCI Format

With any of the frameworks disclosed herein, an output of a generation model (e.g., an ML encoder) may be considered a type of UCI (which may be referred to, for example, as artificial intelligence, machine learning (AIML) CSI). In some embodiments, AIML CSI may be obtained from a CSI report and measurement configurations with associated CSI-RS resources and report settings. In some embodiments, AIML CSI may be transmitted to a gNB via PUCCH or PUSCH (for example, following Rel-15 behavior). Thus, a format for a representation of feedback information for physical layer information may be established as a type of uplink UCI. A format may involve one or more types of coding (e.g., polar coding, low density parity check (LDPC) coding, and/or the like) which may depend, for example, on a type of physical channel used to transmit the UCI. In some embodiments, transmitting the type of uplink UCI (e.g., AIML CSI) with PUCCH may use polar coding, while transmitting with PUSCH may use LDPC coding. Moreover, before coding, the CSI may be quantized. Thus AIML CSI may be quantized to a bitstream (0s and 1s) and input to a polar coder or LDPC coder.

Adaptability to Different Network Vendors

When a UE connects to a network, it may not know which network vendor created the network to which it is connected. Since different vendors may employ different training techniques and/or network architectures for machine learning models, the availability of this information may impact the training model at the UE side. Thus, in some embodiments, a network indication or an AI/ML index may be provided to a UE via system information (e.g., via one of the SIBs). The UE may then use this information to adapt its training to the specific network vendor configuration.

ML Model Lifecycle Management

In some ML applications, the performance of an ML model may deteriorate over time, and may not perform adequately over the duration of an application it was trained for. Thus, an ML model may be updated frequently to adapt to temporal changes that may occur in its operating environment, e.g., statistical changes in the wireless channel in the case of CSI compression.

Some embodiments according to the disclosure may provide a management framework to enable efficient and/or timely updates of one or more ML models with acceptable overhead. To facilitate such a framework, one embodiment may implement model monitoring in which the node may keep track of the performance of the ML model. In some embodiments, this may involve model monitoring in which a node may track the performance of an ML model. Model monitoring may be based on one or more performance metrics as follows. (1) Task-based metrics may be used to assess (e.g., directly) the performance of a task being performed by an ML model. For example, these metrics can include accuracy, mean squared error (MSE) performance, and/or the like. (1) System-based metrics may be used to track the overall performance of the system, e.g., correct decoding of transmissions, or other system-level key performance indicators (KPIs) which may provide a less direct measure of the performance of an ML model used by a node in the system.

When the performance of an ML model is deemed unacceptable according to an agreed and/or configured metric, the management framework may initiate an ML model update procedure. Performance may be deemed unacceptable, for example, (1) when the ML model performance is not acceptable according to one or more agreed and/or configured metrics; and/or (2) if the performance of the ML model is not acceptable for a particular duration which is larger than a threshold time.

A threshold for determining unacceptable performance may be implemented as a configured and/or specified parameter. A time duration may be measured i) accumulatively, e.g., any duration of unacceptable performance may be added to a global counter, and the global counter value is compared to the threshold, or ii) contiguously, e.g., only a contiguous duration of unacceptable performance larger than a threshold may be considered.

When the performance of the ML model is deemed to be unacceptable, a management framework may trigger an update procedure that may be implemented in one of the following manners. (1) The management framework can require a full training procedure as described, for example, with respect to FIG. 8. In this case, the ML model may be re-trained from scratch, or it can be re-trained starting from the current ML model. Training in this case may use the entire training data set, with or without additional data samples that may have been acquired recently. (2) The management framework may require partial training in which the ML model may be re-trained starting from the current ML model and possibly using new data samples that have been acquired recently.

Performance Metrics in Training and Testing

To evaluate the performance of different models for a CSI compression task, some embodiments according to the disclosure may focus on the aspect of CSI compression. In such an embodiment, different models may be compared based on their respective capability of compressing the CSI matrix and recovering the CSI matrix such that the recovered matrix is as close as possible to the true CSI matrix. A determination of closeness may be related to the operation of a gNB with the CSI matrix. For instance if a gNB calculates the SVD of the channel matrix as $H_{r \times t}=U\Sigma V^H$ and uses the right singular vectors V to determine the precoder, closeness may be determined between the V at in the input of the encoder and the recovered V at the output of the decoder.

In some embodiments, a closeness metric between two matrices may be implemented on an element-wise basis, and the average may be taken over some or all elements to provide a single loss value. Alternatively, or additionally, having one or a few erroneous elements in the matrix may be as harmful as having many erroneous elements. In this case, the loss function may be determined on a matrix-wise basis, e.g., the maximum of element-wise errors over all the elements of the matrix.

In some embodiments, the performance of a CSI encoder and decoder model may also be evaluated in conjunction with other blocks of the system. For example, if a block error rate (BLER) is used as a system performance metric, the comparison between different CSI models may be based on their resulting BLER. Other system KPIs, such as throughput, resource utilization, etc., may also be used for this purpose.

In embodiments in which BLER is a metric of interest, configuring gNB to use the information provided by the CSI matrix may affect the system performance. For example, assuming a CSI model is perfect in the sense that a channel matrix sent by a UE is fully recovered at a gNB, and the channel matrix indicates a rank-1 channel, if the gNB schedules a rank-2 PDSCH, decoding may be likely to fail. Therefore, to establish a connection between a compression-capability of the CSI model and system performance, an assumption may be used regarding the gNB operation. In some embodiments, a gNB processing a function $f_{gNB}$ may be defined to take the output of the decoder, e.g., $\hat{H}$, and provide an estimate of the resulting BLER as BLER=$f_{gNB}(\hat{H})$ (or BLER=$f_{gNB}(H, \hat{H})$). The loss function during the training may then be defined considering both CSI compression and gNB operations aspects. For example, the loss may be defined as a weighted sum of the two terms as follows:

$$\mathrm{loss}(H,\hat{H})=\alpha\cdot \mathrm{loss}_{CSI}(H,\hat{H})+\beta\cdot \mathrm{BLER} \quad (6)$$

where α and β are hyper-parameters for training.

Reliability Aspects of Uplink Channel

In some embodiments, an output of the encoder, which may also be referred to as a CSI codeword, may be assumed to be available at the decoder side without error. Thus, the CSI codeword may be transmitted via PUCCH or PUSCH on an uplink channel with infinite reliability such that the PUCCH and/or PUSCH decoding does not fail. However, in some instances, in the inference phase, the CSI codeword may be delivered to the gNB (the decoder) with one or more errors, for example, when the PUSCH/PUCCH decoding fails. In such as case, a noisy version of the CSI codeword may be available at the decoder. The effects of imperfection in the uplink channel during the training phase may be modelled as follows.

For each training example input to the encoder, the CSI codeword at the output of the encoder may be denoted as x. Considering the imperfection of the uplink channel, the input to the decoder y may be modelled as $$y=x+\omega \tag{7}$$

where ω is the additive noise that may model the residual error after the decoding of the uplink channel. The additive noise may be generated as follows in the training phase.

In Method 1, ω may be modelled as a Gaussian random vector with zero mean and variance $\sigma^2$. The variance may be indicated to the UE via RRC configuration or left to the UE implementation. In Method 2, the channel between x and y may be modelled by performing the PUCCH and/or PUSCH decoding for each training example, obtaining the residual error vector ω, and then assuming that the vector is added to x to obtain y.

Federated Learning Aspects

With federated learning (FL), a global model at a server may learned by individual learnings at multiple nodes connected to the server and sharing the learned models with the server. The server then may perform one or more operations on the received models to obtain a final model. Such an arrangement may be motivated, for example, privacy aspects and/or requirements of the nodes to not share their data with the server.

With a CSI compression use case, the server may be considered to be the gNB and different UEs connected to the gNB may be considered as model updating nodes. Different UEs may have different training sets having the same or different distributions. If the distributions are the same, each UE may update the model with its own training set and share the model with the gNB. The gNB may then perform one or more operations, for example, averaging the models to obtain a final model. The gNB may share the obtained final model with the UEs which shared their models. The final model may be expected to outperform the individual received models as it is trained based on the union of all the training sets over all the participant UEs. Therefore, FL may be used to improve the CSI compression performance. In case of different distributions available at different UEs, FL may help to capture the distributions which have not yet been seen by specific UE through the models shared by UEs that have seen the distribution. In any case, FL can be used to obtain a model considering different environments observed by the UEs.

With an FL framework according to the disclosure, a gNB may configure a group of UEs to be in an FL group. The UEs in the same FL group may be configured to have the same encoder and/or decoder (e.g., auto-encoder or AE) architecture. Thus, their encoders and decoders may only be different in the actually trained weights but have the same configurations in terms of a number of layers, number of units, activation functions, and other parameters defining the network structure.

The size of the input to the encoder and the decoder models may be the same or similar for the UEs in the group. The input to the encoder may also have the same or similar meaning for the UEs. For example, the input to the encoders of the UEs (e.g., all the UEs) may be the channel matrix or the singular value matrix V. The gNB may indicate to the UEs via RRC, DCI or a MAC CE command to update their models and share the updates with the gNB. in some embodiments, not all the UEs in the group participate in the update procedure at the same time. The gNB may send information regarding training, hyperparameters and/or other aspects of the FL via a group-common (GC) DCI, where the UEs in the same FL group may have their specific portion of the DCI configured via RRC.

ADDITIONAL EMBODIMENTS

Figure 12:
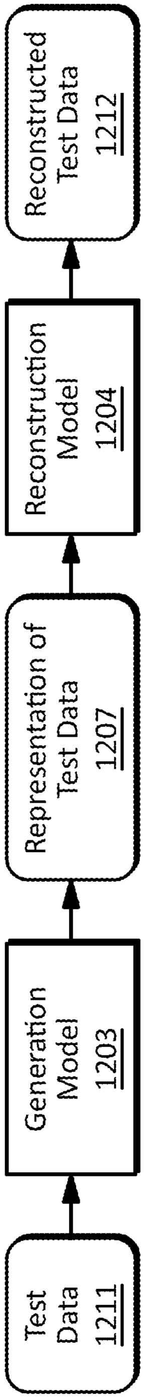
FIG. 12 illustrates an embodiment of a system for using a two-model scheme according to the disclosure.

FIG. 12 illustrates an embodiment of a system for using a two-model scheme according to the disclosure. The embodiment illustrated in FIG. 12 may be described in the context of testing one or more of the models, but the same or similar embodiments may also be used for validation, inference, and/or the like, with any of the models disclosed herein, for example, with the generation model 303 and/or the reconstruction model 304 illustrated in FIG. 3 after training.

Referring to FIG. 12, the system 1200 may include a first node (Node 1) having a generation model 1203 and second node (Node B) having a reconstruction model 1204. Test data 1211 may be applied to the generation model 1203 which may generate a representation 1207 of the test data. The reconstruction model 1204 may generate a reconstruction 1212 of the test data based on the representation 1207 of the test data. In some embodiments, the generation model 1203 may include a quantizer to convert the representation 1207 to a quantized form (e.g., a bit stream) that may be transmitted through a communication channel. Similarly, in some embodiments, the reconstruction model 1204 may include a dequantizer that may convert a quantized representation 1207 (e.g., a bit stream) to a form that may be used to generate the reconstructed test data 1212.

The generation model 1203 and reconstruction model 1204 may be obtained in any manner including using any of the frameworks described herein. For example, using a joint training framework, the generation model 1203 and reconstruction model 1204 may be trained as a pair at Node A, which may transmit the reconstruction model 304 to Node B. Other embodiments may use a training framework with reference models, a training framework with latest shared values, or any other framework and/or technique to obtain and/or train the generation model 1203 and reconstruction model 1204.

Figure 13:
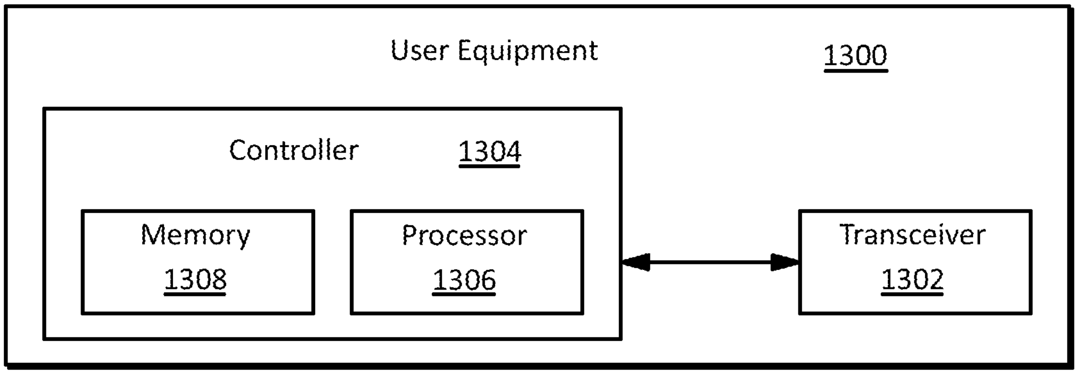
FIG. 13 illustrates an example embodiment of a user equipment (UE) in accordance with the disclosure.

FIG. 13 illustrates an example embodiment of a user equipment (UE) in accordance with the disclosure. The embodiment 1300 illustrated in FIG. 13 may include a radio transceiver 1302 and a controller 1304 which may control the operation of the transceiver 1302 and/or any other components in the UE 1300. The UE 1300 may be used, for example, to implement any of the functionality described in this disclosure including determining channel information based on one or more reference signals from a base station, generating a representation of the channel information based on the condition of the channel using a machine learning model, sending the representation of the channel information, collecting training data, e.g., during a window, performing pre- and/or post-processing, e.g., for a CSI matrix, deploying and/or activating one or more pairs of ML models, and/or the like.

The transceiver 1302 may transmit/receive one or more signals to/from a base station, and may include an interface unit for such transmissions/receptions. For example, the transceiver 1302 may receive one or more signals from a base station and/or may transmit a representation of channel information to a base station on a UL channel.

The controller 1304 may include, for example, one or more processors 1306 and a memory 1308 which may store instructions for the one or more processors 1306 to execute code to implement any of the functionality described in this disclosure. For example, the controller 1304 may be configured to implement one or more machine learning models as disclosed herein, as well as determining channel information based on one or more reference signals from a base station, generating a representation of the channel information based on the condition of the channel using a machine learning model, sending the representation of the channel information, collecting training data, e.g., during a window, performing pre- and/or post-processing, e.g., for a CSI matrix, deploying and/or activating one or more pairs of ML models, and/or the like.

Figure 14:
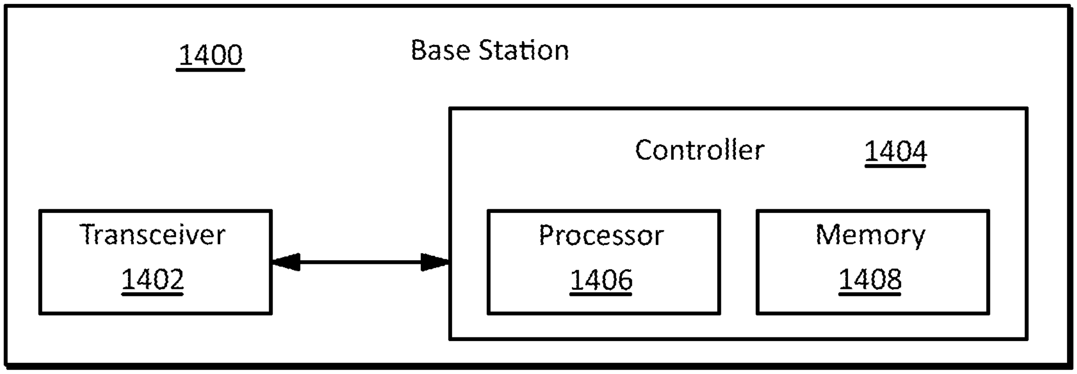
FIG. 14 illustrates an example embodiment of a base station in accordance with the disclosure.

FIG. 14 illustrates an example embodiment of a base station in accordance with the disclosure. The embodiment 1400 illustrated in FIG. 14 may include a radio transceiver 1402 and a controller 1404 which may control the operation of the transceiver 1402 and/or any other components in the base station 1400. The base station 1400 may be used, for example, to implement any of the functionality described in this disclosure including transmitting one or more reference signals to a UE on a DL channel, reconstructing a representation of channel information, performing pre- and/or post-processing, e.g., for a CSI matrix, deploying and/or activating one or more pairs of ML models, and/or the like.

The transceiver 1402 may transmit/receive one or more signals to/from a user equipment, and may include an interface unit for such transmissions/receptions. For example, the transceiver 1402 may transmit one or more reference signals to a UE on a DL channel and/or receive receiving precoding information from a UE on a UL channel.

The controller 1404 may include, for example, one or more processors 1406 and a memory 1408 which may store instructions for the one or more processors 1406 to execute code to implement any of the base station functionality described in this disclosure. For example, the controller 1404 may be used to implement to implement one or more machine learning models as disclosed herein, as well as transmitting one or more reference signals to a UE on a DL channel, reconstructing a representation of channel information, performing pre- and/or post-processing, e.g., for a CSI matrix, deploying and/or activating one or more pairs of ML models, and/or the like.

In the embodiments illustrated in FIGS. 13 and 14, the transceivers 1302 and 1402 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 1304 and/or 1404 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more processors such as microcontrollers, CPUs such as complex instruction set computer (CISC) processors such as x86 processors and/or reduced instruction set computer (RISC) processors such as ARM processors, and/or the like, executing instructions stored in any type of memory, graphics processing units (GPUs), neural processing units (NPUs), tensor processing units (TPUs), and/or the like.

Figure 15:
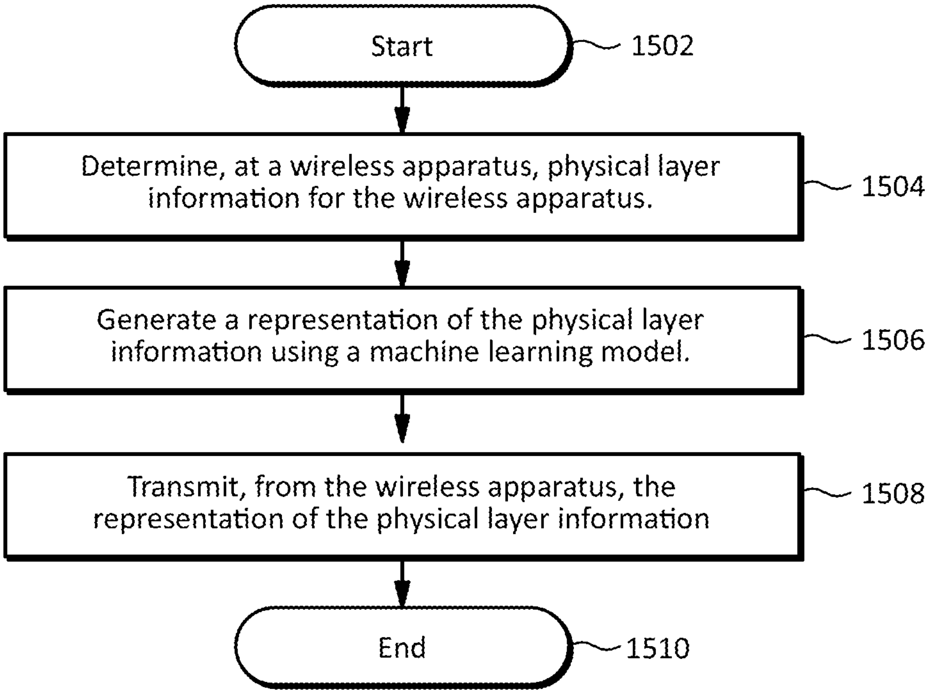
FIG. 15 illustrates an embodiment of a method for providing physical layer information feedback in accordance with the disclosure.

FIG. 15 illustrates an embodiment of a method for providing physical layer information feedback in accordance with the disclosure. The method may begin at operation 1502. At operation 1504, the method may determine, at a wireless apparatus, physical layer information for the wireless apparatus. At operation 1506, the method may generate a representation of the physical layer information using a machine learning model. At operation 1508, the method may transmit, from a user equipment, from the wireless apparatus, the representation of the physical layer information. The method may end at operation 1510.

In the embodiment illustrated in FIG. 15, and any of the embodiments disclosed herein, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

Precoding and Channel Information Mismatch

In an NR system, a UE may measure downlink channel conditions based on a reference signal (e.g., CSI-RS or DMRS) transmitted by a gNB. The UE may use the channel measurements to determine (e.g., calculate) channel information such as a precoding matrix and/or channel quality indicator (CQI) which the UE may report to the gNB. The UE may calculate a precoding matrix that may result in a good (e.g., the best available) equivalent channel for downlink transmissions if the gNB applies the reported precoding matrix to subsequent transmissions. The CQI, which the UE may calculate based on the precoding matrix, may indicate a channel quality that may be expected if the gNB uses the reported precoding matrix. The reported CQI may be used, for example, to select a modulation order, code rate, and/or the like, for subsequent transmissions by the gNB using the reported precoding matrix.

As described above, a CQI may be calculated based on a precoding matrix. Thus, accurately determining channel quality information (e.g., CQI) may involve or require knowledge or an assumption by a UE of precoding information (e.g., a precoding matrix) applied by the gNB. In an NR system in which a codebook may be used to determine a precoding matrix (e.g., using an RI and/or PMI reported by a UE), a UE may have knowledge of the precoding matrix applied by the gNB to the CSI-RS.

However, in a system that uses a machine learning framework to report channel information, a UE may not have knowledge or an assumption of a precoding information applied by the gNB. For example, in some embodiments, a pair of models (e.g., an encoder at a UE and a decoder at a gNB) may be trained such that, when a channel matrix is applied as an input to an encoder at the UE, the decoder at the gNB may directly output a precoding matrix. Such an embodiment may be implemented, for example, using the configuration illustrated in FIG. 7 in which the channel state information 718 may be implemented as a channel matrix determined by measuring the reference signal 717 and applied to the machine learning encoder 703 at the UE 701. In such an embodiment, the reconstruction of the channel state information 722 may be implemented as a precoding matrix that may be obtained (e.g., directly) as the output of the machine learning decoder 704 at the gNB 702.

Such an embodiment may be trained, for example, using the configuration illustrated in FIG. 3 in which the training data 311 may include pairs of data in which each pair may include a channel matrix and a corresponding precoding matrix calculated by a UE based on the channel matrix. During training, the channel matrices may be applied as inputs to the generation model 303, and the corresponding precoding matrices may be used as training targets (e.g., for the loss function 313), thereby causing the reconstruction model 304 to generate the output data 312 as a precoding matrix.

In such an embodiment, however, the UE may not have access to the trained decoder used by the gNB. For example, referring to FIG. 7, the encoder 703 and decoder 704 may be trained by a network that may transfer only the encoder 703 to the UE 701 and only the decoder 702 to the gNB 702. As another example, the gNB 702 may train the encoder 703 and decoder 704 and transfer only the encoder 703 to the UE 701. Thus, the UE may not be able to determine the precoding matrix that the UE may report to the gNB (e.g., in the form the output of the encoder 703), and which the gNB 702 may reconstruct using the decoder 704. (Although the gNB 702 may reconstruct the precoding matrix, in some systems, it may not be required to use the reconstructed precoding matrix or any precoding matrix previously reported by the UE 701.) Thus, the UE 701 may not have access to the precoding matrix to use to calculate channel quality information. Depending on the implementation details, this may result in a mismatch between precoding information and channel quality information reported by the UE to the gNB. In some embodiments, as used in this context, mismatch may refer to a situation in which channel quality information reported to a wireless apparatus may not be adequately based on corresponding precoding information reported to the wireless apparatus.

In some embodiments according to the disclosure, a first wireless apparatus (e.g., a UE) may determine precoding information (e.g., a precoding matrix) used by a second wireless apparatus (e.g., a gNB) to enable the first wireless apparatus to determine channel quality information (e.g., CQI) based on the precoding information. Depending on the implementation details, this may reduce or eliminate mismatch between precoding information and channel quality information reported by the first wireless apparatus to the second wireless apparatus.

Figure 16:
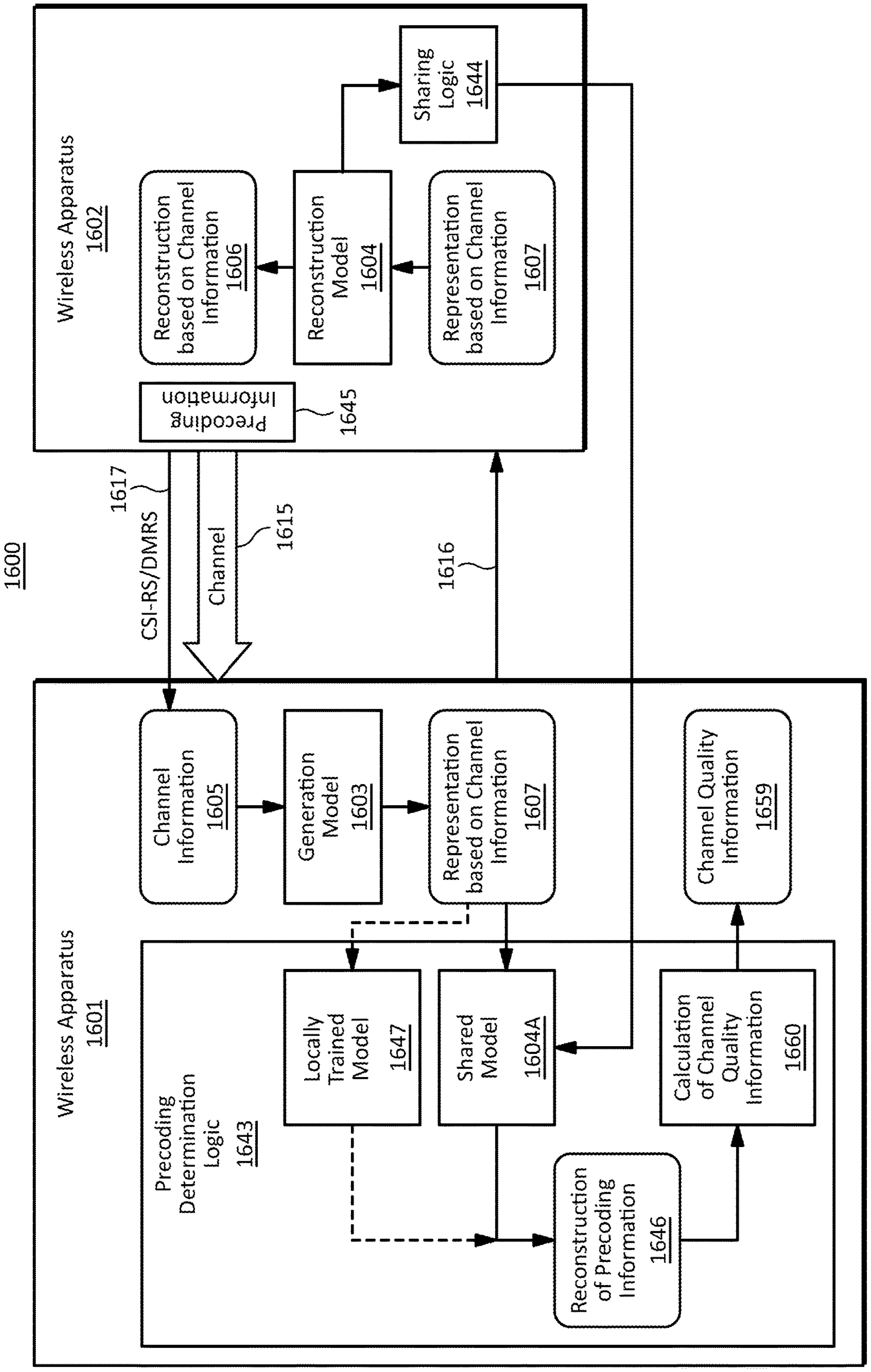
FIG. 16 illustrates an embodiment of a system having a pair of models to provide channel information feedback according to the disclosure.

FIG. 16 illustrates an embodiment of a system having a pair of models to provide channel information feedback according to the disclosure. The system 1600 illustrated in FIG. 16 may be used to implement, or may be implemented with, any of the apparatus, models, training schemes, and/or the like disclosed herein. The system 1600 may include one or more elements (e.g., components, operations, and/or the like) that may be similar to those in the embodiment illustrated in FIG. 4 and/or FIG. 7 in which similar elements may be indicated by reference numbers ending in, and/or containing, the same digits, letters, and/or the like.

In the system 1600 illustrated in FIG. 16, a first wireless apparatus (e.g., a UE) 1601 may receive a signal (e.g., a reference signal) 1617 from a second wireless apparatus (e.g., a base station) 1602 through a channel 1615, for example, to enable the first wireless apparatus 1601 to determine channel conditions of the channel 1615. The second wireless apparatus 1602 may apply precoding information (e.g., a precoding matrix) 1645 to subsequent transmissions (e.g., PDCCH, PDSCH, and/or the like).

The first wireless apparatus 1601 may include precoding determination logic 1643. Additionally, or alternatively, the second wireless apparatus 1602 may include sharing logic 1644. The precoding determination logic 1643 and/or sharing logic 1644 may implement, individually and/or cooperatively, one or more schemes to enable the first wireless apparatus 1601 to determine (e.g., calculate) the precoding information 1645 (or a reconstruction thereof) which, in turn, may enable the first wireless apparatus 1601 to determine channel quality information 1659. Depending on the implementation details, enabling the first wireless apparatus 1601 to determine the precoding information 1645 applied by the second wireless apparatus 1602 may help reduce or eliminate mismatch between the precoding information 1645 (or a reconstruction thereof) and the channel quality information 1659 reported by the first wireless apparatus 1601 to the second wireless apparatus 1602.

In some example embodiments, the first wireless apparatus 1601 may generate a reconstruction 1646 of the precoding information 1645 using a reconstruction model (e.g., a decoder model). For example, the sharing logic 1644 at the second wireless apparatus 1602 may transfer a reconstruction model 1604 (e.g., information on model size, dimensions, weights, and/or the like) to the first wireless apparatus 1601 where the transferred model may be indicated as shared model 1604A.

Such an embodiment may be implemented, for example, with a generation model 1603 implemented with an encoder and a reconstruction model 1604 implemented with a decoder. The second wireless apparatus 1602 that may train the encoder 1603 and decoder 1604 (e.g., in an auto-encoder configuration). The sharing logic 1644 at the second wireless apparatus 1602 may transfer both the encoder 1603 and the decoder 1604A to the first wireless apparatus 1601, for example, using an over-the-air (OTA) transfer. The first wireless apparatus 1601 may use the encoder 1603 to generate a representation 1607 based on the channel information 1605 which may include, for example, channel measurements (e.g., a channel matrix). The second wireless apparatus 1602 may use the decoder 1604 to generate the precoding information (e.g., a precoding matrix) 1645 from the representation 1607. However, because the first wireless apparatus 1601 may also receive the decoder 1604A, it may use the decoder 1604A to generate reconstructed precoding information (e.g., a precoding matrix) 1646 that may be the same as, or similar to, the precoding information 1645. The first wireless apparatus 1601 may then use the reconstructed precoding information 1646 to perform a calculation 1660 to determine the channel quality information 1659.

The first wireless apparatus 1601 may transmit the channel quality information 1659 to the second wireless apparatus 1602 in any suitable manner. For example, the first wireless apparatus 1601 may combine the channel quality information 1659 with the representation 1607 generated by the generation model 1603 (e.g., by appending the channel quality information 1659 to the representation 1607) and transmit the combined channel quality information 1659 and representation 1607 to the second wireless apparatus 1602 using another channel (e.g., an uplink channel), signal, and/or the like 1616. In some embodiments, the second wireless apparatus 1602 may remove the channel quality information 1659 from the combined information prior to applying the representation 1607 to the reconstruction model 1604.

As another example, the first wireless apparatus 1601 may receive the reconstruction model 1604A from a server (e.g., using an OTA transfer) on a wireless network on which the first and second wireless apparatus 1601 and 1602 may operate. In such embodiments, the reconstruction model 1604A may be identified and/or registered to the network, and the network may activate the reconstruction model 1604A using a model identifier. If the reconstruction model 1604A is shared by the second wireless apparatus 1602 with the first wireless apparatus 1601, the second wireless apparatus 1602 may share the reconstruction model 1604A corresponding to the activated generation model 1603.

In some additional example embodiments, the first wireless apparatus 1601 may generate the reconstruction 1646 of the precoding information 1645 using a locally trained reconstruction model 1647. For example, the first wireless apparatus 1601 may train a reference model (e.g., a reference decoder) 1647 that may match the reconstruction model 1604 used by the second wireless apparatus 1602. The first wireless apparatus 1601 may then use the locally trained model 1647 to generate (e.g., reconstruct) the precoding information 1646 which it may then use to determine (e.g., calculate) the channel quality information (e.g., CQI) 1659. One or more of these operations may be controlled, supported, and/or the like, individually and/or cooperatively, by the precoding determination logic 1643.

In some embodiments, the first wireless apparatus 1601 may implement a reference model as a reference decoder model (that may be the same as, or different from, a decoder model used by the second wireless apparatus 1602) that the first wireless apparatus 1601 may refine, for example, by fine tuning. Alternatively, or additionally, the first wireless apparatus 1601 may implement a reference model using its own encoder model that the first wireless apparatus 1601 may use to train a decoder model that may be different from a decoder model used by the second wireless apparatus 1602, but which the first wireless apparatus 1601 may still use to determine a precoding matrix which, in turn, it may use to determine channel quality information to report to the second wireless apparatus 1602.

In some further example embodiments in which the first wireless apparatus 1601 (e.g., a UE) may report channel information 1605 (e.g., a channel matrix) to the second wireless apparatus 1602, a training data set including precoding information (e.g., one or more precoding matrices) 1646 calculated by the first wireless apparatus 1601 may be used. Thus, the first wireless apparatus 1601 may be aware of the corresponding precoding information 1645 obtained at the second wireless apparatus 1602. However, since the number of columns of a precoding matrix may correspond to a rank reported using an RI, the second wireless apparatus 1602 may not be aware of the size of precoding matrix, and in turn, a corresponding UCI payload size. In such an embodiment, the first wireless apparatus 1601 may report enough of a matrix (e.g., a full $N_T \times N_T$ matrix) to enable the second wireless apparatus 1602 to determine the precoding information (e.g., a precoding matrix) 1646. For example, the second wireless apparatus 1602 may then take a number of first columns of the matrix as a precoding matrix, wherein the number of first columns may be determined by (e.g., equal to) the rank as reported by the RI. In some embodiments in which the first wireless apparatus 1601 is implemented with a UE, the UE may use an existing algorithm to calculate a precoding matrix and then calculate CQI based on the precoding matrix. One or more of these operations may be controlled, supported, and/or the like, individually and/or cooperatively, by the precoding determination logic 1643.

Some additional embodiments according to the disclosure may reduce or eliminate mismatch between precoding information and channel quality information by jointly processing (e.g., compressing) channel information (e.g., a channel information matrix such as a channel matrix (H), a precoding matrix (P), and/or the like) and channel quality information (e.g., CQI) that may be determined based on the channel information. For example, in some embodiments, a generation model and a reconstruction model may be trained (e.g., in an auto-encoder configuration) to jointly compress and/or decompress channel information and channel quality information that may be determined based on the channel information.

Figure 17:
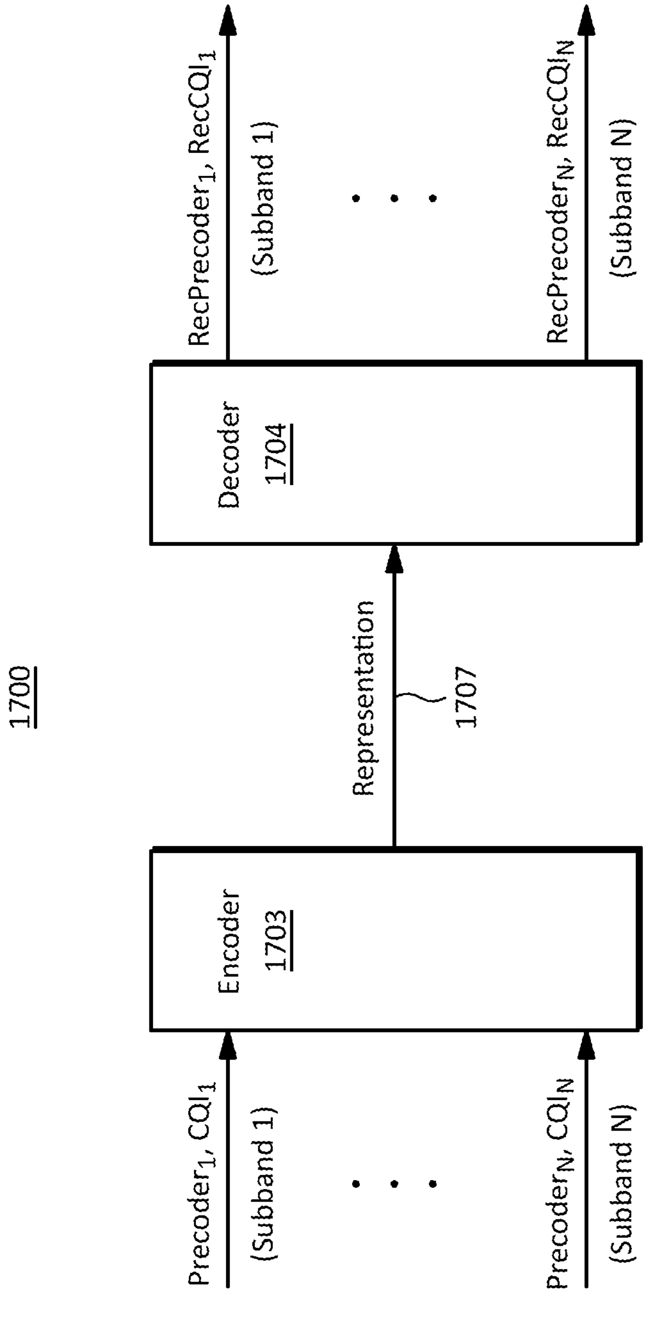
FIG. 17 illustrates an example embodiment of a pair of models that may be used for joint compression of channel information and channel quality information in accordance with the disclosure.

FIG. 17 illustrates an example embodiment of a pair of models that may be used for joint compression of channel information and channel quality information in accordance with the disclosure. The embodiment illustrated in FIG. 17 may be used, for example, to implement the generation model 403 and/or reconstruction model 404 illustrated in FIG. 4, as well as the encoder 703 and/or decoder 704 illustrated in FIG. 7.

Referring to FIG. 17, a generation model may be implemented with a machine learning encoder 1703, and a reconstruction model may be implemented with a machine learning decoder 1704. A precoding matrix and CQI for each subband i (indicated as $Precoder_i$ and $CQI_i$, respectively, for i=1, . . . , N, where N may indicate the number of subbands) may be applied as inputs to the encoder 1703 which may generate a joint representation 1707 of the inputs. A reconstructed precoding matrix and CQI for each subband i (indicated as $RecPrecoder_i$ and $RecCQI_i$, respectively, for i=1, . . . , N), may be generated as outputs of the decoder 1704 based on the joint representation 1707.

The encoder 1703 and decoder 1704 may be trained using training data that may include, for one or more (e.g., each) subband i, target channel information (e.g., target CQI) that may be, or may be based on, a precoding matrix for the subband and the CQI calculated by the UE based on the corresponding precoding matrix. The UE may calculate the precoding matrix and/or corresponding CQI for a subband using one or more existing algorithms for precoding matrix and/or CQI calculations. Once the pair of models is trained (e.g., when used for inference) a reconstructed precoding output $RecPrecoder_i$ may match a corresponding reconstructed CQI output $RecCQI_i$, for example, because the precoding information and corresponding CQI may match in the training data used to train the pair of models 1703 and 1704. Alternatively, or additionally, the training data used to train the pair of models 1703 and 1704 may be generated by any other source (e.g., a network, a base station, and/or the like) that may provide training data that may include adequate matching between precoding information (e.g., a precoding matrix) and channel quality information (e.g., CQI). One or more of these operations may be controlled, supported, and/or the like, individually and/or cooperatively, by joint processing logic that may be located at a UE, a gNB, a network, or at any other location or combination thereof.

The training of the encoder 1703 and decoder 1704 may be performed at the UE, at a base station, at a network (e.g., a server) or any other location, and the trained encoder 1703 and decoder 1704 may be transferred to a location at which it will be used for inference. For example, the encoder 1703 may be transferred to a UE (if it was not trained at the UE), and the decoder 1704 may be transferred to a base station (if it was not trained at the base station).

Although the embodiment illustrated in FIG. 17 may be described in the context of one or more precoding matrices and/or CQI as inputs and/or outputs, any type of channel information, precoding information, and/or the like may be used as inputs and/or outputs. For example, in some embodiments, for each subband, a channel matrix may be applied as an input to the encoder 1703 in addition to, or as an alternative to, the precoding matrix. In such an embodiment, for each subband, a reconstruction of the channel matrix may be reconstructed by the decoder 1704 as an output in addition to, or as an alternative to, the reconstructed precoding matrix. In some embodiments in which a channel matrix may be applied an input to the encoder 1703 as an alternative to a precoding matrix, for each subband, a UE may calculate a precoding matrix as an intermediate result from which to calculate a corresponding CQI that may be applied to the encoder 1703.

Moreover, although the embodiment illustrated in FIG. 17 may be described in the context of multiple subbands, the principles may be applied to training a pair of models to jointly compress channel information and precoding information for multiple and/or single bands, subbands, and/or the like.

In some embodiments, in addition to potentially providing matching between channel information components such as CQI and precoding information, joint compression (e.g., for joint reporting) may provide one or more other potential benefits, depending on the implementation details. For example, employing different ML models (e.g., encoders and/or decoders) for reporting of each channel information quantity (e.g., RI, CQI, PMI, and/or the like) may increase the time, complexity, and/or the like, involved with training and/or inference for different models. However, embodiments in accordance with the disclosure may use joint compression (and/or joint reporting) for values such as RI, CQI, PMI, channel matrices, precoding matrices, and/or the like, which may, depending on the implementation details, reduce the time, complexity, and/or the like, involved with training and/or inference. Some embodiments may increase the size of a model used for joint compression and/or reporting based, for example, on different distributions of the channel information quantities, to improve compression performance. In some embodiments, a wireless apparatus (e.g., a UE) may be configured with different encoders and/or decoders wherein each encoder, decoder, pair of models, and/or the like, may be associated with an identifier (e.g., a model ID) and mapped to a certain combination of channel information quantities. In some embodiments, more than one model may be mapped to the same set of quantities wherein different encoders, decoders, pairs of models, and/or the like, (identified by different model IDs) may be used to address different channel environments, configurations, and/or the like.

CQI Compression Across Subbands

In an NR system, a UE may report CQI using compression with a differential scheme which may be based on the CQI of different subbands deviating around a wide-band value. For example, instead of reporting CQI using 4*N_sb bits (where N_sb may indicate a number of subbands), a UE may report a wideband CQI value along with a differential value of CQI using 2 bits per subband. However, such a reporting scheme may not provide adequate compression in some implementations, especially, for example, in systems that may use frequency division duplexing (FDD) and/or increased antenna sizes which may have relatively large feedback reporting quantities.

Schemes for compressing and/or reporting channel information using machine learning in accordance with the disclosure may compress a combination of channel information for a set of subbands. Such an embodiment may be beneficial, for example, for compressing and/or reporting quantities such as CQI for which a UE may be configured to report subband CQI for one or more (e.g., each or a subset of) subbands for a channel information report. Depending on the implementation details, a scheme for compressing and/or reporting channel information on a subband basis using machine learning in accordance with the disclosure may exploit one or more correlations (e.g., in time, frequency, and/or spatial domains) to improve performance and/or flexibility, reduced complexity, and/or the like.

Figure 18:
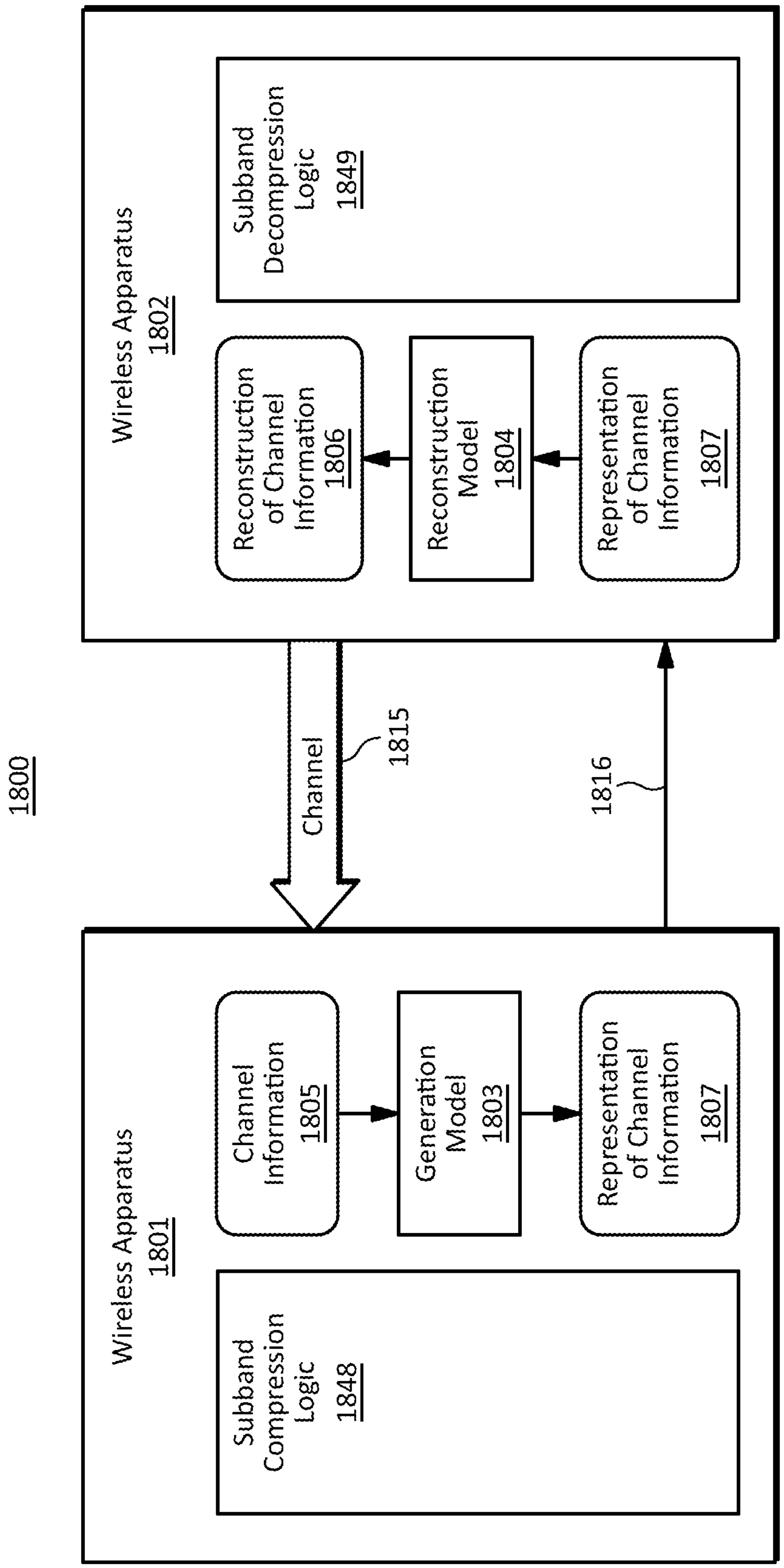
FIG. 18 illustrates an embodiment of a system having a pair of models to channel information based on one or more subbands according to the disclosure.

FIG. 18 illustrates an embodiment of a system having a pair of models to channel information based on one or more subbands according to the disclosure. The system 1800 illustrated in FIG. 18 may be used to implement, or may be implemented with, any of the apparatus, models, training schemes, and/or the like disclosed herein.

The system 1800 may include one or more elements (e.g., components, operations, and/or the like) that may be similar to those in the embodiment illustrated in FIGS. 4 and/or FIG. 16 in which similar elements may be indicated by reference numbers ending in, and/or containing, the same digits, letters, and/or the like. However, in the system 1800 illustrated in FIG. 18, the first wireless apparatus 1801 may include subband compression logic 1848. Additionally, or alternatively, the second wireless apparatus 1802 may include subband decompression logic 1849. The subband compression logic 1848 and/or subband decompression logic 1849 may implement, individually and/or cooperatively, one or more schemes to enable the first wireless apparatus 1801 to compress a combination of channel information for a set of (e.g., one or more) subbands.

For example, at the first wireless apparatus 1801 (e.g., a UE) the subband compression logic 1848 may concatenate values of channel information 1805 for multiple subbands into a vector which may be compressed by generation model 1803 to generate a representation 1807 of the values of channel information 1805 for multiple subbands. At the second wireless apparatus 1802 (e.g., a base station), the reconstruction model 1804 may recover the vector, or an approximation of the vector, which the subband decompression logic 1849 may divide into individual subbands to generate the reconstructed channel information 1806, or an approximation thereof, for multiple subbands.

Figure 19:
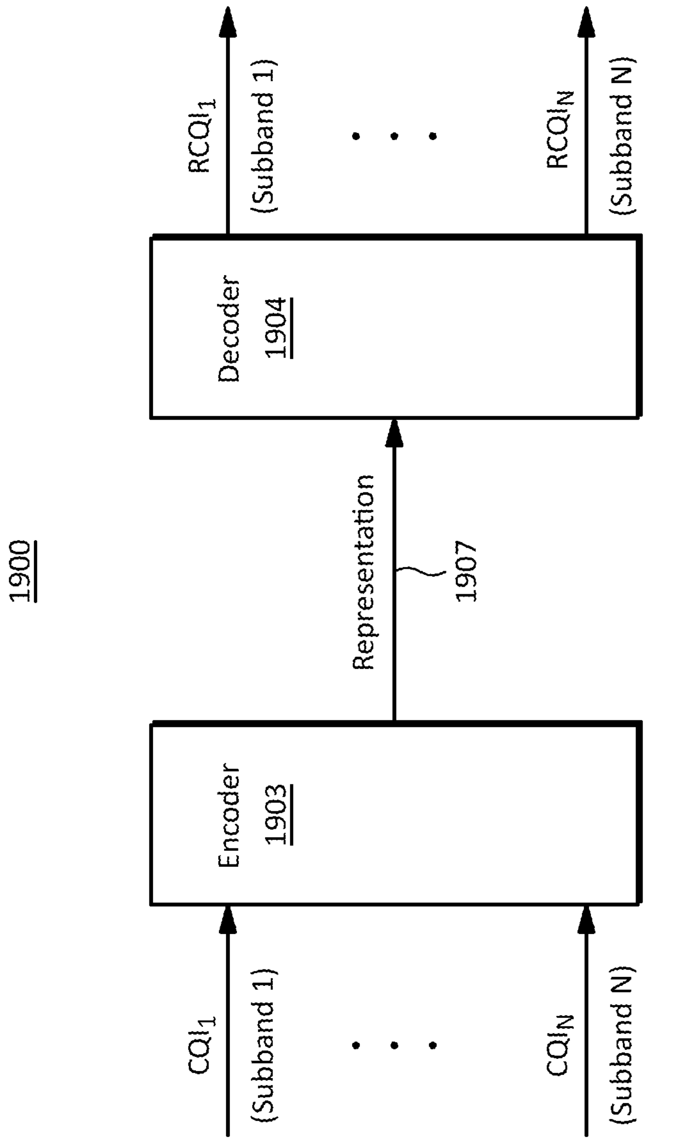
FIG. 19 illustrates an embodiment of a pair of models that may be used for CQI compression across subbands in accordance with the disclosure.

FIG. 19 illustrates an embodiment of a pair of models that may be used for CQI compression across subbands in accordance with the disclosure. The embodiment illustrated in FIG. 19 may be used, for example, to implement the generation model 1803 and/or reconstruction model 1804 illustrated in FIG. 18. For purposes of illustration, the first wireless apparatus 1801 and second wireless apparatus 1802 may be implemented as a UE and gNB, respectively, when used with the system 1900.

Referring to FIG. 19, a generation model may be implemented with a machine learning encoder 1903, and a reconstruction model may be implemented with a machine learning decoder 1904. A CQI vector ($CQI_1$, $CQI_2$, . . . , $CQI_N$) may include a CQI value for one or more (e.g., each) of subbands 1, 2, . . . , N (where N may indicate a number of subbands). The CQI vector ($CQI_1$, $CQI_2$, . . . , $CQI_N$), may be formed, for example, by concatenating the individual CQI values $CQI_1$, $CQI_2$, . . . , $CQI_N$ for the subbands. The QI vector may be applied to the encoder 1903 such that each value $CQI_I$, $CQI_2$, . . . , $CQI_N$ may be a separate input to the encoder 1903 as illustrated in FIG. 19. Alternatively, or additionally, the entire CQI vector may be applied to the encoder 1903 as a single input. The encoder 1903 may use the CQI vector and/or individual CQI values to generate a representation 1907 of the values of channel information for multiple subbands.

The decoder 1904 may receive the representation 1907 and generate reconstructed CQI values $RCQI_1$, $RCQI_2$, . . . , $RCQI_N$ for subbands 1, 2, . . . , N as separate individual outputs and/or as a reconstructed vector ($RCQI_1$, $RCQI_2$, . . . , $RCQI_N$) which may be divided (e.g., by subband decompression logic) to provide individual outputs for one or more subbands.

In some embodiments, one or more of the CQI values $CQI_1$, $CQI_2$, . . . , $CQI_N$ may be provided in the form of an input (e.g., a discrete input) to a CQI table (e.g., a CQI index which may be, for example, a scalar value between 0 and 15). For example, a CQI value $CQI_i$ (where i=1, 2, . . . , N) may be a 4-bit value if the CQI table has sixteen rows. Alternatively, or additionally, one or more of the CQI values $CQI_1$, $CQI_2$, . . . , $CQI_N$ may be provided in the form of a continuous value (e.g., an arbitrary real number value) of a coding rate and/or a modulation order. In an embodiment using one or more continuous values as CQI values, a modulation and coding scheme (MCS) table with a relatively higher resolution may be used, for example, to accommodate a finer granularity indication by a gNB.

Depending on the implementation details, a scheme for compressing and/or reporting channel information (e.g., CQI) on a subband basis as described above with respect to FIG. 18 and FIG. 19 may exploit one or more correlations in the input data (e.g., between elements of a CQI vector) to improve performance and/or flexibility, reduced complexity, and/or the like. For example, an encoder 1903 may be able to compress a CQI vector having multiple elements with the same or similar value to a greater extent that a CQI vector having diverse values.

In some embodiments, one or more of the encoder 1903, decoder 1904, generation model 1803, and/or reconstruction model 1804 may be implemented with a machine learning model that may be adapted to work with inputs having different correlation properties. Thus, for example, a model used to compress CQI values across subbands may be specialized (e.g., a dedicated model as opposed to a general ML model) to improve or optimize compression performance based, for example, on ranges of input values, vector and/or matrix dimensions, weights, and/or the like.

Compression for Channel Information

In an NR system, a UE may use a codebook to compress a precoding matrix in spatial and/or frequency domains. For example, a UE may report (e.g., to a gNB) an RI and a PMI associated with the RI. The rank indicated by the RI and PMI may together be used to determine a precoding matrix. For example, a PMI may be selected from a set of supported matrices which may be referred to as codebooks. In some embodiments, a codebook may be implemented as a table of mappings between a set of "i" indices to a precoding matrix. For example, a UE may use the indices ($i_{1,1}$, $i_{1,2}$, $i_{1,3}$, $i_2$) with a Type-1 single panel codebook which may uniquely define a precoding matrix for a given rank. However, codebook compression schemes may not provide adequate compression in some implementations, especially, for example, in systems that may use frequency division duplexing (FDD) and/or increased antenna sizes which may have relatively large feedback reporting quantities.

Schemes for compressing and/or reporting channel information using machine learning in accordance with the disclosure may use one or more decoder models to generate precoding information and/or other information that may be used, for example, to determine precoding information. In some embodiments, such a scheme may mimic a codebook scheme and/or implement a hierarchical compression mechanism. In some embodiments, such a scheme may implement one or more encoders and/or decodes having specific structures for compression in time, frequency, and/or spatial domains. Depending on the implementation details, such a scheme may improve performance and/or flexibility, reduce complexity, and/or the like.

Figure 20:
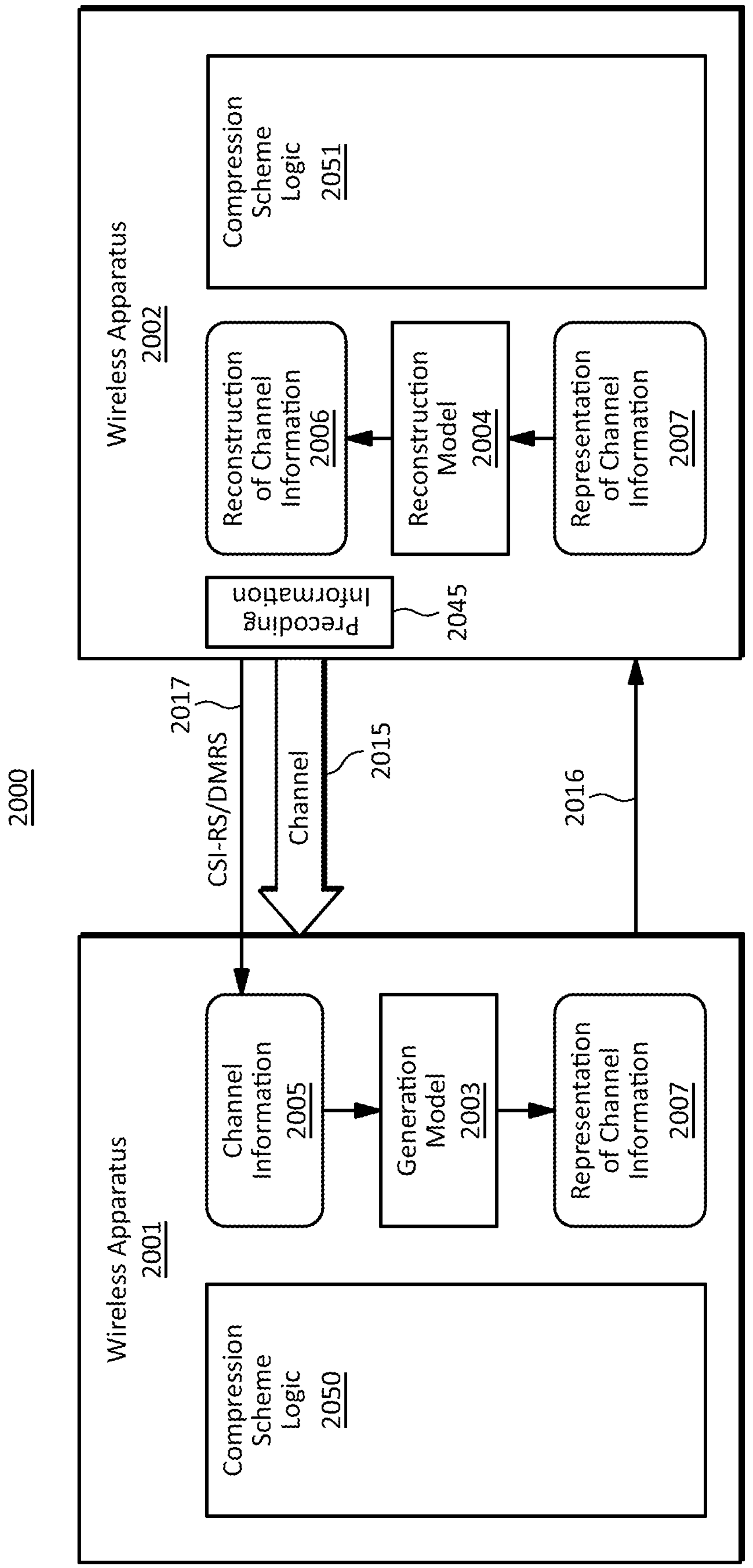
FIG. 20 illustrates an embodiment of a system having a pair of models to provide channel information compression according to the disclosure.

FIG. 20 illustrates an embodiment of a system having a pair of models to provide channel information compression according to the disclosure. The system 2000 illustrated in FIG. 20 may be used to implement, or may be implemented with, any of the apparatus, models, training schemes, and/or the like disclosed herein. The system 2000 may include one or more elements (e.g., components, operations, and/or the like) that may be similar to those in the embodiments illustrated in FIG. 4, FIG. 16, and/or FIG. 18 in which similar elements may be indicated by reference numbers ending in, and/or containing, the same digits, letters, and/or the like.

In the system 2000 illustrated in FIG. 20, a first wireless apparatus (e.g., a UE) 2001 may receive a signal (e.g., a reference signal) 2017 from a second wireless apparatus (e.g., a base station) 2002 through a channel 2015. The second wireless apparatus 2002 may apply precoding information (e.g., a precoding matrix) 2045 to the signal 2017. The first wireless apparatus 2001 may include compression scheme logic 2050. Additionally, or alternatively, the second wireless apparatus 2002 may include compression scheme logic 2051. The compression scheme logic 2050 and/or 2051 may implement, individually and/or cooperatively, one or more schemes to enable the first wireless apparatus 2001 and the second wireless apparatus 2002 to implement one or more compression schemes for generating a representation 2016 of the channel information 2005.

The embodiment illustrated in FIG. 20 is not limited to any specific forms of channel information 2005 applied to the generation model 2003 and/or any specific forms of reconstructed channel information 2006 generated by the reconstruction model 2004. For example, in some example embodiments, the generation model 2003 and the reconstruction model 2004 may be implemented with an encoder and a decoder, respectively (e.g., configured as an auto-encoder), which may be configured and/or trained to generate, using one or more compression schemes, precoding information from channel information such as a channel matrix. In such an embodiment, the first wireless apparatus 2001, which may be implemented as a UE, may perform one or more CSI-RS measurements to obtain channel information such as one or more channel matrices, eigenvectors, and/or the like. The UE may apply the channel information to an encoder to generate a codeword that the UE may send to the second wireless apparatus 2002 which may be implemented as a base station (e.g., a gNB). The base station may apply the codeword to a decoder to construct a precoding matrix. In such an embodiment, the codeword may mimic one or more codebook indices, and/or the decoder may mimic a codebook, but depending on the implementation details, a scheme with one or more decoders as described above may improve performance and/or flexibility, reduce complexity, and/or the like.

In other embodiments, however, the channel information 2005 and/or the reconstruction of channel information 2006 may be implemented in any other form. For example, rather than generating a precoding matrix as an output of the generation model 2003 based on channel information applied as an input to the generation model 2003, the generation model 2003 and the reconstruction model 2004 may be trained so the reconstruction model 2004 may reconstruct channel information, or an approximation thereof, applied as an input to the generation model 2003. The second wireless apparatus 2002 may then use the reconstructed channel information to determine (e.g., calculate) a precoding matrix. It yet other embodiments, the channel information 2005 and/or the reconstruction of channel information 2006 may be implemented with CQI, RI, and/or any other type of information.

In an embodiment in which an encoder at a UE and a decoder at a base station may be configured and/or trained to generate precoding information such as a precoding matrix from channel information such as a channel matrix, the output of the decoder (and post processing, if any) may be a precoding matrix. In some such embodiments, the UE may also be configured with a decoder that is trained to provide an output that is the precoding matrix. The decoder at the UE may be obtained, for example, from the base station which may share the decoder model including weights, input and/or output dimensions, and/or the like. In some embodiments, the UE and base station may have a common understanding of the decoder output type (e.g., how the precoding information may be constructed from the decoder output).

In embodiments in which a post-processing scheme may be applied after the decoder, the pre-processing scheme may be shared with the UE. The UE may be provided one or more implicit and/or explicit indications of how to construct precoding information (e.g., a precoding matrix) from an output of the decoder (and any post-processing, if any). For example, if the output dimension of the decoder is $N_t$*v where v is a rank indicated by an RI, the precoder may be constructed by reshaping the output vector into an $N_t$×v matrix on a column-wise and/or row-wise basis.

Some embodiments of training and/or testing schemes for the system illustrated in FIG. 20 are described below. For purposes of illustration, the embodiments of training and/or testing schemes may be described in the context of a system in which the first and second wireless apparatus 2001 and 2002 may be implemented with a UE and gNB, respectively, and the generation model 2003 and the reconstruction model 2004 may be implemented with an encoder and a decoder, respectively. The principles, however, are not limited to these or any other implementation details.

In a first embodiment of a training and/or testing scheme, the encoder and decoder may be jointly designed, configured, trained, and/or the like (for example, by a UE vendor and a gNB vendor, respectively), based on a training data set that may include a set (X, Y) where X may refer one or more CSI-RS measurements such as channel matrices of a set of CSI-RSs taken, for example, in a time and frequency window, and Y may refer to precoding matrix that may be calculated, for example, by the UE. The decoder may be shared with (e.g., transferred to) the UE for use during inference, for example, to generate a precoding matrix the UE may use for CSI-RS measurements. During inference, the UE may apply the encoder in a manner similar to that used during training.

In a second embodiment of a training and/or testing scheme, a gNB may train the decoder using a training data set that may or may not be obtained from the UE. The gNB may share the decoder with the UE including the one or more weights, input and/or output dimensions, post processing, and/or the like. In some embodiments, the training of an encoder as well as one or more input type and/or dimension may be determined by the UE, based for example, on the implementation of the UE. When training the encoder, the UE may seek to minimize a loss function between the output of the decoder $P_{dec}$ and a desired target precoder $P_{target}$ which may be calculated by the UE. In some embodiments, the gNB may configure the UE with one or more time and/or frequency windows and the CSI-RSs used in the windows which may be used as training data to train the encoder. The UE may then use the trained encoder for inference.

In a third embodiment of a training and/or testing scheme, a gNB may train a decoder based on a training data set that may or may not be obtained from the UE may share the decoder with the UE including the one or more weights, input and/or output dimensions, post processing, and/or the like. In some embodiments, the training of an encoder as well as one or more input type and/or dimension may be determined by the UE, based for example, on the implementation of the UE. In this type of embodiment, however, the gNB may also share the training data set for training the encoder, including one or more inputs and/or labels, with the UE. The UE may then use the shared training data set to train the encoder for use during inference.

In any of the three embodiments of training and/or testing schemes described above, because the precoding matrix dominions may depend on the reported rank, the UE may apply one or more different models for one or more different reported ranks. For example, if a UE reports a first rank as the RI, the UE may use a first encoder model trained for a first decoder, while if UE reports a second rank as the RI, the UE may use a second encoder model trained for a second decoder model.

In any of the three embodiments of training and/or testing schemes described above, depending on the implementation details, the decoder may be characterized as performing a role similar to that of an NR codebook, however, with the potential for the machine learning decoder model to improve performance and/or flexibility, reduce complexity, and/or the like, compared to the use of a codebook.

Figure 21:
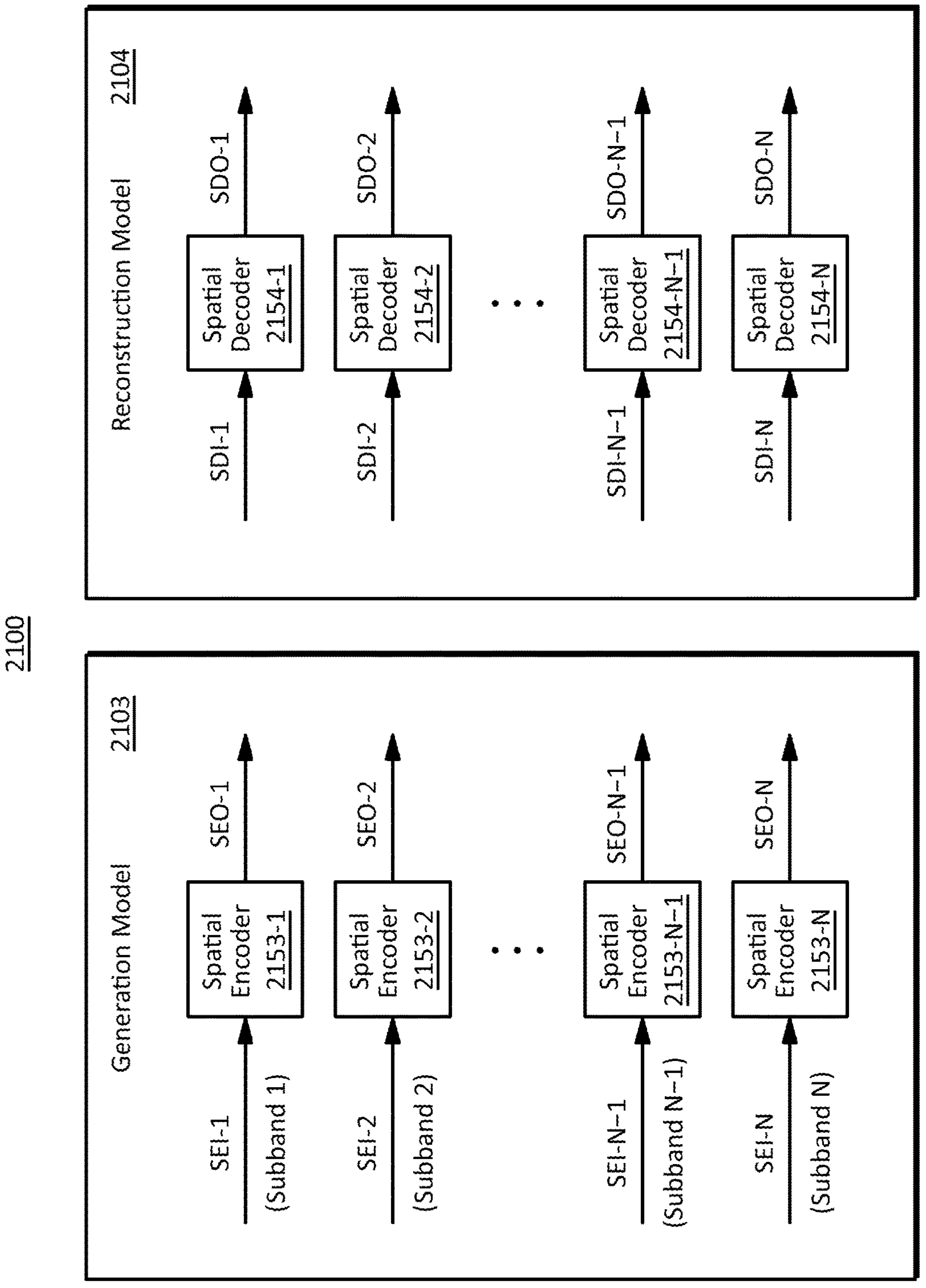
FIG. 21 illustrates a first embodiment of a pair of models that may be used for implementing a compression scheme in accordance with the disclosure.

FIG. 21 illustrates a first embodiment of a pair of models that may be used for implementing a compression scheme in accordance with the disclosure. The embodiment 2100 illustrated in FIG. 21 may be used, for example, to implement the generation model 2003 and the reconstruction model 2004 illustrated in FIG. 20.

Referring to FIG. 21, the embodiment 2100 may include a generation model 2103 and a reconstruction model 2104 that may be configured, for example, to operate as an auto-encoder. The generation model 2103 (which may be located, for example, at a UE) may include one or more spatial encoders 2153-1 through 2153-N that may be arranged to receive one or more spatial encoder inputs SEI-1 through SEI-N, respectively, corresponding to channel information for subbands 1, 2, . . . , N where N may refer to the number of subbands. The one or more spatial encoders 2153-1 through 2153-N may generate one or more spatially compressed outputs SEO-1 through SEO-N based on the corresponding encoder inputs SEI-1 through SEI-N, respectively.

The compressed outputs SEO-1 through SEO-N may be transferred to the reconstruction model 2104 (which may be located, for example, at a base station) where they may be applied as subband decoder inputs SDI-1 through SDI-N, respectively, to one or more spatial decoders 2154-1 through 2154-N, respectively. The one or more spatial decoders 2154-1 through 2154-N may spatially decompress the decoder inputs SDI-1 through SDI-N, respectively, to generate one or more decompressed outputs SDO-1 through SDO-N, respectively.

Although not limited to any specific implementation details, in some embodiments, the encoder inputs SEI-1 through SEI-N may be implemented as channel matrices $$H_1^i$$

(where i=1, 2, . . . , N) for the corresponding subbands, and the spatial encoder outputs SEO-1 through SEO-N may be implemented as representations $$v_1^i$$

of precoding matrices $$P_1^i$$

for the corresponding subbands. The spatial decoders 2154-1 through 2154-N may then generate the decompressed outputs SDO-1 through SDO-N as reconstructed precoding matrices $$\hat{P}_1^i$$

from the representations $$v_1^i.$$

Thus, reporting of precoding information may be performed independently in different subbands.

In some embodiments, the spatial encoders 2153-1 through 2153-N may perform spatial compression operations in parallel, for example, in embodiments in which the spatial encoders 2153-1 through 2153-N may be implemented with more than one set of hardware (e.g., a separate processor, circuit, and/or the like for each encoder). In some other embodiments, one or more of the spatial encoders 2153-1 through 2153-N may perform spatial compression operations sequentially, for example, in embodiments in which the spatial encoders 2153-1 through 2153-N may be implemented with fewer than N instances of hardware (e.g., single separate processor, circuit, and/or the like for all N encoders). Similarly, the spatial decoders 2154-1 through 2154-N may perform spatial decompression operations in parallel or sequentially depending, for example, on the number of hardware sets used to implement the decoders.

Figure 22:
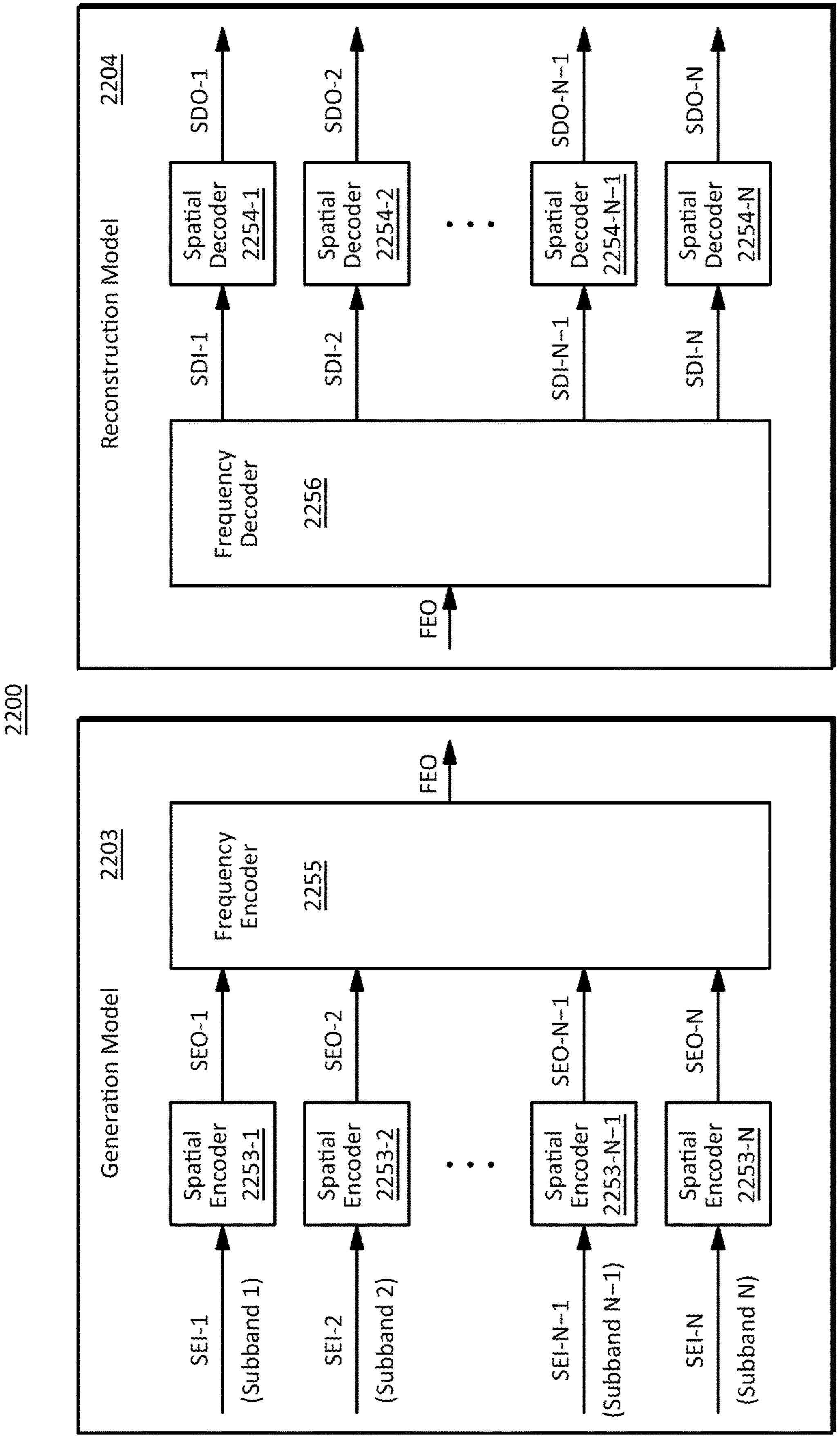
FIG. 22 illustrates a second embodiment of a pair of models that may be used for implementing a compression scheme in accordance with the disclosure.

FIG. 22 illustrates a second embodiment of a pair of models that may be used for implementing a compression scheme in accordance with the disclosure. The embodiment 2200 illustrated in FIG. 22 may be used, for example, to implement the generation model 2003 and the reconstruction model 2004 illustrated in FIG. 20. The embodiment 2200 may include one or more elements (e.g., components, operations, and/or the like) that may be similar to those in the embodiment illustrated in FIG. 21 in which similar elements may be indicated by reference numbers ending in, and/or containing, the same digits, letters, and/or the like.

Referring to FIG. 22, the embodiment 2200 may include a generation model 2203 and a reconstruction model 2204 that may be configured, for example, to operate as an auto-encoder. The generation model 2203 (which may be located, for example, at a UE) may include one or more spatial encoders 2253-1 through 2253-N that may be arranged to receive one or more spatial encoder inputs SEI-1 through SEI-N, respectively, corresponding to channel information for subbands 1, 2, . . . , N where N may refer to the number of subbands. The one or more spatial encoders 2253-1 through 2253-N may generate one or more spatially compressed outputs SEO-1 through SEO-N based on the corresponding encoder inputs SEI-1 through SEI-N, respectively.

The generation model 2203 may further include a frequency encoder 2254 that may be arranged to receive the one or more spatially compressed outputs SEO-1 through SEO-N and generate a spatially and frequency compressed representation FEO of the subband encoder inputs SEI-1 through SEI-N.

The compressed representation FEO may be transferred to the reconstruction model 2204 (which may be located, for example, at a base station) where it may be applied as an input to a frequency decoder 2256 that may generate one or more spatially decompressed outputs SDI-1 through SDI-N, corresponding to subbands 1, 2, . . . , N, respectively, that may be decompressed in the frequency domain but still compressed in the spatial domain. The N outputs of the frequency decoder 2256 may be applied as inputs SDI-1 through SDI-N to one or more spatial decoders 2254-1 through 2254-N, respectively. The one or more spatial decoders 2254-1 through 2254-N may spatially decompress the decoder inputs SDI-1 through SDI-N, respectively, to generate one or more decompressed outputs SDO-1 through SDO-N, respectively, which may be decompressed in both the frequency and spatial domains. Thus, spatial compression and decompression of precoding information may be performed independently in different subbands, whereas frequency compression and decompression may be performed simultaneously across subbands.

Although not limited to any specific implementation details, in some embodiments, the inputs SEI-1 through SEI-N of the spatial encoders 2253-1 through 2253-N may be implemented as channel matrices $$H_1^i$$

(where i=1, 2, . . . , N) for corresponding subbands, and the spatial encoder outputs SEO-1 through SEO-N may be implemented as spatially compressed representations $$v_1^i$$

of precoding matrices $$P_1^i$$

for the corresponding subbands. The frequency encoder 2255 may compress the representations $$v_1^i$$

in the frequency domain to generate the output FEO as a representation vector v, which may be compressed in both the frequency and spatial domains. The frequency decoder 2256 may decompress the representation vector v, in the frequency domain to reconstruct the spatially compressed representations $$v_1^i$$

which may be applied as one or more inputs SDI-1 through SDI-N to the one or more spatial decoders 2154-1 through 2154-N which may then generate the decompressed outputs SDO-1 through SDO-N as reconstructed precoding matrices $$\hat{P}_1^i$$

from the representations $$v_1^i.$$

Thus, in the embodiment illustrated in FIG. 22, the generation model 2203 may operate in two stages. In a first stage, precoding information may be compressed at each subband independently via spatial domain compression. At this stage, N encoder models may be used, e.g., one encoder model for each subband. The models may be the same or different depending, for example, on various parameters relating to different subbands within a channel. In the second stage, one encoding model may be used to jointly compress, in the frequency domain, the spatially compressed precoding information of the subbands. In some embodiments, the outputs SEO-1 through SEO-N of the one or more spatial encoders 2253-1 through 2253-N may represent the precoding matrices of each subband without using inter-subband correlation. The frequency decoder 2256 may then frequency compress the per-subband, spatially compressed precoding matrices and compress them into a vector v, which may include information to represent all of the precoding matrices. Thus, the embodiment illustrated in FIG. 22 may provide frequency domain decompression and a per-subband decoder model which may reconstruct the precoding matrix for each subband.

In some embodiments, the spatial encoders 2253-1 through 2253-N and/or the frequency encoder 2255 may perform compression operations in parallel, for example, in embodiments in which the spatial encoders 2253-1 through 2253-N and the frequency encoder 2255 may be implemented with more than one set of hardware (e.g., a separate processor, circuit, and/or the like for each encoder). In some other embodiments, one or more of the spatial encoders 2253-1 through 2253-N and/or the frequency encoder 2255 may perform compression operations sequentially, for example, in embodiments in which the spatial encoders 2253-1 through 2253-N and/or the frequency encoder 2255 may be implemented with fewer than N+1 instances of hardware (e.g., single separate processor, circuit, and/or the like for all N+1 encoders). Similarly, the spatial decoders 2254-1 through 2254-N and/or the frequency decoder 2256 may perform spatial decompression operations in parallel or sequentially depending, for example, on the number of hardware sets used to implement the decoders.

Figure 23:
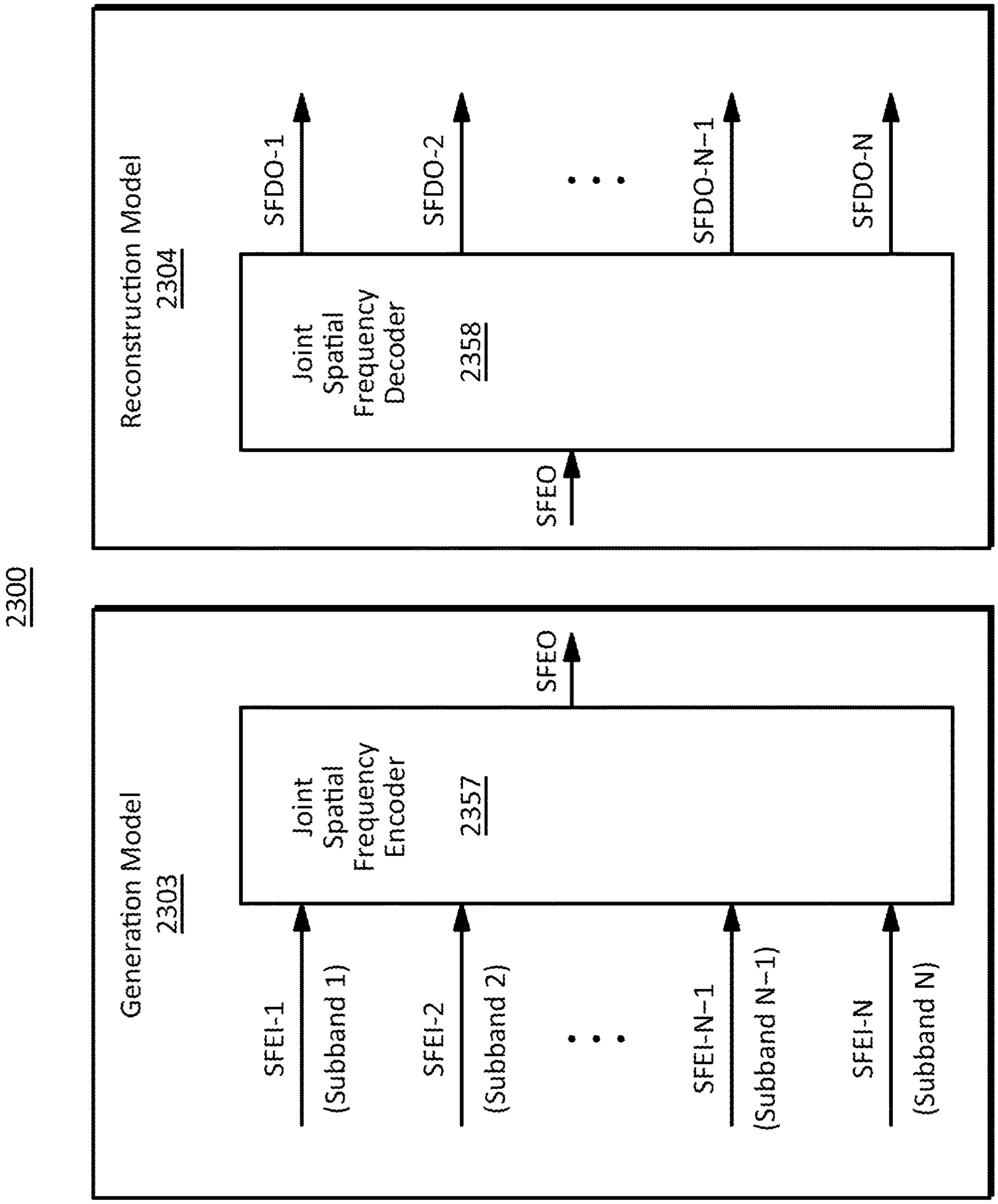
FIG. 23 illustrates a third embodiment of a pair of models that may be used for implementing a compression scheme in accordance with the disclosure.

FIG. 23 illustrates a third embodiment of a pair of models that may be used for implementing a compression scheme in accordance with the disclosure. The embodiment 2300 illustrated in FIG. 23 may be used, for example, to implement the generation model 2003 and the reconstruction model 2004 illustrated in FIG. 20. The embodiment 2300 may include one or more elements (e.g., components, operations, and/or the like) that may be similar to those in the embodiment illustrated in FIG. 21 and/or FIG. 22 in which similar elements may be indicated by reference numbers ending in, and/or containing, the same digits, letters, and/or the like.

Referring to FIG. 23, the embodiment 2300 may include a generation model 2303 and a reconstruction model 2304 that may be configured, for example, to operate as an auto-encoder. The generation model 2303 (which may be located, for example, at a UE) may include a joint spatial and frequency encoder 2357 that may receive one or more encoder inputs SFEI-1 through SFEI-N, respectively, corresponding to channel information for subbands 1, 2, . . . , N where N may refer to the number of subbands. The joint spatial and frequency encoder 2357 may generate an output SFEO that may be a spatially and frequency compressed representation of the encoder inputs SFEI-1 through SFEI-N.

The spatially and frequency compressed representation SFEO may be transferred to the reconstruction model 2304 (which may be located, for example, at a base station) where it may be applied as an input to a joint spatial and frequency decoder 2358 that may generate one or more decoder outputs SFDO-1 through SFDO-N, corresponding to subbands 1, 2, . . . , N, respectively, that may be decompressed in the both the spatial and frequency domains. Thus, spatial and frequency compression may be performed simultaneously across subbands, and spatial and frequency decompression may be performed simultaneously across subbands.

Although not limited to any specific implementation details, in some embodiments, the inputs SFEI-1 through SFEI-N may be implemented as channel matrices $$H_1^i$$

(where i=1, 2, . . . , N) for corresponding subbands, and the output SFEO may be implemented as a representation vector v that may be a spatially and frequency compressed representation of N precoding matrices corresponding to the N subbands. The joint spatial and frequency decoder 2358 may decompress the representation vector v, in the spatial and frequency domains to recover the reconstructed precoding matrices $$\hat{P}_1^i.$$

Thus, in some implementations, in the embodiment 2300 illustrated in FIG. 23, the joint spatial and frequency encoder 2357 may be characterized as calculating the precoding matrices $$P_1^N$$

jointly and compressing them into a vector v, and the joint spatial and frequency decoder 2358 may be characterized as recovering the matrices as $$\hat{P}_1^N.$$

In some embodiments, spatial correlation may refer to correlation across one or more transmit (Tx) antenna ports. Any of the embodiments disclosed above may implement spatial compression individually (e.g., on a per-layer basis), or jointly across multiple (e.g., all) layers of a channel. For example, in some embodiments, a precoding matrix may be applied as an input to an encoder. For instance, a 4×3 precoding matrix may have three layers (e.g., columns) with each layer having a precoding vector of length four (e.g., four rows). In some embodiments, spatial compression may be implemented jointly across multiple layers (e.g., all layers) by applying the entire matrix to the encoder. Alternatively, or additionally, spatial compression may be implemented on a per-layer basis, for example, by applying layers (e.g., columns) of the matrix to the encoder one layer at a time (e.g., one vector (column) with four elements (rows) at a time). The number of layers may be indicated, for example, by RI.

In an NR system, one or more of the following constraints may be implemented on channel information reporting. A UE may calculate CSI parameters (if reported) assuming the following dependencies between CQI parameters (if reported): LI may be calculated conditioned on the reported CQI, PMI, RI, and CRI; CQI may be calculated conditioned on the reported PMI, RI, and CRI; PMI may be calculated conditioned on the reported RI and CRI; and/or RI may be calculated conditioned on the reported CRI.

In some embodiments, one or more of the ML-based compression and/or reporting schemes disclosed herein may implement one or more constraints that, depending on the implementation details, may be similar to those described above. Thus, in some embodiments, if a UE reports CQI, then CQI for one or more subbands (e.g., each subband) may be calculated based on the reported precoding information (e.g., precoding matrix) for that subband. For example, with the embodiment described with respect to FIG. 21, CQI for subband may be calculated based on the precoding matrix $\hat{P}_i$ which may involve sharing of the decoder with the UE. In an embodiment in which the decoder may not be shared with the UE, the UE may calculate the CQI based on the information for each subband #i. As another example, with the embodiments described with respect to FIG. 22 and FIG. 23, the UE may calculate the CQI for subband #i based on the sub-band PMI i or the decoder output $\hat{P}_1$ if the decoder is shared with the UE. In some embodiments, for the purpose of specifying this condition, the precoding information (e.g., PMI) of each subband may refer to the subband encoder output (or input) or the corresponding decoder output, which may, depending on the implementation details, assume that they each represent the subband precoding matrix.

In an NR system, the bit width of reported channel information quantities may depend on one or more RRC parameters. In some embodiments, the bit width used to report precoding information (e.g., PMI) may additionally depend on the rank reported by RI. Within a framework for reporting channel information using machine learning in accordance with the disclosure, if RI, CQI, and an encoder codeword (e.g., an output of encoder representing channel information) are all transmitted in the same PUCCH, then one or more mechanisms may be implemented to ensure the same understanding between a UE and a base station about the UCI payload size. Because a bit width for precoding information (e.g., PMI) may depend on the RI, in some embodiments, precoding information may be reported separately in a PUCCH other than the PUCCH carrying the RI. In some other embodiments, the UCI payload may be appended with one or more elements (e.g., zeros) where the number of the elements may depend on the indicated rank. For example, if $N_{max}$ is the maximum UCI payload size over all possible supported ranks, then for a given rank v to report with a payload size of N(v) a UE may append $N_{max-v}$ zeros to the UCI payload.

Processing Time

In some embodiments (e.g., as part of life cycle management (LCM)), a base station may instruct a UE to update a current active model (e.g., to fine tune a new data set), switch to a new model, activate a new model, deactivate a model, and/or the like. When updating a model, if a UE is instructed to update an encoder model based on an online training set (which may be collected via channel estimation, RRC configured, MAC-CE activated, and/or the like) the UE may use (e.g., require) a minimum amount of time to update the model. A UE may use (e.g., require) a minimum amount of time regardless of whether UE will share its updated model with the base station.

In some embodiments, if the online training set is collected by a UE via online channel estimation, the UE may not be expected to update the model before the expiration of an amount of time that may be expressed, for example, as a number of symbols (which may be referred to, for example, as $N_{AIML,update}$ symbols) from the end of the last symbol of the latest CSI-RS used for the online training set. In some embodiments, if the UE is configured to report the updated model to the base station, the UE may not be expected to report the model to the gNB earlier than an amount of time that may be expressed, for example, as a number of symbols (which may be referred to, for example, as $N_{AIML,report}$ symbols) from the last symbol of the latest CSI-RS used in the training set.

In some embodiments, if a training set is RRC configured to a UE, the UE may not be expected to update, or update and report, an encoder earlier than an amount of time that may be expressed, for example, as a number of symbols (which may be referred to, for example, as N symbols) from the latest symbol at which an update command may have been triggered.

In some embodiments, when a UE is instructed to switch to a new model, the UE may be provided with a processing time similar to that provided for updating a model. For example, if a UE receives a command (e.g., via DCI, MAC CE, RRC, and/or the like) to switch to a new model, the UE may not be expected to switch to the model (which may involve activating the model) before a period of time that may be expressed as a number of symbols (which may be referred to, for example, as $N_{AIML,switch}$ symbols) from the end of the last symbol at which the switch command may be delivered to the UE (e.g., the last symbol of the PDCCH).

In some embodiments, a similar processing time may be provided to a UE for activating a model. For example, if UE receives a command (e.g., via DCI, MAC CE, RRC, and/or the like) to activate and/or deactivate to a model, the UE may not be expected to activate and/or deactivate the model before a period of time that may be expressed as a number of symbols (which may be referred to, for example, as $N_{AIML,activate}$ and/or $N_{AIML,deactivate}$ symbols) from the end of the last symbol at which the switch command may be delivered to the UE (e.g., the last symbol of the PDCCH).

In some embodiments, one or more of the processing times described above may be described in time units based on the subcarrier spacing (SCS) numerologies of the cell delivering the command and/or the cell the model may be tested for (e.g., the cell the corresponding CSI report may be transmitted on). In some embodiments, the SCS of the cell the model is active on may also be considered. For example, a number of symbols used to express an amount of time (such as those mentioned in the methods described above) may be described in terms of the smallest SCS among the SCS values.

In some embodiments, a UE may declare (e.g., based on a query by a base station) one or more capabilities for processing time, for example, PDSCH and/or PUSCH processing time capabilities. Additionally, or alternatively a UE may also declare a capability for any of the processing times disclosed herein. For example, in some embodiments, a UE may declare a minimum amount of time or minimum number of symbols it may support (e.g., may use or require) for $N_{AIML,upadte}$, $N_{AIML,switch}$ and $N_{AIML,activate}$/$N_{AIML,deactivate}$. For instance, a UE may declare to a base station that it has a capability (e.g., minimum processing time) for model switching of 20 symbols which may mean that the UE may not be expected to switch to the new model before 20 symbols after the ending symbol of the switch command.

Reporting with Separate Models

Within an AI/ML channel information reporting framework, if a UE reports a channel matrix, a gNB may infer the channel quality including the rank, eigenvectors, and/or eigenvalues, and hence the SVD precoding matrix. However, since the performance may depend on UE downlink signal processing, including the UE's capability on supported rank, its UE-specific precoding information (e.g., precoding matrix) calculation algorithm, within an AI/ML CSI reporting framework, a UE may also report one or more other values such as RI and/or CQI. For purposes of illustration, some embodiments of reporting schemes based on AI/ML (which may be referred to as ML) may be described in the context of systems performing AI/ML CSI reporting by reporting of a CSI matrix (e.g., a channel matrix, a precoding matrix, and/or the like) via an auto-encoder, however the principles are not limited to use with auto-encoders.

In some embodiments, in addition to the CSI matrix reporting, a UE may also report RI and CQI either via existing reporting or an AI/ML framework. With an AI/ML framework, a UE may be configured with subbands to report the CSI matrix for each or a subset of subbands according to a bitmap. Some examples of reporting of RI, PMI, and/or CQI are described below.

NR CSI reporting, a UE may only report one RI for all of the sub-bands specified in a CSI report configuration. The same approach may also be adopted for some embodiments of an AI/ML CSI reporting framework. In some additional embodiments, one or more RI values corresponding to one or more (e.g., each) sub-band may be reported by concatenating them into a vector and compressing the vector, which, depending on the implementation details, may be similar to CSI matrix compression. Since the correlation properties of the RI vector can be different from that of CSI matrices, an ML model (e.g., network) that may be different from one used for CSI matrix compression may be used to compress the RI vectors. For example, an ML model for RI reporting may have input and/or output dimensions, weights, and/or the like, that may be customized for compression RI vectors.

CSI matrix reporting based on an may be performed in accordance with any of the schemes disclosed herein. In some embodiments, a UE may be configured to report a CSI matrix for each or a subset of subbands according to a CSI report configuration.

CQI reporting based on an AI/ML framework may be performed in accordance with any of the schemes disclosed herein.

In some embodiments, if a UE is configured to report one or more of the three quantities discussed above (e.g., RI, CSI, and/or CQI) separately in different PUCCHs, to reduce the input size of the second model (CSI matrix reporting model), a UE may report the different quantities (e.g., three quantities) in different phases via PUCCHs using time domain multiplexing (TDM). For example, a UE may report an RI in a first PUCCH. The UE may report a CSI matrix having dimensions that may depend on the reported RI in a second PUCCH, for example, because a gNB may only be able to decode the second PUCCH after successfully decoding the first PUCCH. Depending on the implementation details, decoding of the first and the third PUCCH may be performed any time, but the second PUCCH may only be decoder after the first PUCCH decoding. One or more of these aspects may be based on an assumption that PUCCH decoding may involve running the decoder model of an auto-encoder at a gNB.

Figure 24:
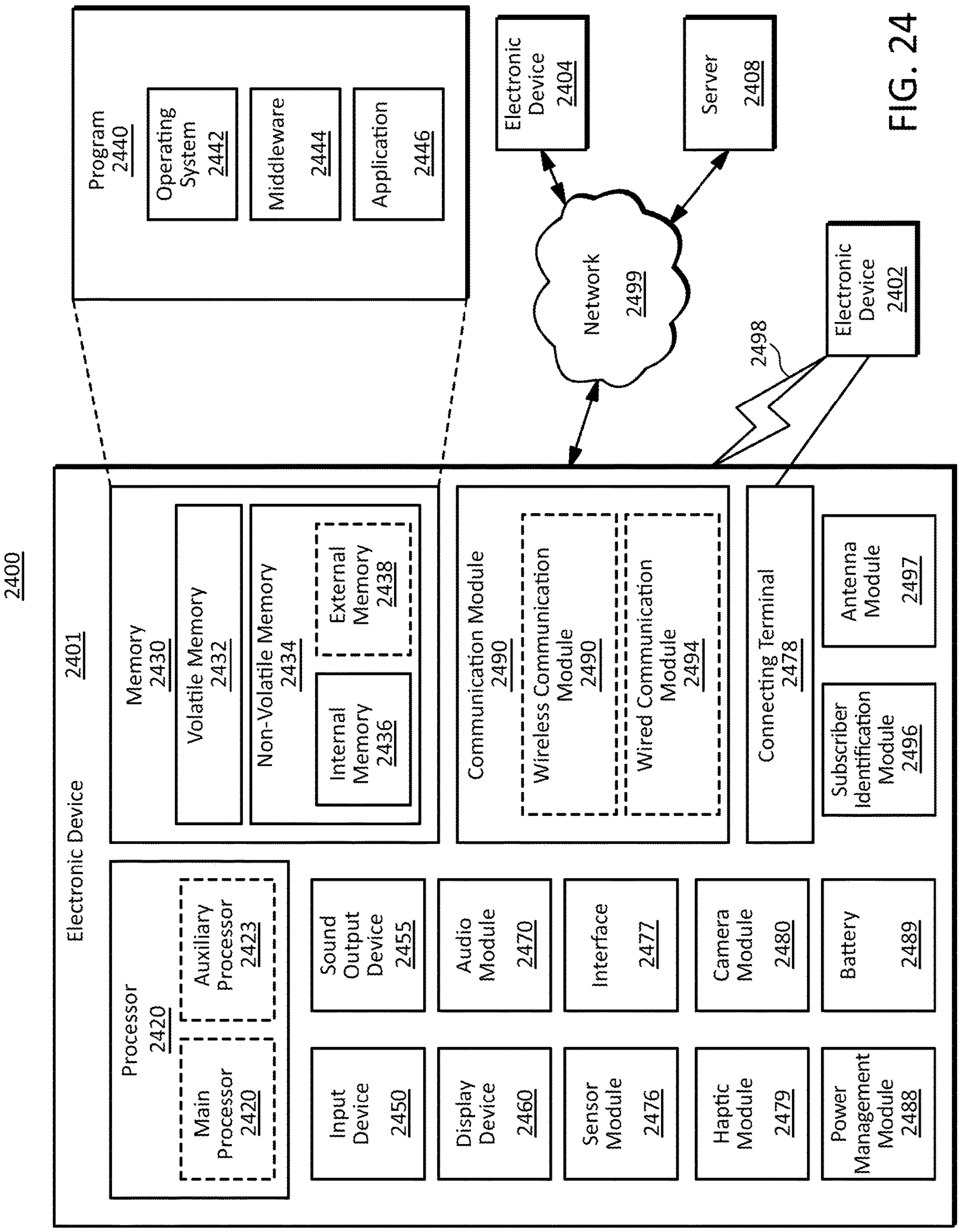
FIG. 24 is a block diagram of an electronic device in a network environment, according to an embodiment.

FIG. 24 is a block diagram of an electronic device in a network environment 2400, according to an embodiment. The embodiment illustrated in FIG. 24 may be used to implement any of the systems, methods, apparatus, devices, and/or the like described herein. For example, the electronic device 2401 may be used to implement any of the UEs and/or base stations described herein. In such embodiments, any of the UE and/or base station functionality may be implemented, at least in part, with the wireless communication module 2490.

Referring to FIG. 24, an electronic device 2401 in a network environment 2400 may communicate with an electronic device 2402 via a first network 2498 (e.g., a short-range wireless communication network), or an electronic device 2404 or a server 2408 via a second network 2499 (e.g., a long-range wireless communication network). The electronic device 2401 may communicate with the electronic device 2404 via the server 2408. The electronic device 2401 may include a processor 2420, a memory 2430, an input device 2450, a sound output device 2455, a display device

2460, an audio module 2470, a sensor module 2476, an interface 2477, a haptic module 2479, a camera module 2480, a power management module 2488, a battery 2489, a communication module 2490, a subscriber identification module (SIM) card 2496, or an antenna module 2497. In one embodiment, at least one (e.g., the display device 2460 or the camera module 2480) of the components may be omitted from the electronic device 2401, or one or more other components may be added to the electronic device 2401. Some of the components may be implemented as a single integrated circuit (IC). For example, the sensor module 2476 (e.g., a fingerprint sensor, an iris sensor, or an illuminance sensor) may be embedded in the display device 2460 (e.g., a display).

The processor 2420 may execute software (e.g., a program 2440) to control at least one other component (e.g., a hardware or a software component) of the electronic device 2401 coupled with the processor 2420 and may perform various data processing or computations.

As at least part of the data processing or computations, the processor 2420 may load a command or data received from another component (e.g., the sensor module 2476 or the communication module 2490) in volatile memory 2432, process the command or the data stored in the volatile memory 2432, and store resulting data in non-volatile memory 2434. The processor 2420 may include a main processor 2421 (e.g., a central processing unit (CPU) or an application processor (AP)), and an auxiliary processor 2423 (e.g., a graphics processing unit (GPU), an image signal processor (ISP), a sensor hub processor, or a communication processor (CP)) that is operable independently from, or in conjunction with, the main processor 2421. Additionally, or alternatively, the auxiliary processor 2423 may be adapted to consume less power than the main processor 2421, or execute a particular function. The auxiliary processor 2423 may be implemented as being separate from, or a part of, the main processor 2421.

The auxiliary processor 2423 may control at least some of the functions or states related to at least one component (e.g., the display device 2460, the sensor module 2476, or the communication module 2490) among the components of the electronic device 2401, instead of the main processor 2421 while the main processor 2421 is in an inactive (e.g., sleep) state, or together with the main processor 2421 while the main processor 2421 is in an active state (e.g., executing an application). The auxiliary processor 2423 (e.g., an image signal processor or a communication processor) may be implemented as part of another component (e.g., the camera module 2480 or the communication module 2490) functionally related to the auxiliary processor 2423.

The memory 2430 may store various data used by at least one component (e.g., the processor 2420 or the sensor module 2476) of the electronic device 2401. The various data may include, for example, software (e.g., the program 2440) and input data or output data for a command related thereto. The memory 2430 may include the volatile memory 2432 or the non-volatile memory 2434. Non-volatile memory 2434 may include internal memory 2436 and/or external memory 2438.

The program 2440 may be stored in the memory 2430 as software, and may include, for example, an operating system (OS) 2442, middleware 2444, or an application 2446.

The input device 2450 may receive a command or data to be used by another component (e.g., the processor 2420) of the electronic device 2401, from the outside (e.g., a user) of the electronic device 2401. The input device 2450 may include, for example, a microphone, a mouse, or a keyboard.

The sound output device 2455 may output sound signals to the outside of the electronic device 2401. The sound output device 2455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2460 may visually provide information to the outside (e.g., a user) of the electronic device 2401. The display device 2460 may include, for example, a display, a hologram device, or a projector and control circuitry to control a corresponding one of the displays, hologram device, and projector. The display device 2460 may include touch circuitry adapted to detect a touch, or sensor circuitry (e.g., a pressure sensor) adapted to measure the intensity of force incurred by the touch.

The audio module 2470 may convert a sound into an electrical signal and vice versa. The audio module 2470 may obtain the sound via the input device 2450 or output the sound via the sound output device 2455 or a headphone of an external electronic device 2402 directly (e.g., wired) or wirelessly coupled with the electronic device 2401.

The sensor module 2476 may detect an operational state (e.g., power or temperature) of the electronic device 2401 or an environmental state (e.g., a state of a user) external to the electronic device 2401, and then generate an electrical signal or data value corresponding to the detected state. The sensor module 2476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2477 may support one or more specified protocols to be used for the electronic device 2401 to be coupled with the external electronic device 2402 directly (e.g., wired) or wirelessly. The interface 2477 may include, for example, a high-definition multimedia interface (HDMI), a universal serial bus (USB) interface, a secure digital (SD) card interface, or an audio interface.

A connecting terminal 2478 may include a connector via which the electronic device 2401 may be physically connected with the external electronic device 2402. The connecting terminal 2478 may include, for example, an HDMI connector, a USB connector, an SD card connector, or an audio connector (e.g., a headphone connector).

The haptic module 2479 may convert an electrical signal into a mechanical stimulus (e.g., a vibration or a movement) or an electrical stimulus which may be recognized by a user via tactile sensation or kinesthetic sensation. The haptic module 2479 may include, for example, a motor, a piezoelectric element, or an electrical stimulator.

The camera module 2480 may capture a still image or moving images. The camera module 2480 may include one or more lenses, image sensors, image signal processors, or flashes. The power management module 2488 may manage power supplied to the electronic device 2401. The power management module 2488 may be implemented as at least part of, for example, a power management integrated circuit (PMIC).

The battery 2489 may supply power to at least one component of the electronic device 2401. The battery 2489 may include, for example, a primary cell which is not rechargeable, a secondary cell which is rechargeable, or a fuel cell.

The communication module 2490 may support establishing a direct (e.g., wired) communication channel or a wireless communication channel between the electronic device 2401 and the external electronic device (e.g., the electronic device 2402, the electronic device 2404, or the server 2408) and performing communication via the established communication channel. The communication module 2490 may include one or more communication processors that are operable independently from the processor 2420 (e.g., the AP) and supports a direct (e.g., wired) communication or a wireless communication. The communication module 2490 may include a wireless communication module 2492 (e.g., a cellular communication module, a short-range wireless communication module, or a global navigation satellite system (GNSS) communication module) or a wired communication module 2494 (e.g., a local area network (LAN) communication module or a power line communication (PLC) module). A corresponding one of these communication modules may communicate with the external electronic device via the first network 2498 (e.g., a short-range communication network, such as BLUETOOTH™, wireless-fidelity (Wi-Fi) direct, or a standard of the Infrared Data Association (IrDA)) or the second network 2499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2492 may identify and authenticate the electronic device 2401 in a communication network, such as the first network 2498 or the second network 2499, using subscriber information (e.g., international mobile subscriber identity (IMSI)) stored in the subscriber identification module 2496.

The antenna module 2497 may transmit or receive a signal or power to or from the outside (e.g., the external electronic device) of the electronic device 2401. The antenna module 2497 may include one or more antennas, and, therefrom, at least one antenna appropriate for a communication scheme used in the communication network, such as the first network 2498 or the second network 2499, may be selected, for example, by the communication module 2490 (e.g., the wireless communication module 2492). The signal or the power may then be transmitted or received between the communication module 2490 and the external electronic device via the selected at least one antenna.

Commands or data may be transmitted or received between the electronic device 2401 and the external electronic device 2404 via the server 2408 coupled with the second network 2499. Each of the electronic devices 2402 and 2404 may be a device of a same type as, or a different type, from the electronic device 2401. All or some of operations to be executed at the electronic device 2401 may be executed at one or more of the external electronic devices 2402, 2404, or 2408. For example, if the electronic device 2401 should perform a function or a service automatically, or in response to a request from a user or another device, the electronic device 2401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 2401. The electronic device 2401 may provide the outcome, with or without further processing of the outcome, as at least part of a reply to the request. To that end, a cloud computing, distributed computing, or client-server computing technology may be used, for example.

Figure 25:
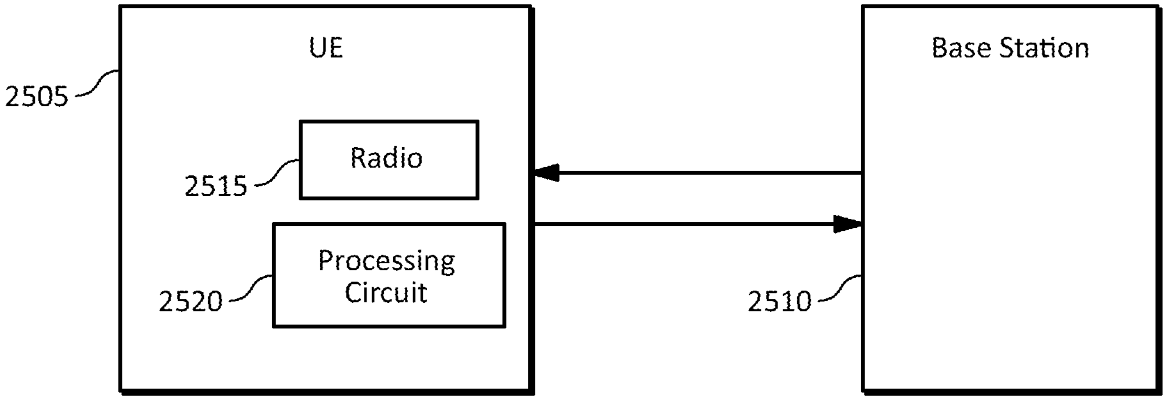
FIG. 25 shows a system including a UE and a base station in communication with each other, according to an embodiment.

FIG. 25 shows a system including a UE and a base station in communication with each other, according to an embodiment. The UE 2505 may include a radio 2515 and a processing circuit (or a means for processing) 2520, which may perform various methods disclosed herein, e.g., any of the methods illustrated with respect to FIGS. 1-12 and/or 15-23. For example, the processing circuit 2520 may receive, via the radio 2515, transmissions from a network node that may be implemented, for example, with a base station (e.g., a gNB) 2510, and the processing circuit 2520 may transmit, via the radio 2515, signals to the base station 2510. As another example, the processing circuit 2520 may implement precoding determination logic 1601 and the base station 2510 may implement sharing logic 1644 as illustrated in FIG. 16. As a further example, the processing circuit 2520 may implement a joint encoder 1703 and the base station 2510 may implement a joint decoder 1704 as illustrated in FIG. 17. As an additional example, the processing circuit 2520 may implement subband compression logic 1848 and the base station 2510 may implement subband decompression logic as illustrated in FIG. 18. As yet another example, the processing circuit 2520 and the base station 2510 may implement compression scheme logic 2050 and 2051, respectively, as illustrated in FIG. 20.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively, or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as “first” and “second” in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the inventive principles of this patent disclosure are not defined or limited by these organizational aids.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

The invention claimed is:

1. An apparatus comprising:
a device comprising:
a receiver configured to receive a reference signal using a channel;
at least one processor configured to:
determine channel information based on the reference signal;
generate a representation based on the channel information using a first machine learning model;
generate, based on the representation, a reconstruction of precoding information using a second machine learning model, wherein the precoding information comprises a precoding matrix; and
generate channel quality information based on the reconstruction of the precoding information, wherein the channel quality information comprises a channel quality indicator (CQI); and
a transmitter configured to transmit the representation and the channel quality information.

2. The apparatus of claim 1, wherein the at least one processor is configured to receive the second machine learning model.

3. The apparatus of claim 1, wherein the second machine learning model comprises a reference model.

4. The apparatus of claim 3, wherein the at least one processor is configured to train the reference model.

5. The apparatus of claim 1, wherein the channel information comprises a channel matrix.

6. The apparatus of claim 1, wherein the at least one processor is configured to combine the representation and the channel quality information.

7. An apparatus comprising:
a device comprising:
a receiver configured to receive a signal using a channel;
a transmitter configured to transmit a representation of channel information relating to the channel; and
at least one processor configured to:
determine the channel information based on the signal;
generate, using a first machine learning model, the representation of the channel information based on the channel information;
generate, using a second machine learning model, based on the representation of the channel information, a reconstruction of the channel information, wherein the channel information comprises a precoding matrix; and
generate, based on the reconstruction of the channel information, channel quality information, wherein the channel quality information comprises a channel quality indicator (CQI).

8. The apparatus of claim 7, wherein the second machine learning model comprises an encoder configured to perform spatial compression and frequency compression.

9. The apparatus of claim 8, wherein the encoder is configured to perform spatial compression and frequency compression for a first subband and spatial compression and frequency compression for a second subband.

10. The apparatus of claim 7, wherein the second machine learning model is configured to generate the representation of the channel information using spatial compression and frequency compression.

11. The apparatus of claim 7, wherein the second machine learning model comprises a reference model.

12. The apparatus of claim 11, wherein the at least one processor is configured to train the reference model.

13. The apparatus of claim 11, wherein the reference model is determined by a specification.

14. The apparatus of claim 13, wherein the specification comprises a New Radio (NR) specification.

15. An apparatus comprising:
a receiver configured to receive a reference signal using a channel;
at least one processor configured to:
determine channel information based on the reference signal;

generate, using a first machine learning model, a representation of the channel information based on the channel information;

generate, using a second machine learning model, a reconstruction of the channel information based on the representation of the channel information, wherein the channel information comprises a precoding matrix;

generate channel quality information based on the reconstruction of the channel information, wherein the channel quality information comprises a channel quality indicator (CQI); and generate a joint representation of the representation of the channel information and the channel quality information; and a transmitter configured to transmit the joint representation.

16. The apparatus of claim 15, wherein the channel information comprises a channel matrix.

17. The apparatus of claim 15, wherein the channel information comprises precoding information, the representation of the channel information comprises a representation of the precoding information, and the at least one processor is configured to:

generate a reconstruction of the precoding information based on the representation of the precoding information; and generate the channel quality information based on the reconstruction of the precoding information.

18. The apparatus of claim 15, wherein the second machine learning model comprises a reference model.

* * * * *